US012033575B2

(12) United States Patent
Yonebayashi

(10) Patent No.: US 12,033,575 B2
(45) Date of Patent: Jul. 9, 2024

(54) DISPLAY DEVICE AND METHOD FOR DRIVING SAME

(71) Applicant: SHARP KABUSHIKI KAISHA, Sakai (JP)

(72) Inventor: Ryo Yonebayashi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/619,888

(22) PCT Filed: Jun. 25, 2019

(86) PCT No.: PCT/JP2019/025105
§ 371 (c)(1),
(2) Date: Dec. 16, 2021

(87) PCT Pub. No.: WO2020/261367
PCT Pub. Date: Dec. 30, 2020

(65) Prior Publication Data
US 2022/0358880 A1 Nov. 10, 2022

(51) Int. Cl.
*G09G 3/3233* (2016.01)
*G09G 3/3266* (2016.01)
*G09G 3/3283* (2016.01)

(52) U.S. Cl.
CPC ......... *G09G 3/3233* (2013.01); *G09G 3/3266* (2013.01); *G09G 3/3283* (2013.01);
(Continued)

(58) Field of Classification Search
CPC .. G09G 3/3233; G09G 3/3266; G09G 3/3283; G09G 2300/0842;
(Continued)

(56) References Cited

U.S. PATENT DOCUMENTS

2003/0117352 A1 6/2003 Kimura
2007/0120118 A1 5/2007 Kubota et al.
(Continued)

FOREIGN PATENT DOCUMENTS

JP 2007-148216 A 6/2007
JP 2017-182085 A 10/2017
WO 2011/125113 A1 10/2011

OTHER PUBLICATIONS

W.C.Elmore, "The Transient Response of Damped Linear Networks with Particular Regard to Wideband Amplifiers", Journal of Applied Physics, Jan. 1948, vol. 19, pp. 55-63.

*Primary Examiner* — Jimmy H Nguyen
(74) *Attorney, Agent, or Firm* — ScienBiziP, P.C.

(57) ABSTRACT

In a pixel circuit of a display device in which display luminance is controlled by a holding voltage of the capacitor Cst, a gate terminal of a drive transistor M1 is connected to a source terminal of the drive transistor M1 via a capacitance selection transistor M3 and the holding capacitor Cst and is also connected to the source terminal via only an auxiliary writing capacitor Cwa. During a data writing period Tw, the capacitance selection transistor M3 is turned off, and data voltage is provided from a data signal line Dj to the auxiliary writing capacitor Cwa via a writing control transistor M2. Thereafter, the writing control transistor M2 is turned off, the capacitance selection transistor M3 is turned on, so that charges are redistributed between the auxiliary writing capacitor Cwa and the holding capacitor Cst, whereby a driving holding voltage is determined.

15 Claims, 18 Drawing Sheets

(52) U.S. Cl.
CPC ............... *G09G 2300/0426* (2013.01); *G09G 2300/0819* (2013.01); *G09G 2300/0842* (2013.01); *G09G 2300/0861* (2013.01); *G09G 2310/061* (2013.01); *G09G 2310/08* (2013.01); *G09G 2320/043* (2013.01); *G09G 2320/0626* (2013.01); *G09G 2330/021* (2013.01)

(58) Field of Classification Search
CPC ... G09G 2300/0819; G09G 2300/0861; G09G 2300/0852; G09G 2310/061; G09G 2320/045; G09G 2320/0626
USPC .................................................... 345/76, 690
See application file for complete search history.

(56) References Cited

U.S. PATENT DOCUMENTS

2012/0154460 A1 6/2012 Segawa et al.
2014/0062331 A1* 3/2014 Nam .................... G09G 3/3233 315/226
2018/0005572 A1* 1/2018 Ka ....................... G09G 3/3233

* cited by examiner (A)

(B)

DISPLAY DEVICE AND METHOD FOR DRIVING SAME

TECHNICAL FIELD

The following disclosure relates to a display device, and more particularly to a display device in which display luminance is controlled by a voltage held in capacitance in a pixel circuit, such as an organic electroluminescent (EL) display device, and a method for driving the display device.

BACKGROUND ART

In recent years, an organic EL display device provided with a pixel circuit including an organic EL element (also referred to as organic light-emitting diode (OLED)) has been put into practical use. The pixel circuit of the organic EL display device includes, in addition to the organic EL element, a drive transistor, a writing control transistor, a holding capacitor, and the like. A thin-film transistor is used for the drive transistor and the writing control transistor, the holding capacitor is connected to a gate terminal serving as a control terminal of the drive transistor, and a voltage (more specifically, a voltage indicating a gradation value of a pixel to be formed by the pixel circuit) corresponding to a video signal representing an image to be displayed is supplied as data voltage to the holding capacitor from a drive circuit via a data signal line. The organic EL element is a self-emitting display element that emits light with a luminance corresponding to a current flowing therethrough. The drive transistor is provided in series with the organic EL element and controls the current flowing through the organic EL element in accordance with the voltage held by the holding capacitor.

For example, Patent Document 1 discloses a configuration example related to the pixel circuit in the organic EL display device as described above. In a pixel circuit 40 described in Patent Document 1, a gate terminal of a drive transistor Q1 is connected to a detection trigger line 54 via a holding capacitor C1 and a detection trigger capacitor C2 connected in series with each other, and a separation transistor Q5 as a switching element is included in which one terminal is connected to a connection point between the holding capacitor C1 and the detection trigger capacitor C2 and the other terminal is connected to the source terminal of the drive transistor Q1 (see paragraphs [0075 ] to[0083 ] and FIG. 6). In the pixel circuit 40, during the writing period, the separation transistor Q5 is in an off-state, and a signal voltage Vdata is applied from a data line to the gate terminal of the drive transistor Q1. In a subsequent emission period, in the drive transistor Q1, the gate terminal is disconnected from the data line, and the separation transistor Q5 is turned on, whereby the voltage of the holding capacitor C1 is set to a gate-source voltage Vgs, a current corresponding to the voltage Vgs flows through the drive transistor Q1, and an organic EL element D1 emits light (see paragraphs [0117 ] to [0126 ], and FIGS. 10 and 11). Patent Document 2 also describes a pixel circuit similar thereto (see FIG. 5). The pixel circuit described in Patent Document 2 is configured such that a video signal is given to capacitance means 510 (C1), 509 (C2) connected in series with each other, a voltage held in capacitance means 501 (C1) is set as a gate-source voltage of a TFT 506 (drive transistor), and a current corresponding to the gate-source voltage flows through a TFT 50 and an EL element (see paragraphs [0022 ] to [0038 ]).

RELATED ART DOCUMENTS

Patent Documents

[Patent Document 1] WO 2011/125113 [Patent Document 2] Japanese Laid-Open Patent Publication No. 2017-182085

Non-Patent Documents

Non-Patent Document 1: W. C. Elmore, "The Transient Response of Damped Linear Networks with Particular Regard to Wideband Amplifiers", J. of Applied Physics, vol. 19, pp. 55-63, January 1948.

SUMMARY

Problems to be Solved

As described above, in the organic EL display device provided with the pixel circuit including the drive transistor, the writing control transistor, the holding capacitor, and the like in addition to the organic EL element, it is preferable that the data voltage written to the holding capacitor of each pixel circuit in the data writing period be maintained at the value as it is in the emission period. For this purpose, the capacitance value of the holding capacitor may be increased. However, when the capacitance value of the holding capacitor is increased, the time required for the charging of the holding capacitor becomes long, and as a result, when the holding capacitance becomes insufficient in charging during the data writing period, the display quality deteriorates.

Therefore, in a display device in which the display luminance is controlled by the data voltage written to the capacitor (capacitance) in the pixel circuit like the organic EL display device described above, it is desirable to prevent insufficient charging in data writing while using a capacitor having a large capacitance value.

Solution to Problem

Several embodiments of the disclosure provide a display device including a plurality of data signal lines, a plurality of scanning signal lines intersecting the plurality of data signal lines, and a plurality of pixel circuits arranged along the plurality of data signal lines and the plurality of scanning signal lines, the display device including:

a data signal line drive circuit configured to drive the plurality of data signal lines; and a scanning signal line drive circuit configured to selectively drive the plurality of scanning signal lines, wherein each of the pixel circuits corresponds to any one of the plurality of data signal lines and corresponds to any one of the plurality of scanning signal lines, each of the pixel circuits includes a holding capacitor and a display element having luminance controlled by a holding voltage held in the holding capacitor, and each of the pixel circuits is configured to apply a voltage of the corresponding data signal line to a small-capacitance capacitor having a capacitance value smaller than a capacitance value of the holding capacitor when the corresponding scanning signal line is selected, so as to hold a writing voltage in the small-capacitance capacitor, and determine the holding voltage of the holding capacitor on a basis of the writing voltage of the small-capacitance capacitor.

One of the several embodiments of the disclosure provides a display device further including:

capacitance selection signal lines respectively corresponding to the plurality of scanning signal lines; and a capacitance selection control circuit configured to drive the plurality of capacitance selection signal lines, wherein each of the pixel circuits further includes a writing control switching element having a control terminal connected to the corresponding scanning signal line, an auxiliary writing capacitor serving as the small-capacitance capacitor, a capacitance selection switching element that has a control terminal connected to a capacitance selection signal line corresponding to the corresponding scanning signal line and is connected in series with the holding capacitor, and an initialization circuit configured to discharge and initialize the holding capacitor before the capacitance selection switching element is turned on, and in each of the pixel circuits, the auxiliary writing capacitor is connected in parallel with the holding capacitor and the capacitance selection switching element connected in series with each other and, and the auxiliary writing capacitor has a first terminal connected to the corresponding data signal line via the writing control switching element, and a second terminal connected to a fixed potential line.

Another of the several embodiments of the disclosure provides a display device further including an initialization circuit, wherein each of the pixel circuits further includes a writing control switching element having a control terminal connected to the corresponding scanning signal line, and an auxiliary writing capacitor connected in series with the holding capacitor, the initialization circuit is configured to discharge and initialize the holding capacitor and the auxiliary writing capacitor in a predetermined initialization period when a power of the display device is turned on, the small-capacitance capacitor includes the auxiliary writing capacitor and the holding capacitor connected in series with each other, and in each of the pixel circuits, the small-capacitance capacitor has a first terminal connected to the corresponding data signal line via the writing control switching element, and a second terminal connected to a fixed potential line.

Several other embodiments of the disclosure provide a driving method for a display device that includes a plurality of data signal lines, a plurality of scanning signal lines intersecting the plurality of data signal lines, and a plurality of pixel circuits arranged along the plurality of data signal lines and the plurality of scanning signal lines, each of the pixel circuits corresponding to any one of the plurality of data signal lines and corresponding to any one of the plurality of scanning signal lines, each of the pixel circuits including a holding capacitor and a display element having luminance controlled by a holding voltage held in the holding capacitor, and the driving method including:

a data writing step of applying a voltage of the corresponding data signal line to a small-capacitance capacitor that has a capacitance value smaller than a capacitance value of the holding capacitor in each of the pixel circuits when the corresponding scanning signal line is selected, so as to hold a writing voltage in the small-capacitance capacitor, and a holding voltage determination step of determining the holding voltage of the holding capacitor on a basis of the writing voltage of the small-capacitance capacitor.

Effects of the Disclosure

According to the above several embodiments of the disclosure, each pixel circuit is configured such that the luminance of the display element is controlled by the voltage held in the holding capacitor, and in the pixel circuit, when the corresponding scanning signal line is selected, a voltage of the corresponding data signal line is applied to a small-capacitance capacitor having a capacitance value smaller than a capacitance value of the holding capacitor, so that a writing voltage is held in the small-capacitance capacitor, and the holding voltage of the holding capacitor is determined on a basis of the writing voltage of the small-capacitance capacitor. As described above, in each pixel circuit, in the selection period for the corresponding scanning signal line, the data voltage that is the voltage of the corresponding data signal line is not written to the holding capacitor but is written to the small-capacitance capacitor. As a result, even when the capacitance value of the holding capacitor is large, data writing can be performed in a shorter time than in the related art, so that it is possible to prevent deterioration in display quality due to insufficient charging while using the holding capacitor having a large capacitance value for stabilizing the holding voltage for luminance control.

In the display device according to one of the above several embodiments of the disclosure, each pixel circuit includes an auxiliary writing capacitor as the small-capacitance capacitor, and in each pixel circuit, after the holding capacitor is initialized and the auxiliary writing capacitor is charged with the data voltage that is the voltage of the corresponding data signal line, the holding capacitor and the auxiliary writing capacitor are connected in parallel, and charges are redistributed between both the capacitors, whereby the holding voltage of the holding capacitor is determined. As a result, even when the capacitance value of the holding capacitor is large, data writing can be performed in a shorter time than in the related art, so that it is possible to prevent deterioration in display quality due to insufficient charging while using the holding capacitor having a large capacitance value for stabilizing the holding voltage for luminance control.

In the display device according to another of the above several embodiments of the disclosure, each pixel circuit includes the auxiliary writing capacitor connected in series with the holding capacitor, the holding capacitor and the auxiliary writing capacitor constitute the small-capacitance capacitor, and when the corresponding scanning signal line is selected, the small-capacitance capacitor is charged with the data voltage that is the voltage of the corresponding data signal line. The voltage held in the small-capacitance capacitor by the writing of the data voltage due to this charging is capacitively divided between the auxiliary writing capacitor and the holding capacitor, whereby the holding voltage in the holding capacitor is determined. As a result, even when the capacitance value of the holding capacitor is large, data writing can be performed in a shorter time than in the related art, so that it is possible to prevent deterioration in display quality due to insufficient charging while using the holding capacitor having a large capacitance value for stabilizing the holding voltage for luminance control.

DESCRIPTION OF EMBODIMENTS

Each embodiment will be described below with reference to the accompanying drawings. In each transistor described below, a gate terminal corresponds to a control terminal, one of a drain terminal and a source terminal corresponds to a first conductive terminal, and the other corresponds to a second conductive terminal. The transistor in each embodiment is, for example, a thin-film transistor, but the disclosure is not limited thereto. Further, "connection" in the present specification means "electrical connection" unless otherwise specified and includes not only the case of meaning direct connection but also the case of meaning indirect connection via another element in the scope not deviating from the gist of the disclosure.

1. First Embodiment

<1.1 Overall Configuration>

Figure 1:
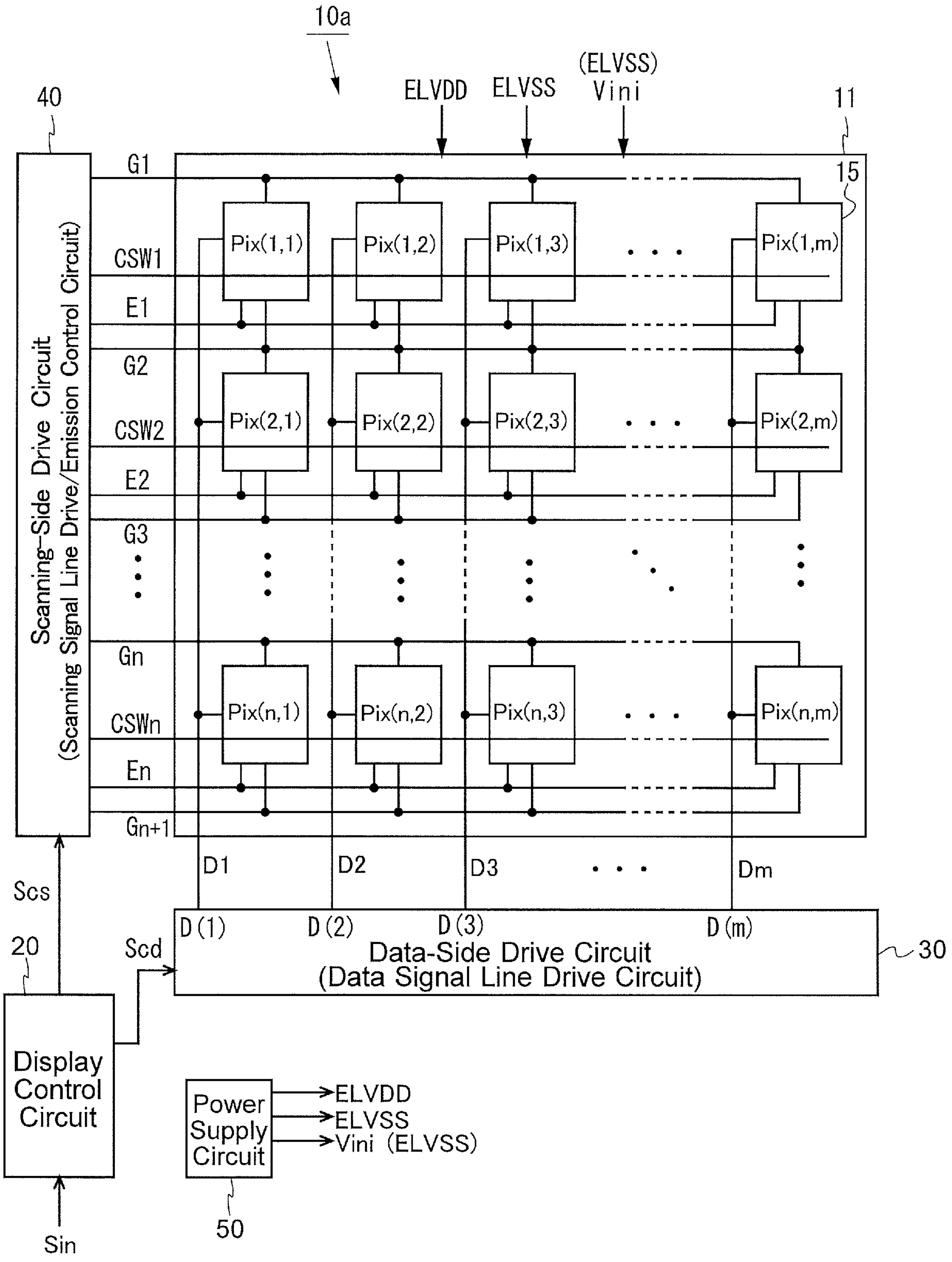
FIG. 1 is a block diagram illustrating an overall configuration of a display device according to a first embodiment.

FIG. 1 is a block diagram illustrating an overall configuration of an organic EL display device 10*a* according to a first embodiment. As illustrated in FIG. 1, the display device 10*a* includes a display portion 11, a display control circuit 20, a data-side drive circuit 30, a scanning-side drive circuit 40, and a power supply circuit 50. The data-side drive circuit functions as a data signal line drive circuit (also referred to as "data driver"). The scanning-side drive circuit 40 functions as a scanning signal line drive circuit (also referred to as "gate driver") and an emission control circuit (also referred to as "emission driver"). In the configuration illustrated in FIG. 1, the two drive circuits are implemented as one scanning-side drive circuit 40, but the two drive circuits may be appropriately separated, or the two drive circuits may be separated and disposed on one side and the other side of the display portion 11. Further, at least a part of the scanning-side drive circuit and the data-side drive circuit may be integrally formed with the display portion 11. These points also apply to other embodiments and modifications to be described later. The power supply circuit 50 generates a high-level power supply voltage ELVDD, a low-level power supply voltage ELVSS, and an initialization voltage Vini, described later, to be supplied to the display portion 11, and a power supply voltage (not illustrated) to be supplied to the display control circuit 20, the data-side drive circuit 30, and the scanning-side drive circuit 40.

In the display portion 11, m (m is an integer of 2 or more) data signal lines D1 to Dm and n+1 (n is an integer of 2 or more) scanning signal lines G1 to Gn+1 intersecting the m data signal lines D1 to Dm are disposed, n emission control lines (also referred to as "emission lines") E1 to En are disposed along the n scanning signal lines G1 to Gn, respectively, and n capacitance selection signal lines CSW1 to CSWn are disposed along the n scanning signal lines G1 to Gn, respectively. As illustrated in FIG. 1, the display portion 11 is provided with m×n pixel circuits 15, the m×n pixel circuits 15 are arranged in a matrix along m data signal lines D1 to Dm and n scanning signal lines G1 to Gn, and each pixel circuit 15 corresponds to any one of m data signal lines D1 to Dm and any one of n scanning signal lines G1 to Gn (hereinafter, in the case of distinguishing the pixel circuits 15 from each other, the pixel circuit corresponding to the ith scanning signal line Gi and the jth data signal line Dj is also referred to as "the pixel circuit in the ith row and the jth column" and denoted by reference symbol "Pix(i,j)"). The n emission control lines E1 to En correspond to the n scanning signal lines G1 to Gn, respectively, and the n capacitance selection signal lines CSW1 to CSWn also correspond to the n scanning signal lines G1 to Gn, respectively. Therefore, each pixel circuit 15 corresponds to any one of the n emission control lines E1 to En and also corresponds to any one of the n capacitance selection signal lines CSW1 to CSWn. As a capacitance selection signal CSW(i) to be applied to each capacitance selection signal line CSWi, an emission control signal to be applied to the emission control line Ei corresponding to the capacitance selection signal line CSWi may be used. In this case, the capacitance selection signal lines CSW1 to CSWn are unnecessary.

A power supply line (not illustrated) common to each pixel circuit 15 is disposed in the display portion 11. That is, a first power supply line and a second power supply line are disposed, the first power supply line being configured to supply a high-level power supply voltage ELVDD for driving the organic EL element to be described later (hereinafter, the line will be referred to as the "high-level power supply line" and denoted by the same reference symbol "ELVDD" as the high-level power supply voltage), the second power supply line being configured to supply a low-level power supply voltage ELVSS for driving the organic EL element (hereinafter, the line will be referred to as the "low-level power supply line" and denoted by the same reference symbol "ELVSS" as the low-level power supply voltage). In the display portion 11, an initialization voltage supply line INI (not illustrated), configured to supply a fixed voltage as an initialization voltage Vini used for an initialization operation for initializing each pixel circuit 15, is disposed. The high-level power supply voltage ELVDD, the low-level power supply voltage ELVSS, and the initialization voltage Vini are supplied from the power supply circuit 50. Note that each of the high-level power supply line ELVDD, the low-level power supply line ELVSS, and the initialization voltage supply line INT is a voltage supply line that supplies a fixed potential, that is, a fixed potential line.

The display control circuit 20 receives an input signal Sin including image data representing an image to be displayed and timing control information for image display from the outside of the display device 10*a*, generates a data-side control signal Scd and a scanning-side control signal Scs on the basis of the input signal Sin, and outputs the data-side control signal Scd and the scanning-side control signal Scs to the data-side drive circuit (data signal line drive circuit) 30 and the scanning-side drive circuit (scanning signal line drive/emission control circuit) 40, respectively.

The data-side drive circuit 30 drives the data signal lines D1 to Dm on the basis of the data-side control signal Scd from the display control circuit 20. That is, on the basis of the data-side control signal Scd, the data-side drive circuit 30 outputs m data signals D(1) to D(m) representing an image to be displayed in parallel and applies the data signals D(1) to D(m) to the data signal lines D1 to Dm, respectively.

The scanning-side drive circuit 40 functions as a scanning signal line drive circuit that drives the scanning signal lines G1 to Gn+1, an emission control circuit that drives the emission control lines E1 to En, and a capacitance selection control circuit that drives the capacitance selection signal lines CSW1 to CSWn on the basis of the scanning-side control signal Scs from the display control circuit 20. In a case where the emission control signal to be applied to the emission control line Ei corresponding to each of the capacitance selection signal lines CSWi is used as the capacitance selection signal CSW(i) to be applied to each of the capacitance selection signal lines CSWi, the capacitance selection signal lines CSW1 to CSWn are unnecessary, and thus the function of the capacitance selection control circuit is also unnecessary.

More specifically, as the scanning signal line drive circuit, the scanning-side drive circuit 40 sequentially selects the scanning signal lines G1 to Gn+1 for two horizontal periods each, with the horizontal periods overlapped by one horizontal period, in each frame period on the basis of the scanning-side control signal Scs, applies an active signal to the selected scanning signal line Gk, and applies an inactive signal to the unselected scanning signal line. That is, the scanning signal lines G1 to Gn+1 are driven such that the ith scanning signal line is in a selected state during the (i−1)th horizontal period and the ith horizontal period (hereinafter, such driving of the scanning signal line is referred to as "double-pulse driving"). Note that the "horizontal period" is generally a period for a portion corresponding to one line of a display image in a video signal based on horizontal scanning and vertical scanning, and here corresponds to a period in which image data for one line of the display image (data representing m pixels constituting one line) is output as data signals D(1) to D(m) from the data-side drive circuit 30. For example, in FIG. 3 described later, each of a period t4 to t5, a period t5 to t6, and a period t6 to t8 is one horizontal period. When the ith scanning signal line Gi comes into the selected state, m pixel circuits (hereinafter also referred to as "pixel circuits in the ith row) Pix(i,1) to Pix(i,m) corresponding to the pixel circuit are selected collectively. As a result, the voltages of the m data signals D(1) to D(m) applied from the data-side drive circuit 30 to the data signal lines D1 to Dm (hereinafter, these voltages may be simply referred to as "data voltages" without distinction) during a selection period for the scanning signal line Gi (hereinafter referred to as "ith scanning selection period") are written as pixel data to the pixel circuits Pix(i,1) to Pix(i,m), respectively. That is, a predetermined capacitor in each pixel circuit Pix(i,j) (j=1 to m) in the ith row is charged with the data voltage. The predetermined capacitor corresponds to the holding capacitance in the known pixel circuit, but as described later, in the present embodiment, the predetermined capacitor is, for example, an auxiliary writing capacitor Cwa as a small-capacitance capacitor in the configuration illustrated in FIG. 2 and the like.

Since the double-pulse driving is performed in the present embodiment as described above, during the ith horizontal period, both the ith and (i+1)th scanning signal lines Gi, Gi+1 are in the selected state (see FIG. 3 to be described later), the predetermined capacitors of the pixel circuits Pix(i,1) to Pix(i,m) in the ith row (the auxiliary writing capacitors Cwa in the example illustrated in FIG. 3 to be described later) are charged with the voltages of the data signals D(1) to D(m), respectively, and the predetermined capacitors of the pixel circuits Pix(i+1,1) to Pix(i+1,m) in the (i+1)th row are also charged with the voltages of the data signals D(1) to D(m), respectively. As a result, the respective predetermined capacitors of the pixel circuits Pix(i,1) to Pix(i,m) in the ith row are charged with the data voltages to be written thereto, but the respective predetermined capacitors of the pixel circuits Pix(i+1,1) to Pix(i+1,m) in the (i+1)th row are charged with the data voltages to be written to the pixel circuits in the immediately preceding row. The charging of the predetermined capacitor in the pixel circuit in the (i+1)th row corresponds to "preliminary charging", thereby improving the charging rate of the predetermined capacitor in writing the data voltage to each pixel circuit 15.

The scanning-side drive circuit 40 applies, as the emission control circuit, an inactive emission control signal indicating non-emission of light to the ith emission control line Ei during a predetermined period including at least the ith selection scanning period on the basis of the scanning-side control signal Scs and applies an active emission control signal indicating light emission during the other periods (see FIG. 3 to be described later). While the emission control signal of the emission control line Ei is active, the organic EL elements in the pixel circuits Pix(i,1) to Pix(i,m) in the ith row emit light with luminance corresponding to the voltage Vw2 determined on the basis of the data voltages respectively written to the pixel circuits Pix(i,1) to Pix(i,m) in the ith row (details will be described later). Further, the scanning-side drive circuit 40 applies a capacitance selection signal, described later, to be given to a gate terminal of a capacitance selection transistor in each of the pixel circuits Pix(i,1) to Pix(i,m) in the ith row to the ith capacitance selection signal line CSWi on the basis of the scanning-side control signal Scs (see FIG. 3 to be described later). Although the emission control signal may be used as the capacitance selection signal, in the present embodiment, in order to stabilize the writing operation of the data voltage to the holding capacitance (holding capacitor Cst to be described later) of each pixel circuit 15, each capacitance selection signal CSW(i) is generated (i=1 to n) such that the timing at which the capacitance selection signal CSW(i) applied to each capacitance selection signal line CSWi changes from the inactive state (low-level voltage) to the active state (high-level voltage) is slightly earlier than the timing at which the emission control signal applied to the emission control line Ei corresponding to the capacitance selection signal line CSWi changes from the inactive state (low-level voltage) to the active state (high-level voltage) (see FIG. 3 and the like to be described later).

<1.2 Configuration and Operation of Pixel Circuit in Known Example>

Hereinafter, prior to the description of the configuration and operation of the pixel circuit 15 in the present embodiment, the configuration and operation of the pixel circuit 14 in a known organic EL display device (hereinafter referred to as "known example") will be described with reference to FIGS. 28 and 29 for comparison. Note that this known example is basically similar to the configuration illustrated in FIG. 1 as a whole but is different from the configuration illustrated in FIG. 1 in the following points. That is, since the emission control of each pixel circuit by the emission control circuit in the first embodiment is not directly related to the problem in the known example described below or the proposal for solving the problem, in the known example, the pixel circuit 14 does not include a transistor for emission control, and the emission control lines E1 to En are not disposed in the display portion 11 (see FIG. 28). In addition, the capacitance selection signal lines CSW1 to CSWn, the circuit for driving the capacitance selection signal lines CSW1 to CSWn, or the component (the capacitance selection transistor to be described later) controlled by each of the capacitance selection signal lines CSW1 to CSWn in the first embodiment is not included in the known example.

Figure 28:
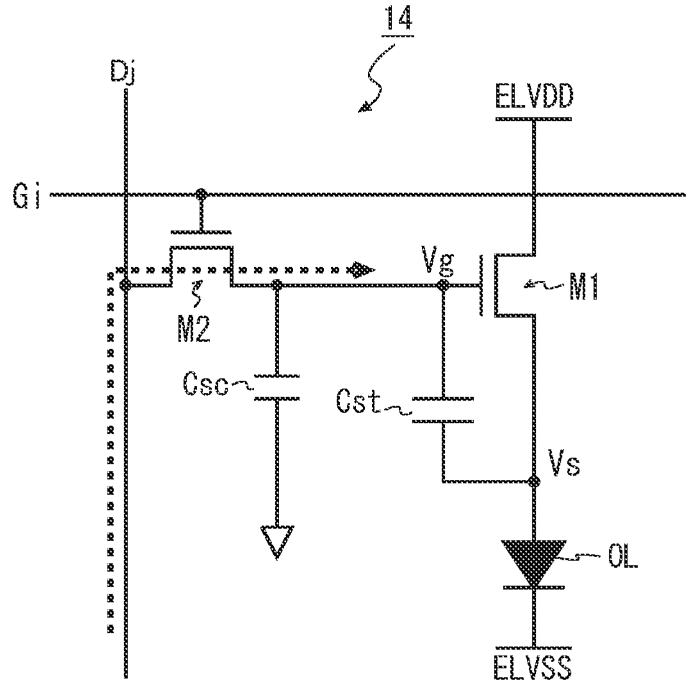
FIG. 28 Prior Art
FIG. 28 is a circuit diagram illustrating a configuration of a pixel circuit in a known display device.

FIG. 28 is a circuit diagram illustrating the configuration of the pixel circuit 14 in the known example, more specifically, a circuit diagram illustrating the configuration of the pixel circuit 14 corresponding to the ith scanning signal line Gi and the jth data signal line Dj, that is, the pixel circuit Pix(i,j) in the ith row and the jth column (1≤i≤n, 1≤j≤m). As illustrated in FIG. 28, the pixel circuit 14 includes an organic EL element OL as a display element, a drive transistor M1, a writing control transistor M2, and a holding capacitor Cst. Further, in FIG. 28, capacitance (hereinafter simply referred to as "parasitic capacitance") parasitic in the gate terminal of the drive transistor M1 is indicated by "Csc". In the pixel circuit 14, the writing control transistor M2 functions as a switching element.

The pixel circuit 14 is connected with a scanning signal line (hereinafter also referred to as "corresponding scanning signal line" in the description focusing on the pixel circuit) Gi corresponding to the pixel circuit 14, a data signal line (hereinafter also referred to as "corresponding data signal line" in the description focusing on the pixel circuit) Dj corresponding to the pixel circuit 14, a high-level power supply line ELVDD, and a low-level power supply line ELVSS.

As illustrated in FIG. 28, in the pixel circuit 14, the drive transistor M1 has a drain terminal connected to the high-level power supply line ELVDD, a gate terminal connected to the corresponding data signal line Dj via the writing control transistor M2, and to a source terminal via the holding capacitor Cst, and the source terminal connected to an anode electrode of the organic EL element OL. A cathode electrode of the organic EL element OL is connected to the low-level power supply line ELVSS. The gate terminal of the writing control transistor M2 is connected to the corresponding scanning signal line Gi.

The drive transistor M1 is an N-channel transistor and operates in a saturation region during an emission period, and a current corresponding to a voltage held in the holding capacitor Cst, that is, a gate-source voltage Vgs, flows between the source and the drain, and the current also flows to the organic EL element OL as a drive current Id. As a result, the organic EL element OL emits light with luminance corresponding to the drive current Id.

As described above, during the emission period, since the organic EL element OL emits light with luminance corresponding to the gate-source voltage Vgs of the drive transistor M1, the gate-source voltage Vgs is preferably maintained at a desired voltage determined by the data signal D(j) in the immediately preceding data writing period during the emission period. However, with the parasitic capacitance Csc existing at the gate terminal of the drive transistor M1, when the voltage Vs of the source terminal of the drive transistor M1 changes by AVs due to the voltage drop caused by the current flowing through the power supply line, the voltage (hereinafter simply referred to as "gate voltage") Vg of the gate terminal changes by ΔVg expressed by the following equation (hereinafter, the capacitance values of the parasitic capacitance Ccs and the holding capacitor Cst are also denoted by reference symbols "Csc" and" Cst", respectively):

$$\Delta Vg=\{Cst/(Csc+Cst)\}\Delta Vs \quad (1)$$

From the above equation, in order to keep the gate-source voltage Vgs constant, that is, in order to make ΔVg=ΔVs, it is preferable to set the capacitance value of the holding capacitor Cst to a value as large as possible so as to satisfy Cst/(Csc+Cst)≈1.

A time constant τcnv when the gate terminal of the drive transistor M1 is charged by the data signal D(j) can be approximated as follows according to the Elmore delay model (see Non-Patent Document 1).

$$\tau cnv \approx C\text{data}\cdot R\text{data}/2+(R\text{data}+RTr)Csc+(R\text{data}+RTr)Cst \quad (2)$$

Here, the data signal line Dj is treated as a transmission path by a distributed constant circuit of resistance and capacitance, Cdata and Rdata indicate the total capacitance and the total resistance from the point of input of the data signal D(j) to the data signal line Dj to the writing control transistor M2, respectively, and RTr indicates the on-resistance of the writing control transistor.

Although it is preferable to increase the capacitance value of the holding capacitor Cst as much as possible from Equation (1) above, increasing the capacitance value of the holding capacitor Cst increases the time constant τcnv from Equation (2) above, which is disadvantageous for the high-speed driving of the pixel circuit 14. This will be described in detail below.

Figure 29:
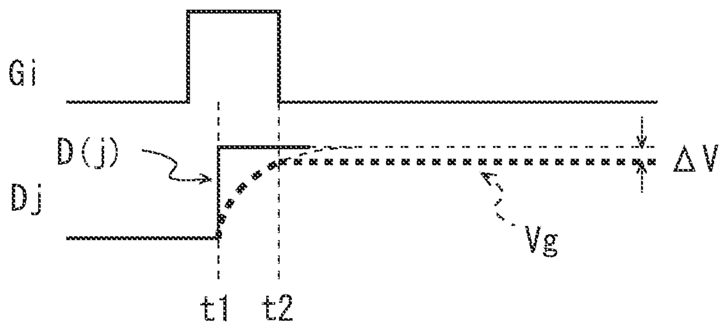
FIG. 29 Prior Art
FIG. 29 is a signal waveform diagram for explaining a problem in the known display device.

FIG. 29 is a signal waveform diagram for describing the driving of the display device according to the known example and illustrates changes in the voltage of the corresponding scanning signal line Gi, the voltage of the corresponding data signal line Dj (the voltage of the data signal D(j), and the voltage of the gate terminal (gate voltage) Vg of the drive transistor M1 in the data writing operation of the pixel circuit 14 illustrated in FIG. 28, that is, the pixel circuit Pix(i,j) in the ith row and the jth column. In FIG. 29, a period during which the voltage of the corresponding scanning signal line Gi is at a high level is a selection period for the corresponding scanning signal line Gi. At time t1, the data signal D(j) changes from a voltage to be written to the pixel circuit Pix(i−1,j) in the (i−1)th row and the jth column to a voltage to be written to the pixel circuit Pix(i,j) in the ith row and the jth column. In the example illustrated in FIG. 29, at time t2, the scanning signal line Gi comes into an unselected state (low-level voltage) before the gate voltage Vg reaches a target voltage (the voltage to be written to pix circuit Pix(i,j). As a result, in the emission period after time t2, a deviation ΔV occurs between the actual gate voltage Vg and the target voltage (the voltage of the data signal D(j) at time t2). That is, the insufficient charging of the holding capacitor Cst occurs in data writing.

<1.3 Basic Configuration Example of Pixel Circuit in the Disclosure>

Figure 30:
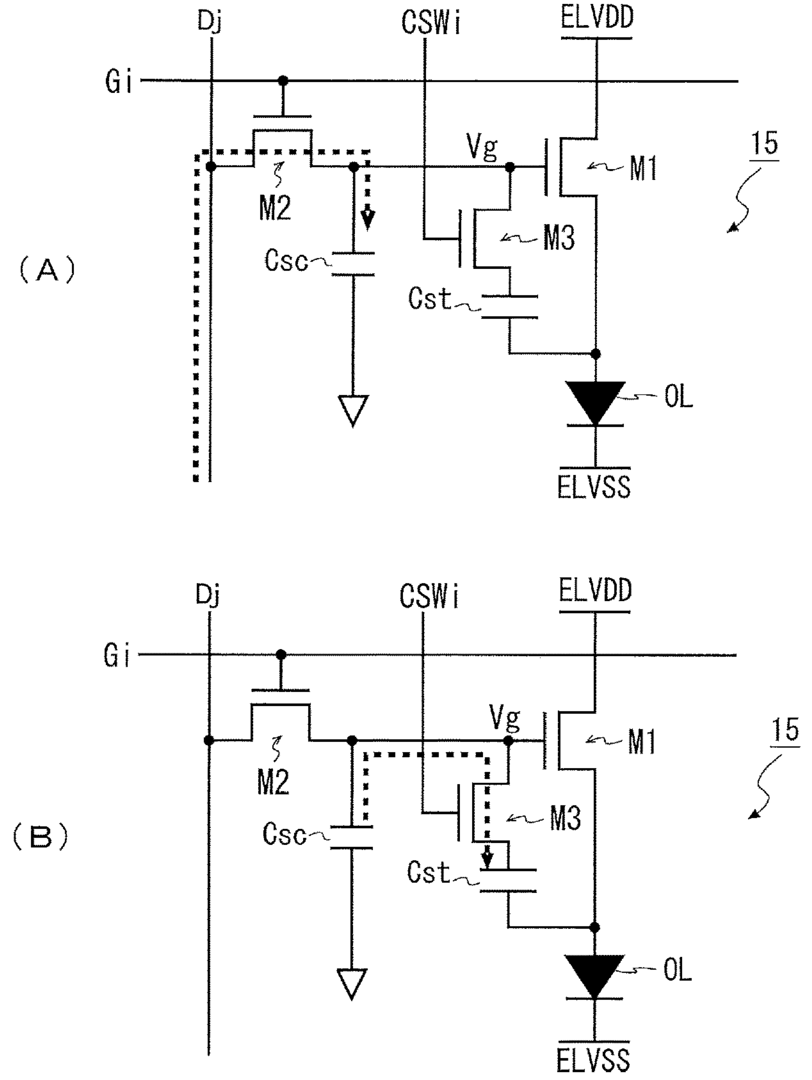
FIGS. 30(A) and 30(B) are circuit diagrams for describing a basic configuration and operation of a pixel circuit for solving the problem in the known display device.
Figure 31:
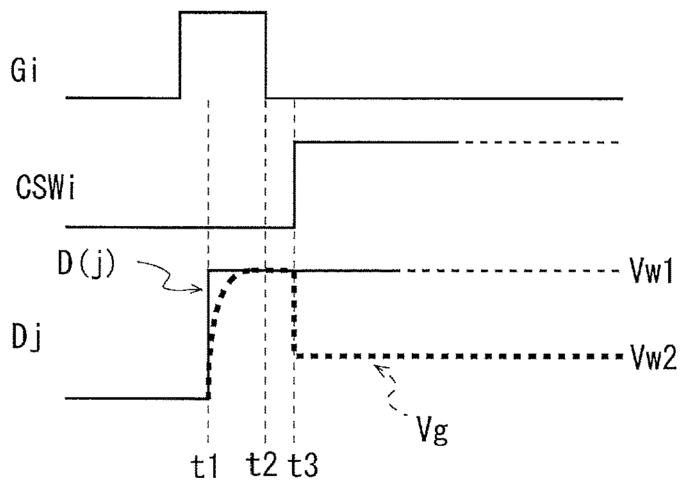
FIG. 31 is a signal waveform diagram for describing a basic operation of the pixel circuit for solving the problem in the known display device.

As a result of intensive studies to solve the above problem in the known example, the inventor of the present application has reached a configuration illustrated in FIGS. 30 and 31 for a pixel circuit. FIG. 30 is a circuit diagram for describing the basic configuration and operation of the pixel circuit for solving the above problem, and FIG. 31 is a signal waveform diagram for describing the basic operation of the pixel circuit for solving the above problem.

Similarly to the pixel circuit 14 in the known example illustrated in FIG. 28, the pixel circuit (hereinafter referred to as "basic pixel circuit") 15 illustrated in FIGS. 30(A) and 30(B) includes an organic EL element OL as a display element, a drive transistor M1, a writing control transistor M2, and a holding capacitor Cst, but is different from the known example in further including a capacitance selection transistor M3 that functions as a switching element. That is, in the basic pixel circuit 15, the capacitance selection transistor M3 is connected in series with the holding capacitor Cst, and the gate terminal of the drive transistor M1 is connected to the source terminal of the drive transistor M1 via the capacitance selection transistor M3 and the holding capacitor Cst. The capacitance selection signal line CSWi is connected to the gate terminal of the capacitance selection transistor M3, whereby a voltage of a capacitance signal line CSi is provided as the capacitance selection signal CSW(i). As illustrated in FIG. 31, the capacitance selection signal CSW(i) is a signal that becomes active (high level) after time t2 at which the corresponding scanning signal line Gi changes to the unselected state (low level).

In the driving of the basic pixel circuit 15 as well, the data signal D(j) changes from a voltage to be written to the pixel circuit Pix(i−1,j) in the (i−1)th row and the jth column to the voltage to be written to the pixel circuit Pix(i,j) in the ith row and the jth column at time t1 within the selection period for the corresponding scanning signal line Gi, as illustrated in FIG. 31. At this time t1, since the capacitance selection signal CSW(i) is at the low level, the capacitance selection transistor M3 is in an off-state. Therefore, when the data signal D(j) is provided from the corresponding data signal line Dj to the gate terminal of the drive transistor M1 via the writing control transistor M2 in an on-state, only the parasitic capacitance Csc is charged by the voltage of the data signal D(j), and the holding capacitor Cst is not charged (see FIG. 30(A)). Here, normally, the capacitance value of the parasitic capacitance Csc is sufficiently small compared to the capacitance value of the holding capacitor Cst. Thus, the data writing by the data signal D(j), that is, the charging of the parasitic capacitance Csc, after time t1 is performed at a higher speed than in the known example because the time constant is small. As a result, the gate voltage Vg reaches a target potential (a voltage corresponding to the voltage to be written to the pixel circuit Pix(i,j)) Vw1 at the end time t2 of the selection period for the corresponding scanning signal line Gi.

At time t2, as illustrated in FIG. 31, the corresponding scanning signal line Gi comes into the unselected state, so that the writing control transistor M2 comes into the off-state, and thereafter, at time t3, the capacitance selection signal CSW(i) goes to the high level, so that the capacitance selection transistor M3 is turned on. Therefore, at time t3, charges are redistributed among the parasitic capacitance Csc and the holding capacitor Cst (see FIG. 30(B)). By this charge redistribution, the gate voltage Vg becomes a voltage Vw2 expressed by the following equation, provided that no charge is accumulated in the holding capacitor Cst immediately before the charge redistribution.

$$Vw2=\{Csc/(Csc+Cst)\}Vw1 \quad (3)$$

As described above, according to the basic pixel circuit 15 illustrated in FIG. 30, in the selection period for the corresponding scanning signal line Gi, that is, in the data writing period, the voltage of the corresponding data signal line Dj is written as the data voltage Vw1 to the capacitance (here, "parasitic capacitance") Ccs having a smaller capacitance value than the holding capacitor Cst, so that the data voltage Vw1 can be written in a shorter time than before, and the insufficient charging can be avoided. However, after the data voltage Vw1 is written, the capacitance selection transistor M3 is turned on, so that charges are redistributed between the parasitic capacitance Ccs and the holding capacitor Cst, whereby the voltage Vw2 held in the holding capacitor Cst is determined.

Hence the voltage of the corresponding data signal line Dj needs to be set higher than the voltage to be held in the holding capacitor Cst (see Equation (3), FIG. 31).

<1.4 Configuration and Operation of Pixel Circuit in Present Embodiment>

Next, the configuration and operation of a pixel circuit 15*a* in the present embodiment based on the basic pixel circuit 15 of FIG. 30 will be described with reference to FIGS. 2 and 3.

Figure 2:
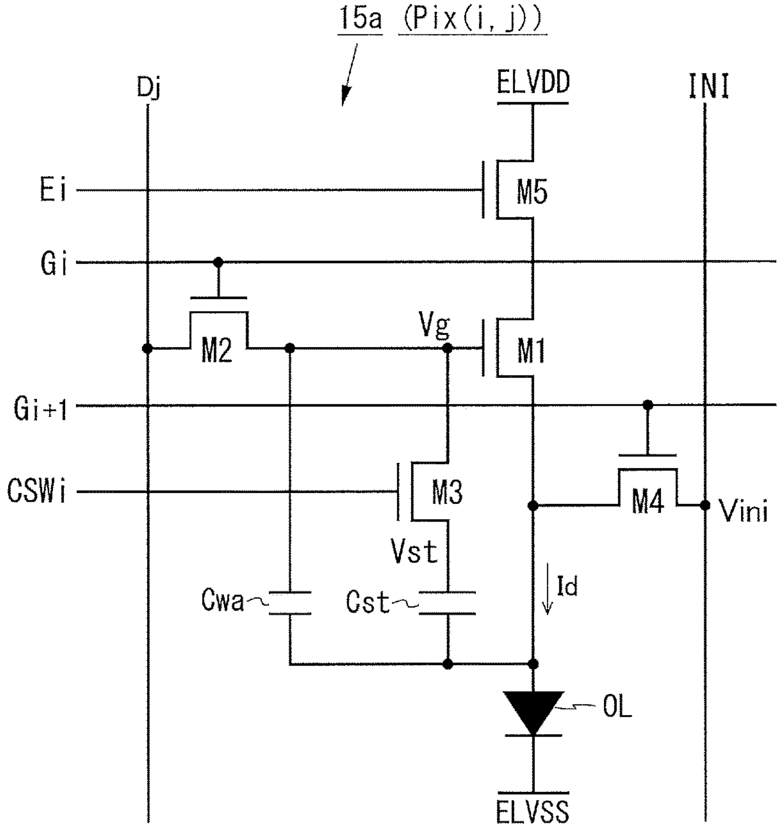
FIG. 2 is a circuit diagram illustrating a first configuration example of a pixel circuit in the first embodiment.
Figure 3:
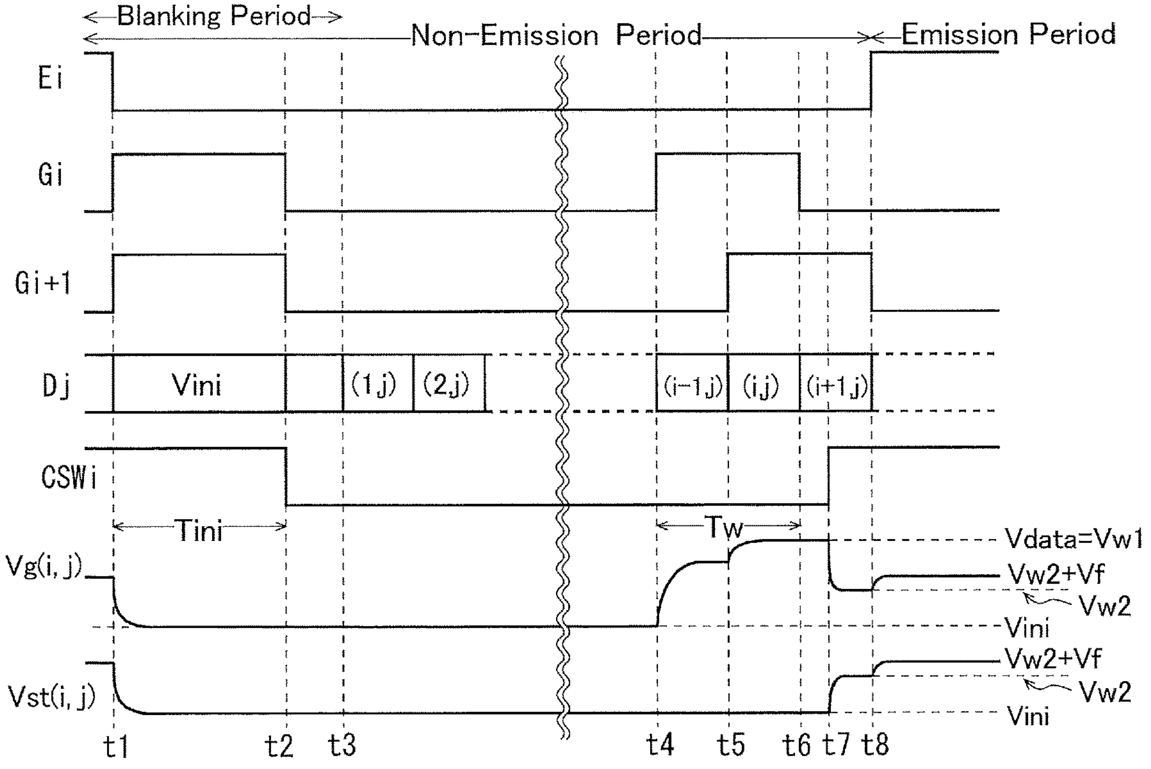
FIG. 3 is a signal waveform diagram for describing the operation of the pixel circuit according to the first configuration example in the first embodiment.

FIG. 2 is a circuit diagram illustrating a first configuration example of the pixel circuit in the present embodiment, and FIG. 3 is a signal waveform diagram for describing the operation of the pixel circuit 15*a* according to the first configuration example in the present embodiment.

FIG. 2 illustrates the configuration of the pixel circuit 15*a* corresponding to the ith scanning signal line Gi and the jth data signal line Dj, that is, the pixel circuit Pix(i,j) in the ith row and the jth column in the present embodiment (1≤i≤n, 1≤j≤m). The pixel circuit 15*a* includes an organic EL element OL as a display element, an auxiliary writing capacitor Cwa, a holding capacitor Cst, a drive transistor M1, a writing control transistor M2, a capacitance selection transistor M3, a first initialization transistor M4, and an emission control transistor M5. In the pixel circuit 15*a*, the transistors M2 to M5 except for the drive transistor M1 function as switching elements. All the transistors included in the pixel circuit 15*a* are N-channel transistors, but some or all of the transistors may be P-channel transistors (see FIGS. 16 and 18 to 21 to be described later). The emission control transistor M5 may be short-circuited and removed. Although the capacitance value of the auxiliary writing capacitor Cwa is smaller than the capacitance value of the holding capacitor Cst and corresponds to the parasitic capacitance Csc in the basic pixel circuit 15 illustrated in FIG. 30, the auxiliary writing capacitor Cwa may be a capacitor having a small capacitance value formed separately from the parasitic capacitance Ccs or may be a capacitor having a small capacitance value corresponding to synthetic capacitance of capacitance formed separately from the parasitic capacitance Ccs and the parasitic capacitance.

As illustrated in FIG. 2, the pixel circuit 15*a* is connected with a scanning signal line (corresponding scanning signal line) Gi corresponding to the pixel circuit 15*a*, a scanning signal line (a scanning signal line immediately subsequent in the scanning order of the scanning signal lines G1 to Gn+1 and hereinafter also referred to as "subsequent scanning signal line" in the description focusing on the pixel circuit) Gi+1 subsequent to the corresponding scanning signal line Gi, an emission control line (corresponding emission control line) Ei corresponding to the pixel circuit 15*a*, a data signal line (corresponding data signal line) Dj corresponding to the pixel circuit 15*a*, a capacitance selection signal line (hereinafter also referred to as "corresponding capacitance selection signal line" in the description focusing on the pixel circuit) CSWi corresponding to the pixel circuit 15*a*, an initialization voltage supply line INI, a high-level power supply line ELVDD, and a low-level power supply line ELVSS. In the present embodiment, for controlling the on/off of the capacitance selection transistor M3 in each pixel circuit 15*a, n* capacitance selection signal lines CSW1 to CSWn, respectively corresponding to the n scanning signal lines G1 to Gn, are disposed in the display portion 11. However, the emission control lines E1 to En may be used as the capacitance selection signal lines CSW1 to CSWn. In this case, it is not necessary to separately provide the capacitance selection signal lines CSW1 to CSWn in the display portion 11. The initialization voltage Vini may be a voltage different from the low-level power supply voltage ELVSS, but a voltage equal to the low-level power supply voltage ELVSS can be selected as the initialization voltage Vini. In this case, it is preferable that the initialization voltage supply line INI be not provided, and the low-level power supply line ELVSS be also used as the initialization voltage supply line INI.

As illustrated in FIG. 2, in the pixel circuit 15*a*, a drain terminal as the first conductive terminal of the drive transistor M1 is connected to the high-level power supply line ELVDD as a first power supply line via the emission control transistor M5, and a gate terminal as the control terminal of the drive transistor M1 is connected to the corresponding data signal line Dj via the writing control transistor M2 and is connected to the source terminal of the drive transistor M1 via the capacitance selection transistor M3 and the holding capacitor Cst connected in series with each other. A source terminal as the second conductive terminal of the drive transistor M1 is connected to the anode electrode of the organic EL element OL. The cathode electrode of the organic EL element OL is connected to the low-level power supply line ELVSS as a second power supply line. The auxiliary writing capacitor Cwa has a first terminal connected to the gate terminal of the drive transistor M1 and a second terminal connected to the source terminal of the drive transistor M1. Further, the gate terminals of the writing control transistor M2, the capacitance selection transistor M3, the first initialization transistor M4, and the emission control transistor M5 are connected to the corresponding scanning signal line Gi, the corresponding capacitance selection signal line CSWi, a subsequent scanning signal line Gi+1, and the corresponding emission control line Ei, respectively.

FIG. 3 illustrates changes in the voltages of the respective signal lines (corresponding emission control line Ei, corresponding scanning signal line Gi, subsequent scanning signal line Gi+1, corresponding data signal line Dj, and corresponding capacitance selection signal line CSWi), a gate voltage Vg of the drive transistor M1, and a voltage (hereinafter referred to as "holding capacitance voltage") Vst at a connection point between the holding capacitor Cst and the capacitance selection transistor M3 in the initialization operation, the data writing operation, and the emission operation of the pixel circuit Pix(i,j) in the ith row and the jth column which is the pixel circuit 15*a* illustrated in FIG. 2. In FIG. 3, "(k, j)" indicates that the voltage of the data signal line Dj is a data voltage Vdata to be written to a pixel circuit Pix(k,j) in the kth row and the jth column (k=1 to n) (the same applies to FIGS. 5, 7, 17, and 21 to be described later). In a case where the pixel circuit 15*a* (FIG. 2) according to the first configuration example is used in the present embodiment, as illustrated in FIG. 3, all the pixel circuits 15*a* are simultaneously initialized in the period from time t1 to time t2 in a blanking period every one frame period. Thus, the period from time t1 to time t2 is an initialization period Tini in the configuration example. Further, in FIG. 3, a period from time t4 to time t6 is a selection period for the ith scanning signal line Gi, that is, an ith scanning selection period, and a period from time t5 to time t8 is a selection period for the (i+1)th scanning signal line (subsequent scanning signal line) Gi+1, that is, an (i+1)th scanning selection period. As described later, the ith scanning selection period (t4 to t6) corresponds to a data writing period Tw for the pixel circuits Pix(i,1) to Pix(i,m) in the ith row. A period from the start time t1 of the initialization period Tini in the blanking period immediately before the data writing period Tw to the end time t8 of the subsequent scanning signal line Gi+1 is a non-emission period for the pixel circuits Pix(i,1) to Pix(i,m) in the ith row, and a period from time t8 to the start time of the initialization period Tini in the next blanking period is an emission period for the pixel circuits Pix(i,1) to Pix(i,m) in the ith row. In the example illustrated in FIG. 3, the end time (t8) of the non-emission period coincides with the end time of the selection period for the subsequent scanning signal line Gi+1, but the non-emission period may be ended after the end of the selection period for the subsequent scanning signal line Gi+1 (the same applies to FIGS. 5, 7, 11, and 17 to be described later).

In each pixel circuit Pix(i,j) (i=1 to n, j=1 to m), at the start time t1 of the initialization period Tini, as illustrated in FIG. 3, the voltages of the corresponding scanning signal line Gi and the subsequent scanning signal line Gi+1 change from the low level to the high level, and the voltage of the corresponding capacitance selection signal line CSWi is maintained at the high level. Thus, the writing control transistor M2 and the first initialization transistor M4 change from the off-state to the on-state, and the capacitance selection transistor M3 is maintained in the on-state. During the initialization period Tini, the initialization voltage Vini is applied from the data-side drive circuit 30 to each data signal line Dj (j=1 to m). Therefore, the initialization voltage Vini is provided to both ends of each of the auxiliary writing capacitor Cwa and the holding capacitor Cst, whereby the auxiliary writing capacitor Cwa and the holding capacitor Cst are initialized in the initialization period Tini (t1 to t2). That is, both the auxiliary writing capacitor Cwa and the holding capacitor Cst are discharged to come into a state where no charge is accumulated, and both the holding voltages in the auxiliary writing capacitor Cwa and the holding capacitor Cst become zero. As described above, in the present configuration example, the first initialization transistor M4 constitutes, together with the capacitance selection transistor M3 and the writing control transistor M2, the initialization circuit that discharges and initializes the holding capacitor Cst and the like in the initialization period Tini.

At the end time t2 of the initialization period Tini, the voltages of the corresponding scanning signal line Gi, the subsequent scanning signal line Gi+1, and the corresponding capacitance selection signal line CSWi change to the low level, and thereafter, the sequential scanning of the scanning signal lines G1 to Gn is started. Note that the voltage of the corresponding emission control line Ei is at the low level at the start time t1 of the initialization period Tini and is maintained at the low level until the end time t8 of the selection period ((i+1)th scanning selection period) of the subsequent scanning signal line Gi+1. Therefore, the organic EL element OL is in a non-emission state from time t1 to time t8.

In the pixel circuit Pix(i,j) in the ith row and the jth column, as illustrated in FIG. 3, at the start time t4 of the ith scanning selection period, the voltage of the corresponding scanning signal line Gi changes to the high level, whereby the writing control transistor M2 is turned on. Hence the voltage of the corresponding data signal line Dj, that is, the data voltage to be written to the pixel circuit Pix(i−1,j) in the (i−1)th row and the jth column, is provided to the gate terminal of the drive transistor M1 (the first terminal of the auxiliary writing capacitor Cwa). At time t4, the capacitance selection transistor M3 is maintained in the off-state, and the holding capacitor Cst is electrically disconnected from the gate terminal of the drive transistor M1. Accordingly, from time t4 to time t5, only the auxiliary writing capacitor Cwa is charged by the data voltage to be written to the pixel circuit Pix(i−1,j) in the (i−1)th row and the jth column, and the voltage corresponding to the data voltage is held as the writing voltage in the auxiliary writing capacitor Cwa. Thereafter, at time t5, the voltage of the corresponding data signal line Dj changes to a data voltage to be written to the pixel circuit Pix(i,j) in the ith row and the jth column, and only the auxiliary writing capacitor Cwa is charged with the data voltage. At this time, the voltage of the subsequent scanning signal line Gi+1 changes from the low level to the high level, and thereby the first initialization transistor M4 changes to the on-state, so that the initialization voltage Vini is provided to each of the second terminals of the auxiliary writing capacitor Cwa and the holding capacitor Cst (the terminals connected to the source terminal of the drive transistor M1). The initialization voltage Vini is also applied to the anode electrode of the organic EL element OL, and the parasitic capacitance (not illustrated) of the organic EL element OL is discharged.

Thereafter, at the end time t6 of the ith scanning selection period as the data writing period Tw, the voltage of the corresponding scanning signal line Gi changes to the low level, so that the writing control transistor M2 is turned off, and the gate terminal of the drive transistor M1 is electrically disconnected from the corresponding data signal line Dj. Further, at the subsequent time t7, the voltage of the corresponding capacitance selection signal line CSWi changes from the low level to the high level, whereby the capacitance selection transistor M3 is turned on. As a result, the holding capacitor Cst comes into the state of being connected in parallel to the auxiliary writing capacitor Cwa, and charges are redistributed among the parasitic capacitance Csc, and the holding capacitor Cst. By this charge redistribution, the gate voltage Vg becomes a voltage lower than the data voltage Vdata written to the auxiliary writing capacitor Cwa in the data writing period Tw (t4 to t6). Here, when Vdata written to the auxiliary writing capacitor Cwa in the data writing period Tw is Vw1, the gate voltage Vg(i, j) of the drive transistor M1 and the holding capacitance voltage Vst(i, j) after the charge redistribution are voltages Vw2 expressed by Equation (6) below. Note that symbol "Vg(i, j)" is used in a case where the gate voltage Vg in the pixel circuit Pix(i,j) is distinguished from the gate voltage Vg in another pixel circuit, and symbol "Vst(i, j)" is used in a case where the holding capacitance voltage Vst in the pixel circuit Pix(i,j) is distinguished from the holding capacitance voltage Vst in another pixel circuit (the same applies hereinafter).

$$Vw2=\{Cwa/(Cwa+Cst)\}(Vw1-Vini)+Vini \quad (6)$$

At this time, the gate-source voltage Vgs in the drive transistor M1 corresponds to the voltage held in the holding capacitor Cst and is expressed by the following equation:

$$Vgs=Vw2-Vini=\{Cwa/(Cwa+Cst)\}(Vw1-Vini) \quad (7)$$

When the capacitance selection transistor M3 is in the on-state, the holding capacitor Cst and the auxiliary writing capacitor Cwa are in the state of being connected in parallel, and it can be said that the gate-source voltage Vgs corresponds to the voltage held by the holding capacitor Cst and the auxiliary writing capacitor Cwa.

Thereafter, at time t8, the voltage of the subsequent scanning signal line Gi+1 changes to the low level, and thereby the first initialization transistor M4 is turned off. At time t8, the voltage of the corresponding emission control line Ei changes from the low level to the high level, and thereby the emission control transistor M5 changes to the on-state. Hence a current flows from the high-level power supply line ELVDD to the low-level power supply line ELVSS via the drive transistor M1 and the organic EL element OL, the organic EL element emits light, and an emission period starts from time t8 until the initialization operation is started in the next blanking period. When the light emission of the organic EL element OL starts, the gate voltage Vg and the holding capacitance voltage Vst change from Vw2 to Vw2+Vf, but the gate-source voltage Vgs in the drive transistor M1, that is, the holding voltage of the holding capacitor Cst, does not change (see Equation (7) above). Here, Vf is a forward voltage of the organic EL element OL.

The drive transistor M1 is an N-channel transistor and operates in a saturation region during this emission period, and a current corresponding to a voltage held in the holding capacitor Cst, that is, a gate-source voltage Vgs, flows between the source and the drain, and the current also flows through the organic EL element OL as a drive current Id. The drive current Id is given by Equation (8) below. A gain β of the drive transistor M1 included in Equation (8) is given by Equation (9) below:

$$Id=(\beta/2)(Vgs-Vth)^2=(\beta/2)(Vw2-Vini-Vth)^2 \quad (8)$$

$$\beta=\mu\times(W/L)\times Cox \quad (9)$$

In Equations (8) and (9) above, Vth, ρ, W, L, and Cox represent the threshold voltage, mobility, gate width, gate length, and gate insulating film capacitance per unit area of the drive transistor M1, respectively.

The organic EL element OL emits light in accordance with the drive current Id, and this light emission continues until the initialization operation is started in the next blanking period.

Similarly, in the other pixel circuits, the initialization operation, the data writing operation, and the emission operation are performed in accordance with the sequential scanning of the scanning signal lines G1 to Gn+1 in each frame period (see FIG. 3). As a result, an image represented by the image data in the input signal Sin from the outside is displayed on the display portion 11.

<1.5 Actions and Effects>

As described above, according to the present embodiment, in each pixel circuit 15*a*, the voltage of the data signal D(j) is written as the data voltage Vdata to the auxiliary writing capacitor Cwa having a smaller capacitance value than the holding capacitor Cst, and thereafter, the capacitance selection transistor M3 is changed to the on-state, and thereby charges are redistributed between the auxiliary writing capacitor Cwa and the holding capacitor Cst, so that the voltage held in the holding capacitor Cst for driving the organic EL element OL (hereinafter referred to as "driving holding voltage") is determined. Therefore, when the voltage to be written to the holding capacitor Cst for causing the organic EL element OL to emit light with desired luminance in each pixel circuit 15*a* is Vw2, the data voltage Vdata to be written to the auxiliary writing capacitor Cwa of the pixel circuit 15*a* from the corresponding data signal line Dj can be calculated from Equation (6) as follows:

$$Vdata=Vw1=\{(Cwa+Cst)/Cwa\}(Vw2-Vini)+Vini=Vw2+(Cst/Cwa)(Vw2-Vini) \quad (10)$$

Here, since Cst>Cwa and Vw2>Vini, the data voltage Vdata is larger than the driving holding voltage Vw2 to be held by the holding capacitor Cst. Therefore, the data voltage Vdata (=Vw1), that is, the voltage to be applied from the data-side drive circuit 30 to the data signal line Dj, becomes higher than before. However, the time constant in the charging of the auxiliary writing capacitor Cwa by the writing of the data voltage Vdata is determined in accordance with the capacitance value of the auxiliary data writing capacitor Cwa regardless of the capacitance value of the holding capacitor Cst and is smaller than that in the related art (see Equation (2) above). As a result, the charging speed in the data writing is improved. Therefore, according to the present embodiment, it is possible to prevent deterioration in display quality due to insufficient charging while using the holding capacitor Cst having a large capacitance value so as to stabilize the driving holding voltage.

According to the present embodiment, in each pixel circuit 15*a*, the gate terminal of the first initialization transistor element M4 is connected to the subsequent scanning signal line Gi+1, and the first initialization transistor element M4 is turned on before the time point t6 at which the writing control transistor M2 changes from the on-state to the off-state, and is turned off after the time point t6 (see FIG. 3). Thereby, a voltage Vw1−Vini corresponding to the difference between the voltage of the data signal line Dj (data voltage Vdata=Vw1) and the initialization voltage Vini is reliably held in the auxiliary writing capacitor Cwa.

When the signal of the capacitance selection signal line CSWi changes to the active state in the emission period, charges are redistributed between the auxiliary writing capacitor Cwa and the holding capacitor Cst in the emission period, and the organic EL element OL may emit light in a state where the potential (gate voltage) Vg of the gate terminal of the drive transistor M1 is high, whereby the lifetime of the organic EL element OL may be shortened, or the luminance thereof may be brighter than the desired luminance. However, in the present embodiment, the double-pulse driving is performed, and in each pixel circuit 15*a*, the signal of the corresponding capacitance selection signal line changes to the active state after the corresponding scanning signal line Gi changes to the unselected state and before the subsequent scanning signal line Gi+1 changes to the unselected state (see FIG. 3). Therefore, the charges are redistributed in the non-emission period, and it is thereby possible to avoid such problems regarding the lifetime and the luminance of the organic EL element OL.

<1.6 Other Configuration Examples of Pixel Circuit>

As the pixel circuit in the present embodiment, a pixel circuit having a configuration except for the first configuration example illustrated in FIG. 2 can also be used. For example, any one of pixel circuits according to the second to fifth configuration examples described below may be used.

<1.6.1 Second Configuration Example>

Figure 4:
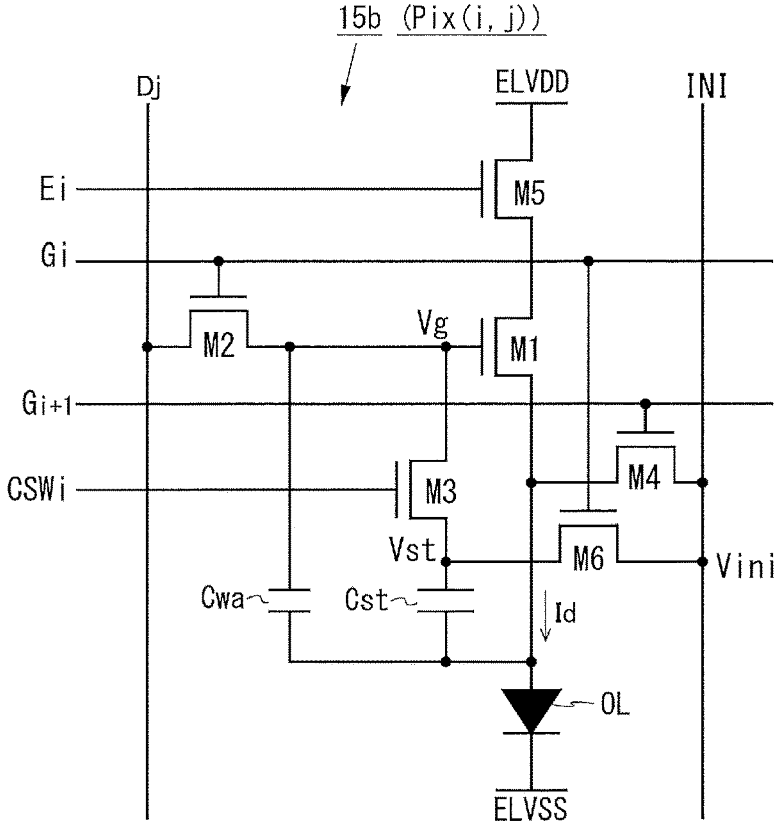
FIG. 4 is a circuit diagram illustrating a second configuration example of a pixel circuit in the first embodiment.
Figure 5:
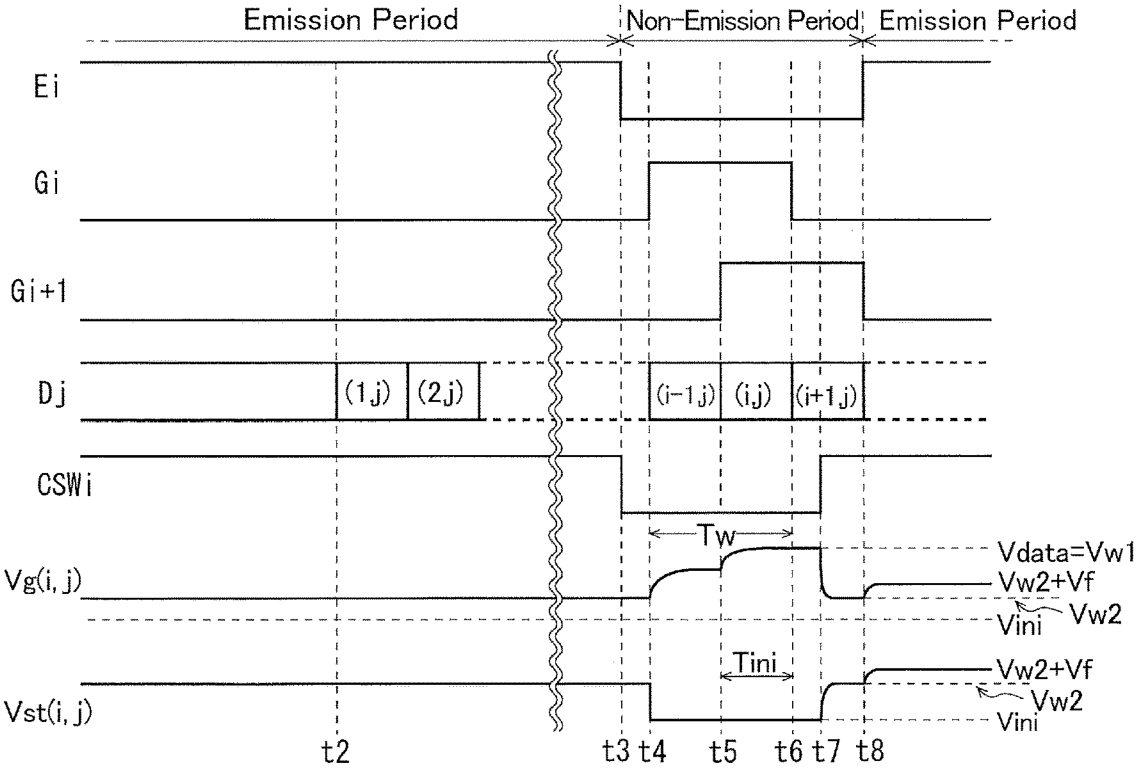
FIG. 5 is a signal waveform diagram for describing the operation of the pixel circuit according to the second configuration example in the first embodiment.

FIG. 4 is a circuit diagram illustrating the second configuration example of the pixel circuit in the present embodiment, and FIG. 5 is a signal waveform diagram for describing the operation of the pixel circuit according to the second configuration example in the present embodiment.

As illustrated in FIG. 4, a pixel circuit 15*b* according to the present configuration example is similar to the pixel circuit 15*a* according to the first configuration example in the present embodiment except that the pixel circuit 15*b* includes a second initialization transistor M6 having a gate terminal connected to the corresponding scanning signal line Gi (see FIG. 2), the same portions are denoted by the same reference numerals, and the description thereof is omitted. In the pixel circuit Pix(i,j) in the ith row and the jth column, which is the pixel circuit 15*b* according to the present configuration example, the second initialization transistor M6 functions as a switching element, and the connection point between the capacitance selection transistor M3 and the holding capacitor Cst (the first terminal of the holding capacitor Cst) is connected to the initialization voltage supply line INI via the second initialization transistor M6.

In a case where the pixel circuit 15*b* according to the present configuration example is used, the data-side drive circuit 30 and the scanning-side drive circuit 40 are configured to drive the data signal lines D1 to Dm, the scanning signal lines G1 to Gn+1, the emission control lines $E_1$ to En, and the capacitance selection signal lines CSW1 to CSWn as illustrated in FIG. 5.

FIG. 5 illustrates changes in the voltages of the respective signal lines (corresponding emission control line Ei, corresponding scanning signal line Gi, subsequent scanning signal line Gi+1, corresponding data signal line Dj, and corresponding capacitance selection signal line CSWi), the gate voltage Vg of the drive transistor M1, and the voltage (holding capacitance voltage) Vst at the connection point between the holding capacitor Cst and the capacitance selection transistor M3 in the initialization operation, the data writing operation, and the emission operation of the pixel circuit Pix(i,j) in the ith row and the jth column which is the pixel circuit 15*b* according to the present configuration example illustrated in FIG. 4. As illustrated in FIG. 5, in the case where the pixel circuit 15*b* according to the present configuration example is used, not all the pixel circuits 15*b* in the display portion 11 are initialized at the same time, but each pixel circuit 15*b* is initialized at different timing for each row of the pixel circuits. That is, in each pixel circuit 15*b*, the initialization operation is performed in a period t5 to t6 included in the data writing period Tw (t4 to t6). Hereinafter, details of the operation of the pixel circuit 15*b* according to the present configuration example will be described with reference to FIG. 5.

In the case where the pixel circuit 15*b* according to the present configuration example is used, the voltage of the corresponding emission control line Ei is at the low level (inactive) only in a predetermined period including the selection period for the corresponding scanning signal line Gi and the selection period for the subsequent scanning signal line Gi+1 and is at the high level (active) in the other periods. That is, a period from the time t3 immediately before the data writing period Tw to the end time t8 of the subsequent scanning signal line Gi+1 is the non-emission period of the pixel circuits Pix(i,1) to Pix(i,m) in the ith row, and a period from the time t8 to immediately before the data writing period Tw in the next frame period is the emission period of the pixel circuits Pix(i,1) to Pix(i,m) in the ith row.

As illustrated in FIG. 5, at time t3, the voltage of the corresponding emission control line Ei changes from the high level to the low level, so that the emission control transistor M5 changes to the off-state, and the voltage of the corresponding capacitance selection signal line CSWi changes from the high level to the low level, so that the capacitance selection transistor M3 changes to the off-state.

Thereafter, at the start time t4 of the ith scanning selection period t4 to t6 as the data writing period Tw, the voltage of the corresponding scanning signal line Gi changes to the high level, whereby the writing control transistor M2 is turned on. The voltages of the corresponding scanning signal line Gi, the subsequent scanning signal line Gi+1, the corresponding data signal line Dj, and the corresponding capacitance selection signal line CSWi from time t4 to the end time t8 of the (i+1)th scanning selection period t5 to t8 change as in the case of the first configuration example, and hence the gate voltage Vg also changes as in the case of the first configuration example (see FIGS. 3 and 4). However, the gate voltage Vg at time t4 is equal to the initialization voltage Vini in the first configuration example but is equal to the gate voltage corresponding to the driving holding voltage in the immediately preceding frame period in the present configuration example.

Further, at time t4, the voltage of the corresponding scanning signal line Gi changes to the high level, whereby the second initialization transistor M6 is also turned on. Thus, the holding capacitance voltage (the voltage at the connection point between the holding capacitor Cst and the capacitance selection transistor M3) Vst changes to the initialization voltage Vini.

Thereafter, at the start time t5 of the (i+1)th scanning selection period t5 to t8, the voltage of the subsequent scanning signal line Gi+1 changes to the high level, and thereby the first initialization transistor M4 is turned on. Therefore, the holding capacitor Cst is discharged via the first initialization transistor M4 and the second initialization transistor M6, and the holding voltage of the holding capacitor Cst is initialized to zero in the initialization period Tini(t5 to t6). As described above, in the present configuration example, the first initialization transistor M4 and the second initialization transistor M6 constitute the initialization circuit that discharges and initializes the holding capacitor Cst and the like in the initialization period Tini. That is, in the initialization period Tini, the first initialization transistor M4 and the second initialization transistor M6 constitute a holding capacitor discharge switching element that discharges and initializes the holding capacitor Cst.

Further, at the subsequent time t7, the voltage of the corresponding capacitance selection signal line CSWi changes from the low level to the high level, whereby the capacitance selection transistor M3 is turned on. The voltages of the corresponding scanning signal line Gi, the subsequent scanning signal line Gi+1, the corresponding data signal line Dj, and the corresponding capacitance selection signal line CSWi from time t7 to the end time t8 of the (i+1)th scanning selection period t5 to t8 change as in the case of the first configuration example, and hence the gate voltage Vg and the holding capacitance voltage Vst changes as in the case of the first configuration example (see FIGS. 3 and 5).

Thereafter, at time t8, as in the case of the first configuration example, the voltage of the subsequent scanning signal line Gi+1 changes to the low level, so that the first initialization transistor M4 is turned off, and the voltage of the corresponding emission control line Ei changes from the low level to the high level, so that the emission control transistor M5 changes to the on-state. As a result, in the present configuration example as well, the drive current Id given by Equation (8) above flows through the drive transistor M1 and the organic EL element OL. The organic EL element OL emits light in accordance with the drive current Id, and this light emission continues until immediately before the selection period for the corresponding scanning signal line Gi in the next frame period.

In the other pixel circuits as well, the initialization operation, the data writing operation, and the emission operation are performed in accordance with the sequential scanning of the scanning signal lines G1 to Gn+1 in each frame period (see FIG. 4). As a result, an image represented by the image data in the input signal Sin from the outside is displayed on the display portion 11.

According to the display device using the pixel circuit 15$b$ according to the present configuration example as described above, similar effects to those of the display device using the pixel circuit 15$a$ according to the first configuration example can be obtained. In addition, since the initialization of (the holding capacitor Cst in) each pixel circuit 15$b$ is performed in the period t5 to t6 included in the data writing period Tw (t4 to t6), the emission period becomes long to improve the display quality as compared to the display device using the pixel circuit 15$a$ according to the first configuration example.

<1.6.2 Third Configuration Example>

Figure 6:
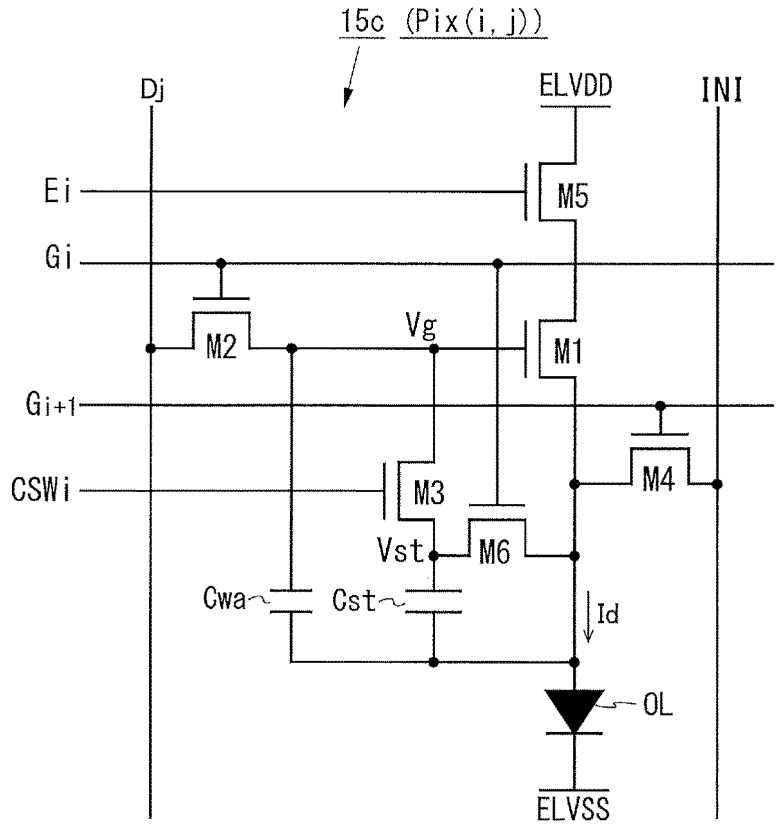
FIG. 6 is a circuit diagram illustrating a third configuration example of a pixel circuit in the first embodiment.
Figure 7:
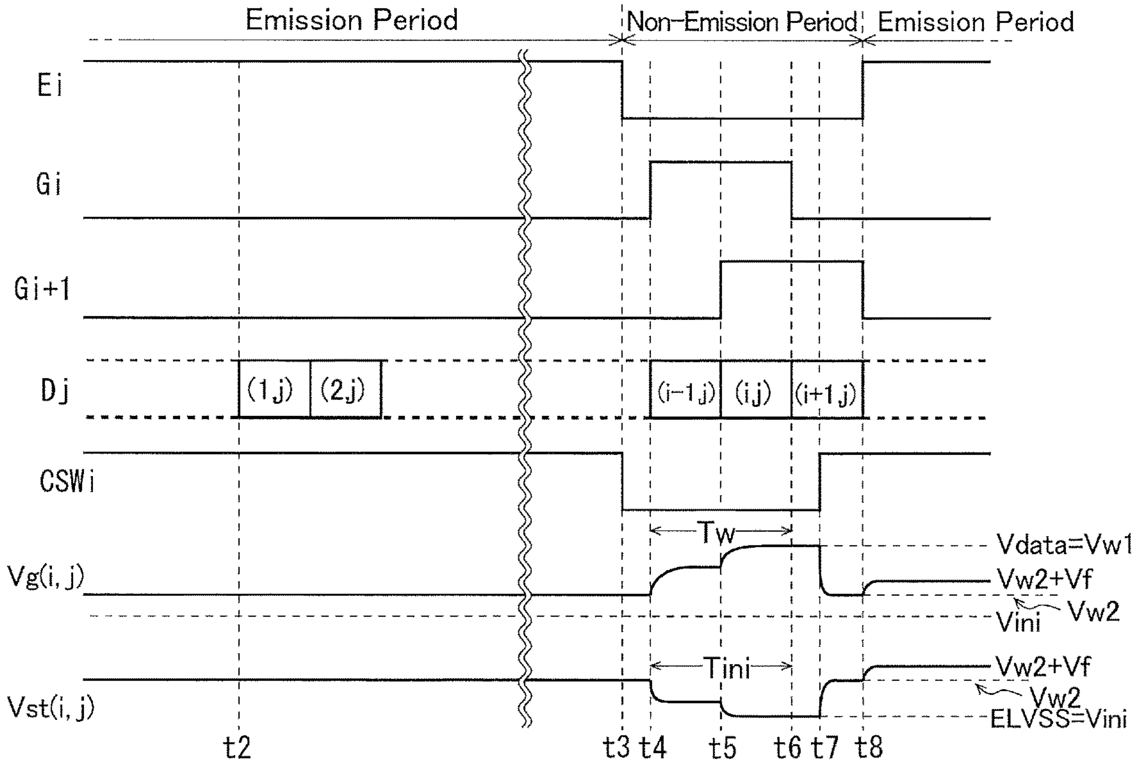
FIG. 7 is a signal waveform diagram for describing the operation of the pixel circuit according to the third configuration example in the first embodiment.

FIG. 6 is a circuit diagram illustrating a third configuration example of the pixel circuit in the present embodiment, and FIG. 7 is a signal waveform diagram for describing the operation of the pixel circuit according to the third configuration example in the present embodiment.

As illustrated in FIG. 6, in a pixel circuit 15$c$ according to the present configuration example, one (drain terminal) of the conductive terminals of the second initialization transistor M6 is connected to the connection point between the capacitance selection transistor M3 and the holding capacitor Cst, the other (source terminal) is connected to the source terminal of the drive transistor M1, and in this respect, the pixel circuit 15$c$ is different from the case of the second configuration example (see FIG. 4). However, since the other configurations of the display device using the pixel circuit 15$c$ according to the present configuration example are the same as those of the display device using the pixel circuit 15$b$ according to the second configuration example, the same portions are denoted by the same reference numerals, and the description thereof is omitted.

As illustrated in FIG. 6, in the pixel circuit 15$c$ according to the present configuration example, the first terminal and the second terminal of the holding capacitor Cst are connected to each other via the second initialization transistor M6, and the gate terminal of the second initialization transistor M6 is connected to the corresponding scanning signal line Gi. Therefore, as illustrated in FIG. 7, in the selection period (t4 to t6) of the corresponding scanning signal line Gi, the holding capacitor Cst is discharged via the second initialization transistor M6, and the holding voltage of the holding capacitor Cst is initialized to zero. That is, the second initialization transistor M6 functions as a holding capacitor discharge switching element that discharges the holding capacitor Cst (the same applies to a fourth configuration example illustrated in FIG. 8 to be described later). Therefore, in the pixel circuit 15$c$ according to the present configuration example, the period from time t4 to time t6 corresponding to the data writing period Tw also corresponds to the initialization period Tini, and in this respect, the pixel circuit 15$c$ is different from the pixel circuit 15$b$ according to the second configuration example described above in which the period from time t5 to t6 is the initialization period Tini. However, as can be seen from FIG. 7, in the initialization period Tini, the holding capacitance voltage Vst is slightly different from that in the case of the second configuration example, but the gate voltage Vg changes as in the case of the second configuration example, and the emission period is also similar to that in the case of the second configuration example (see FIG. 5). Thus, also, in the display device using the pixel circuit 15$c$ according to the present configuration example, similar effects to those of the display device using the pixel circuit 15$b$ according to the second configuration example can be obtained. As described above, in the present configuration example, the first initialization transistor M4 and the second initialization transistor M6 constitute the initialization circuit that discharges and initializes the holding capacitor Cst and the like in the initialization period Tini.

<1.6.3 Fourth Configuration Example>

Figure 8:
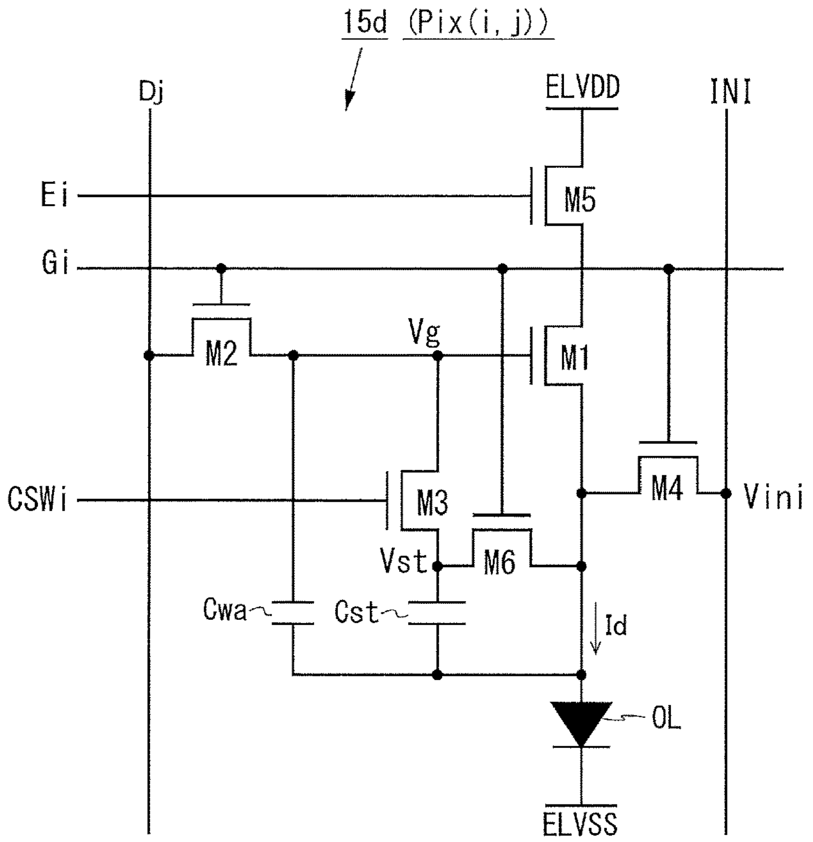
FIG. 8 is a circuit diagram illustrating a fourth configuration example of a pixel circuit in the first embodiment.
Figure 9:
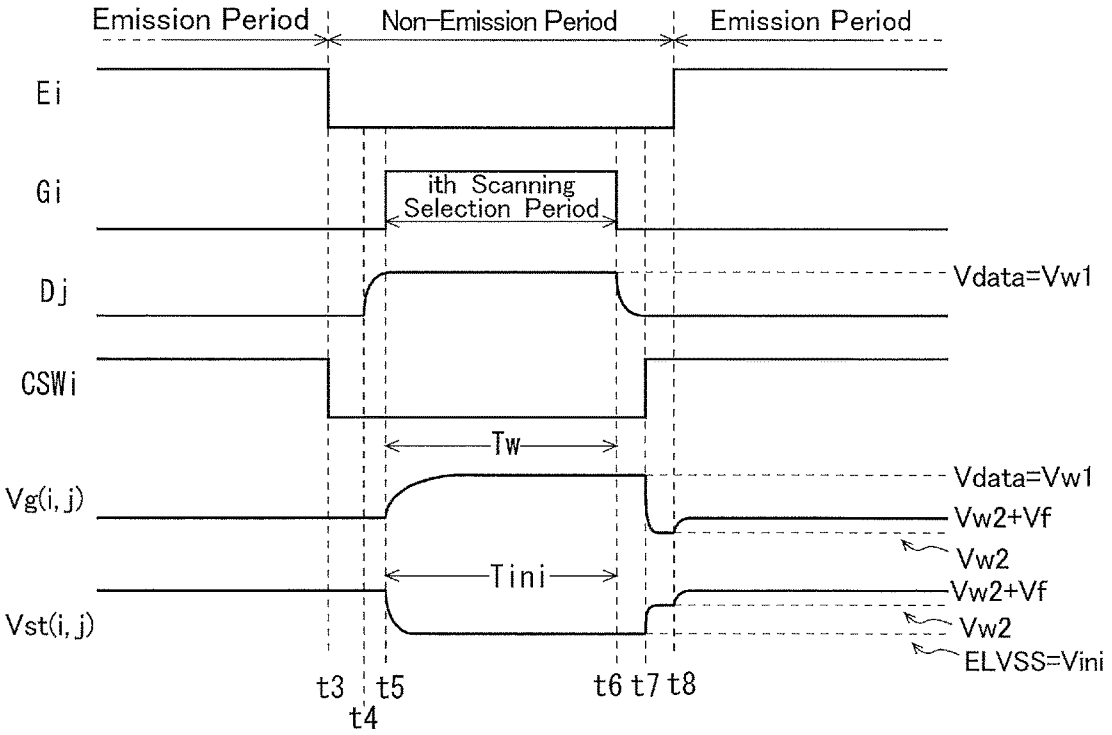
FIG. 9 is a signal waveform diagram for describing the operation of the pixel circuit according to the fourth configuration example in the first embodiment.

FIG. 8 is a circuit diagram illustrating a fourth configuration example of the pixel circuit in the present embodiment, and FIG. 9 is a signal waveform diagram for describing the operation of the pixel circuit according to the fourth configuration example in the present embodiment.

As illustrated in FIG. 8, in the pixel circuit 15$d$ according to the present configuration example, the gate terminals of the first and second initialization transistors M4, M6 are both connected to the corresponding scanning signal line Gi, and in this respect, the pixel circuit 15$d$ is different from the pixel circuit 15$c$ according to the third configuration example in that (see FIG. 6). Since the other configurations of the pixel circuit 15$d$ according to the present configuration example are similar to those of the pixel circuit 15$c$ according to the third configuration example, the same portions are denoted by the same reference numerals, and the description thereof is omitted.

FIG. 9 illustrates changes in the voltages of the respective signal lines (corresponding emission control line Ei, corresponding scanning signal line Gi, corresponding data signal line Dj, and corresponding capacitance selection signal line CSWi), the gate voltage Vg of the drive transistor M1, and the holding capacitance voltage Vst in the initialization operation, the data writing operation, and the emission operation of the pixel circuit Pix(i,j) in the ith row and the jth column which is the pixel circuit 15$d$ according to the present configuration example illustrated in FIG. 8. As illustrated in FIG. 9, the method for driving the display device using the pixel circuit 15$d$ according to the present configuration example is different from the display device using the pixel circuit 15$c$ according to the third configuration example. That is, in the display device using the pixel circuit 15$d$ according to the present configuration example, the scanning signal lines G1 to Gn are disposed in the display portion 11, and the scanning-side drive circuit 40 is configured to sequentially and alternately select the scanning signal lines G1 to Gn for one horizontal period each in each frame period (hereinafter, such driving of the scanning signal line is referred to as "single-pulse driving" so as to be distinguished from the driving of the scanning signal line in the display device using the pixel circuits according to the first to third configuration examples). In addition, the data-side drive circuit 30 is configured to drive the data signal lines D1 to Dm in conjunction with such driving of the scanning signal lines G1 to Gn.

In FIG. 9, a period from time t3 to time t8 is a non-emission period for the pixel circuits Pix(i,1) to Pix(i,m) in the ith row. A period from time t4 to time t6 is an ith horizontal period, and a period from time t5 to time t6 is a selection period for the ith scanning signal line (corresponding scanning signal line) Gi, that is, an ith scanning selection period. The ith scanning selection period corresponds to the data writing period Tw for the pixel circuits Pix(i,1) to Pix(i,m) in the ith row and also corresponds to the initialization period Tini therefor.

In the pixel circuit Pix(i,j) in the ith row and the jth column, when the voltage of the emission control line Ei changes from the high level to the low level at time t3 as illustrated in FIG. 9, the emission control transistor M5 changes from the on-state to the off-state, and the organic EL element OLED comes into the non-emission state. In addition, at time t3, when the voltage of the corresponding capacitance selection signal line CSWi changes from the high level to the low level, the capacitance selection transistor M3 also changes from the on-state to the off-state, and the holding capacitor Cst is electrically disconnected from the gate terminal of the drive transistor M1.

The data-side drive circuit 30 starts the application of the data signal D(j) as the data voltage of the pixel in the ith row and the jth column to the data signal line Dj during a period from when the scanning signal line (preceding scanning signal line) Gi−1 immediately before the corresponding scanning signal line Gi comes into the unselected state to when the corresponding scanning signal line Gi comes into the selected state, that is, at time t4 between the end time point of the (i−1)th scanning selection period and the start time point of the ith scanning selection period, and continues at least until the end time point t6 of the ith scanning selection period.

At time t5, the voltage of the corresponding scanning signal line Gi changes from the low level to the high level, and the corresponding scanning signal line Gi comes into the selected state, so that the writing control transistor M2 and the first initialization transistor M4 change to the on-state. At this time, the capacitance selection transistor M3 maintains the off-state. Thus, the voltage of the corresponding data signal line Dj, that is, the voltage of the data signal D(j), is provided as the data voltage Vdata to the auxiliary writing capacitor Cwa via the writing control transistor M2 but is not provided to the holding capacitor Cst. As a result, as illustrated in FIG. 9, only the auxiliary writing capacitor Cwa is charged, the gate voltage Vg(i, j) reaches the target potential (the voltage to be written to the pixel circuit Pix(i,j)) Vdata=Vw1 at the end time t6 of the selection period for the corresponding scanning signal line Gi, and the voltage Vw1−Vini is held in the auxiliary writing capacitor Cwa. In addition, the first initialization transistor M4 changes to the on-state, and thereby the initialization voltage Vini is applied to the anode electrode of the organic EL element OL. As a result, the parasitic capacitance of the organic EL element OL is discharged, and the voltage (anode voltage) Va of the anode electrode of the organic EL element is initialized to the initialization voltage Vini. Further, the corresponding scanning signal line Gi comes into the selected state at time t5, so that the second initialization transistor M6 also changes to the on-state. Thereby, the initialization voltage Vini is also provided to the first terminal of the holding capacitor Cst (the connection point between the holding capacitor Cst and the capacitance selection transistor M3) via the first and second initialization transistors M4, M6, and both ends of the holding capacitor Cst are short-circuited by the second initialization transistor M6. As a result, the holding capacitor Cst is discharged, and its holding voltage is initialized to zero. Here, it is assumed that the initialization voltage Vini is equal to the low-level power supply voltage ELVSS. As described above, in the present configuration example, the first initialization transistor M4 and the second initialization transistor M6 constitute the initialization circuit that discharges and initializes the holding capacitor Cst and the like in the initialization period Tini.

As described above, in the selection period (t5 to t6) of the corresponding scanning signal line Gi, that is, the data writing period Tw, the data voltage Vdata=Vw1 is written only to the auxiliary writing capacitor Cwa in the pixel circuit Pix(i,j), and thereafter, at time t6, the voltage of the corresponding scanning signal line Gi changes to the low level, whereby the writing control transistor M2 is turned off. As described above, since the holding capacitor Cst is discharged and initialized in the selection period (t5 to t6) of the corresponding scanning signal line Gi, the period (t5 to t6) also corresponds to the initialization period Tini.

At time t7 after the selection period (t5 to t6) of the corresponding scanning signal line Gi, the voltage of the corresponding capacitance selection signal line CSWi changes from the low level to the high level, whereby the capacitance selection transistor M3 is turned on. As a result, the holding capacitor Cst comes into the state of being connected in parallel to the auxiliary writing capacitor Cwa, and charges are redistributed among the parasitic capacitance Csc and the holding capacitor Cst. By this charge redistribution, as in the case of using the pixel circuits according to the first to third configuration examples, the voltage Vg(i, j) of the gate terminal in the drive transistor M1 and the holding capacitance voltage Vst(i, j) become the voltage Vw2 expressed by Equation (6) above.

Thereafter, at time t8, the voltage of the emission control line Ei changes to the high level, so that the emission control transistor M5 changes to the on-state. Therefore, after time t8, a drive current Id flows from the high-level power supply line ELVDD to the low-level power supply line ELVSS via the emission control transistor M5, the drive transistor M1, and the organic EL element OL, and the organic EL element OL emits light by the drive current Id. The light emission of the organic EL element OL by the drive current Id continues until immediately before the start of the data writing operation and the initialization operation in the next frame period.

Similarly, in the other pixel circuits, the initialization operation, the data writing operation, and the emission operation are performed in accordance with the sequential scanning of the scanning signal lines G1 to Gn in each frame period (see FIG. 9). As a result, an image represented by the image data in the input signal Sin from the outside is displayed on the display portion 11.

As described above, also, in the display device using the pixel circuit according to the present configuration example that performs the single-pulse driving, in the data writing period Tw, the auxiliary writing capacitor Cwa having a small capacitance value is charged at the data voltage Vdata=Vw1, and thereafter, the charges are redistributed between the auxiliary writing capacitor Cwa and the holding capacitor Cst having a larger capacitance value than the auxiliary writing capacitor Cwa, whereby the driving holding voltage as the gate-source voltage Vgs of the drive transistor M1 is determined. As a result, similarly to the display device using the pixel circuit according to another configuration example in which the double-pulse driving is performed, it is possible to prevent deterioration in display quality due to insufficient charging while using the holding capacitor Cst having a large capacitance value.

<1.6.4 Fifth Configuration Example>

Figure 10:
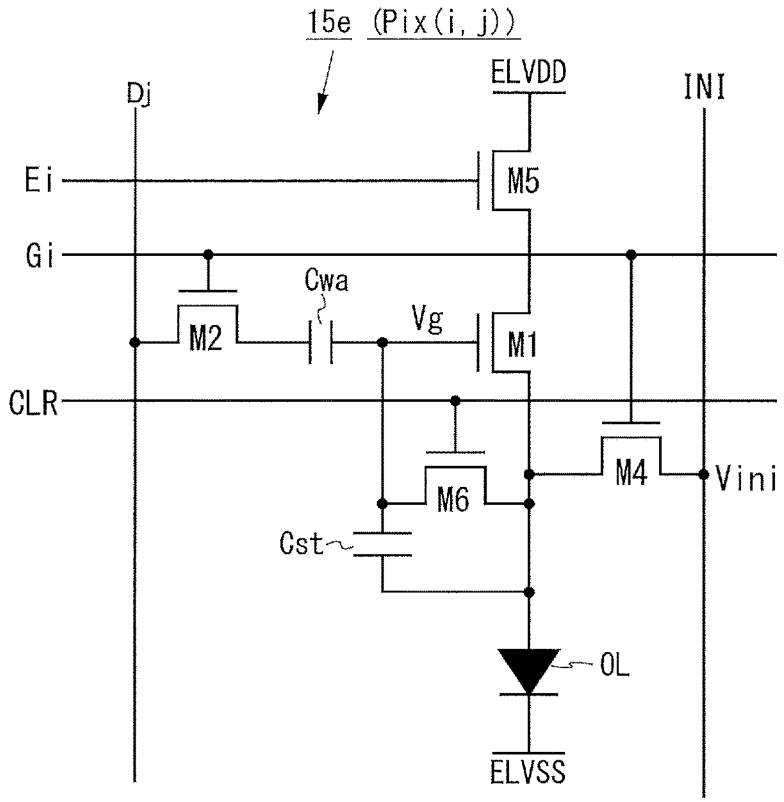
FIG. 10 is a circuit diagram illustrating a fifth configuration example of a pixel circuit in the first embodiment.
Figure 11:
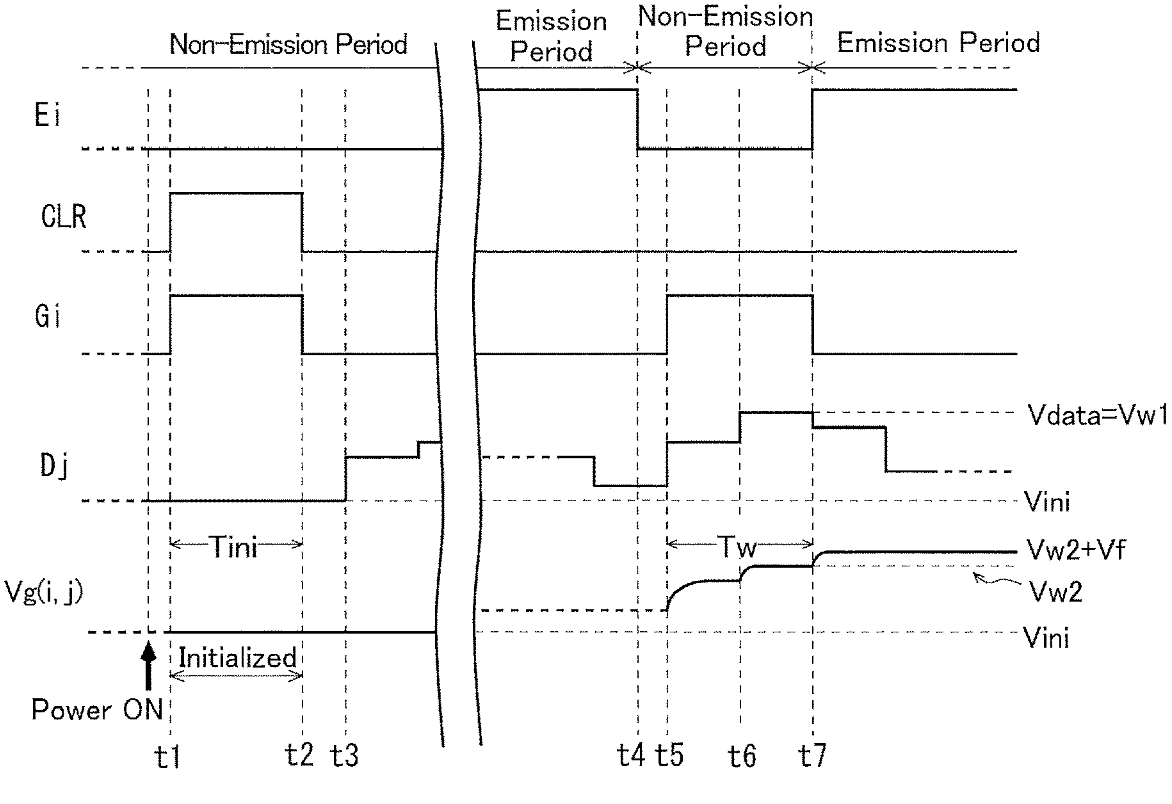
FIG. 11 is a signal waveform diagram for describing the operation of the pixel circuit according to the fifth configuration example in the first embodiment.

FIG. 10 is a circuit diagram illustrating a fifth configuration example of the pixel circuit in the present embodiment, and FIG. 11 is a signal waveform diagram for describing the operation of the pixel circuit according to the fifth configuration example in the present embodiment.

As illustrated in FIG. 10, similarly to the fourth configuration example, a pixel circuit 15*e* according to the present configuration example includes an auxiliary writing capacitor Cwa, a holding capacitor Cst, a drive transistor M1, a writing control transistor M2, a first initialization transistor M4, an emission control transistor M5, and a second initialization transistor M6 in addition to the organic EL element OL. However, in the present configuration example, the auxiliary writing capacitor Cwa and the holding capacitor Cst are connected in series with each other, and in this respect, the present configuration example is different from the other configuration examples described above (FIGS. 2, 4, 6, and 8) in which the auxiliary writing capacitor Cwa and the holding capacitor Cst are connected in parallel. Further, the pixel circuit 15*e* according to the present configuration example does not include the capacitance selection transistor M3, and charge redistribution is not performed between the auxiliary writing capacitor Cwa and the holding capacitor Cst. In a case where the pixel circuit 15*e* according to the present configuration example is used, the capacitance selection signal lines CSW1 to CSWn are not provided, but an initialization signal line CLR for transmitting an initialization signal used in an initialization operation to be described later is disposed in the display portion 11.

Specifically, in the pixel circuit 15*e* according to the present configuration example, as in the other configuration examples described above, the drain terminal of the drive transistor M1 is connected to the high-level power supply line ELVDD via the emission control transistor M5, and the source terminal of the drive transistor M1 is connected to the low-level power supply line ELVSS via the organic EL element OL. Unlike the other configuration examples described above, the gate terminal of the drive transistor M1 is connected to the corresponding data signal line Dj via the auxiliary writing capacitor Cwa and the writing control transistor M2 connected in series with each other in order and is connected to the source terminal of the drive transistor M1 via the holding capacitor Cst. Thereby, the auxiliary writing capacitor Cwa and the holding capacitor Cst are connected in series with each other, and the gate terminal of the drive transistor M1 is connected to the connection point between the auxiliary writing capacitor Cwa and the holding capacitor Cst. The gate terminal of the drive transistor M1 is also connected to the source terminal via the second initialization transistor M6, and the second initialization transistor M6 and the holding capacitor Cs are connected in parallel to each other. The gate terminals of the writing control transistor M2 and the first initialization transistor M4 are connected to the corresponding scanning signal line Gi, the gate terminal of the light emission control transistor M5 is connected to the corresponding light emission control line Ei, and the gate terminal of the second initialization transistor M6 is connected to the initialization signal line CLR.

Since the other configurations of the display device using the pixel circuit 15*e* according to the present configuration example are substantially similar to those of the display device using the pixel circuit 15*d* and the like according to the fourth configuration example, the same or corresponding portions are denoted by the same reference numerals, and a detailed description thereof is omitted. In the display device using the pixel circuit 15*e* according to the present configuration example, the scanning signal lines G1 to Gn can be driven by either the single-pulse driving or the double-pulse driving, but in the following description, it is assumed that the double-pulse driving is performed.

FIG. 11 illustrates changes in the voltages of the respective signal lines (corresponding light emission control line Ei, corresponding scanning signal line Gi, corresponding data signal line Dj, and initialization signal line CLR) and the gate voltage Vg of the drive transistor M1 in the initialization operation, the data writing operation, and the emission operation of the pixel circuit Pix(i,j) in the ith row and the jth column which is the pixel circuit 15*e* according to the present configuration example illustrated in FIG. 10. In FIG. 11, a period from time t1 to time t2 is the initialization period Tini, and a period from time t5 to time t7, that is, the selection period (ith scanning selection period) of the corresponding scanning signal line Gi, is the data writing period Tw. A period from time t4 immediately before the selection period for the corresponding scanning signal line Gi to end time t7 of the selection period is the non-emission period, and periods except for a predetermined period immediately after the power is turned on (including the initialization period Tini) are the emission periods.

As illustrated in FIG. 11, in the display device using the pixel circuit 15*e* according to the present configuration example, the initialization operation is performed only immediately after the power of the display device is turned on, and thereafter, the initialization operation is not performed until the power is turned off. In the initialization operation in the display device, during a period from time t1 to time t2 immediately after the power is turned on (initialization period Tini), the initialization signal line CLR is set at the high level, the voltages of all the scanning signal lines G1 to Gn are set at the high level by the scanning-side drive circuit 40, and all the data signal lines D1 to Dm are set to a voltage equal to the voltage of the initialization voltage supply line INI, that is, the initialization voltage Vini, by the data-side drive circuit 30. As a result, in each pixel circuit 15*e*, the writing control transistor M2, the first initialization transistor M4, and the second initialization transistor M6 are turned on during the initialization period Tini(t1 to t2), so that the auxiliary writing capacitor Cwa and the holding capacitor Cst are discharged, and the holding voltages in the auxiliary writing capacitor Cwa and the holding capacitor Cst are initialized to zero. As described above, in the present configuration example, the first initialization transistor M4 and the second initialization transistor M6 constitute, together with the writing control transistor M2, the initialization circuit that discharges and initializes the holding capacitor Cst and the like in the initialization period Tini. Here, the second initialization transistor M6 functions as a holding capacitor discharge switching element that discharges the holding capacitor Cst. Thereafter, at time t3, the driving of the scanning signal lines G1 to Gn and the data signal line D1 to Dm is started (the start of the display operation). Note that the voltages of the emission control lines E1 to En are at the low level until time t3 after the power is turned on, and after time t3, in accordance with the driving of the emission control lines E1 to En, the voltages of the emission control lines Ei are at the low level for a predetermined period corresponding to two horizontal periods which correspond to the data writing period Tw in each frame period and are at the high level in the other periods.

In the pixel circuit Pix(i,j) in the ith row and the jth column according to the present configuration example illustrated in FIG. 10, at time t4 immediately before the selection period for the corresponding scanning signal line Gi, the voltage of the corresponding emission control line Ei changes from the high level to the low level, and the emission control transistor M5 comes into the off-state, whereby the organic EL element OL comes into the non-emission state.

Thereafter, at time t5, the voltage of the corresponding scanning signal line Gi changes from the low level to the high level, and the corresponding scanning signal line Gi comes into the selected state, so that the writing control transistor M2 and the first initialization transistor M4 change to the on-state. Since the double-pulse driving is performed for the scanning signal lines G1 to Gn as described above, the first half of the selection period (t5 to t7) of the corresponding scanning signal line Gi, that is, the period from time t5 to t6, corresponds to the (i−1)th horizontal period, and in this period, the data voltage to be written to the pixel circuit Pix(i−1,j) in the (i−1)th row and the jth column is applied from the corresponding data signal line Dj via the writing control transistor M2 to one end of the small-capacitance capacitor as the synthetic capacitance (hereinafter referred to as "series synthetic capacitance" and denoted by reference symbol "Cser") made up of the auxiliary writing capacitor Cwa and the holding capacitor Cst connected in series with each other. The capacitance value of the series synthetic capacitance Cser is given by the following equation (hereinafter, the capacitance values of the auxiliary writing capacitor Cwa, the holding capacitor Cst, the series synthetic capacitance Cser are also denoted by reference symbols "Cwa", "Cst", and "Cser", respectively, and the same applies to the following).

$$Cser=Cwa\cdot Cst/(Cwa+Cst)=Cst/(1+Cst/Cwa) \quad (11)$$

From Equation (11) above, Cser<Cst is satisfied.

During the period from time t5 to time t6, with the first initialization transistor M4 being in the on-state, the initialization voltage Vini is provided from the initialization voltage supply line INI to the other end of the small-capacitance capacitor as the series synthetic capacitance Cser. The initialization voltage Vini is also applied to the anode electrode of the organic EL element OL, and the parasitic capacitance (not illustrated) of the organic EL element OL is discharged.

At time t5, the voltage of the corresponding data signal line Dj changes to a data voltage Vw1 to be written to the pixel circuit Pix(i,j) in the ith row and the jth column, and the series synthetic capacitance Cser is charged with the data voltage Vw1. By this charging, the gate voltage Vg is determined by the capacitive division of the voltage held in the series synthetic capacitance Cser, between the auxiliary writing capacitor Cwa and the holding capacitor Cst. That is, after the charging, the gate voltage Vg in the drive transistor M1 becomes a voltage Vw2 expressed by the following equation:

$$Vw2=\{Cwa/(Cwa+Cst)\}(Vw1-Vini)+Vini=(Vw1-Vini)/(1+Cst/Cwa)+Vini \quad (12)$$

At this time, the gate-source voltage Vgs in the drive transistor M1 corresponds to the voltage held in the holding capacitor Cst and is expressed by the following equation:

$$Vgs=Vw2-Vini=(Vw1-Vini)/(1+Cst/Cwa) \quad (13)$$

Thereafter, at time t7, the voltage of the corresponding scanning signal line Gi changes to the low level, so that the writing control transistor M2 is turned off, and the gate terminal of the drive transistor M1 is electrically disconnected from the corresponding data signal line Dj. Further, at time t7, the first initialization transistor M4 is also turned off, and the supply of the initialization voltage Vini to the other end of the small-capacitance capacitor as the series synthetic capacitance Cser is cut off. Moreover, at time t7, the voltage of the corresponding emission control line Ei changes to the high level, and the emission control transistor M5 is turned on. Thereby, a current flows from the high-level power supply line ELVDD to the low-level power supply line ELVSS via the emission control transistor M5, the drive transistor M1, and the organic EL element OL. This current is the drive current Id expressed by Equation (8) above, and the organic EL element OL emits light by the drive current Id, and the light emission continues until immediately before the data writing period in the next frame period. At time t7 at which the light emission is started, the voltage at the other end of the small-capacitance capacitor as the series synthetic capacitance Cser and the gate voltage Vg increase by a forward voltage Vf of the organic EL element OL, but the holding voltage in the holding capacitor Cst, that is, the gate-source voltage Vgs, does not change.

In the other pixel circuits as well, the initialization operation, the data writing operation, and the emission operation are performed in accordance with the sequential scanning of the scanning signal lines G1 to Gn in each frame period (see FIG. 11). As a result, an image represented by the image data in the input signal Sin from the outside is displayed on the display portion 11.

According to the display device using the pixel circuit **15*e* according to the present configuration example as described above, the series synthetic capacitance Cser (see Expression (11)) having a smaller capacitance value than the holding capacitor Cst is charged at the data voltage Vdata=Vw1 in the data writing period Tw, whereby the holding voltage of the holding capacitor Cst determined by the capacitive division of the voltage Vw1−Vini between the auxiliary writing capacitor Cwa and the holding capacitor Cst is applied between the gate and the source in the drive transistor M1 (see Expression (13) above), the voltage Vw1−Vini being held in the series synthetic capacitance Cser. In this way, as in the case of using the pixel circuit according to each of the other configuration examples described above, it is possible to prevent insufficient charging in the data writing period while using the holding capacitor Cst having a large capacitance value. Further, in the pixel circuit 15*e* using the present configuration example, unlike the case of using the pixel circuits 15*a* to 15*d* according to the first to fourth configuration examples, charge redistribution between the auxiliary writing capacitor Cwa and the holding capacitor Cst is not performed, so that the capacitance selection transistor M3 and the signal line and the circuit for controlling the capacitance selection transistor M3 are unnecessary, and the configuration is simplified. Since the charge redistribution is not performed between the auxiliary writing capacitor Cwa and the holding capacitor Cst, it is not necessary to discharge and initialize the holding capacitor Cst in advance for each data writing operation. However, when charges are accumulated in the auxiliary writing capacitor Cwa and/or the holding capacitor Cst due to a cause except for the data writing operation described above, data cannot be appropriately written to the series synthetic capacitance Cser, and for avoiding this, in the case of using the pixel circuit 15*e*** according to the present configuration example, the auxiliary writing capacitor Cwa and the holding capacitor Cst are brought into a state where charges are not accumulated by the initialization operation immediately after the power is turned on (the auxiliary writing capacitor Cwa and the holding capacitor Cst are initialized).

2. Second Embodiment

In general, a thin-film transistor (TFT) is used for a drive transistor in a pixel circuit in an organic EL display device. The gain of a metal-oxide-semiconductor (MOS) transistor such as a TFT is determined by mobility, a channel width, a channel length, a gate insulating film capacitance, and the like, and the amount of current flowing through the MOS transistor changes in accordance with a gate-source voltage, gain, threshold voltage, and the like. When the TFT is used for the drive transistor, variation occurs in the threshold voltage, mobility, and the like, thereby causing variation in the amount of the drive current flowing through the organic EL element. As a result, luminance unevenness occurs in the display image, and display quality deteriorates. On the other hand, there is an organic EL display device configured such that the drive current to be supplied from the drive transistor to the organic EL element is extracted to the outside of the pixel circuit and measured, and the data voltage to be written to each pixel circuit is corrected so as to compensate for the characteristic variation on the basis of the measurement result. Compensation for variation in the characteristic of the drive transistors with such a configuration is called "external compensation". Hereinafter, an embodiment of an organic EL display device that performs such external compensation will be described as a second embodiment. Note that the display device according to the second embodiment has, as operation modes, a normal display mode in which an image is displayed on the basis of an input signal from the outside and a characteristic detection mode in which a characteristic of a drive transistor in a pixel circuit is detected so as to perform external compensation.

<2.1 Configuration and Operation>

Figure 12:
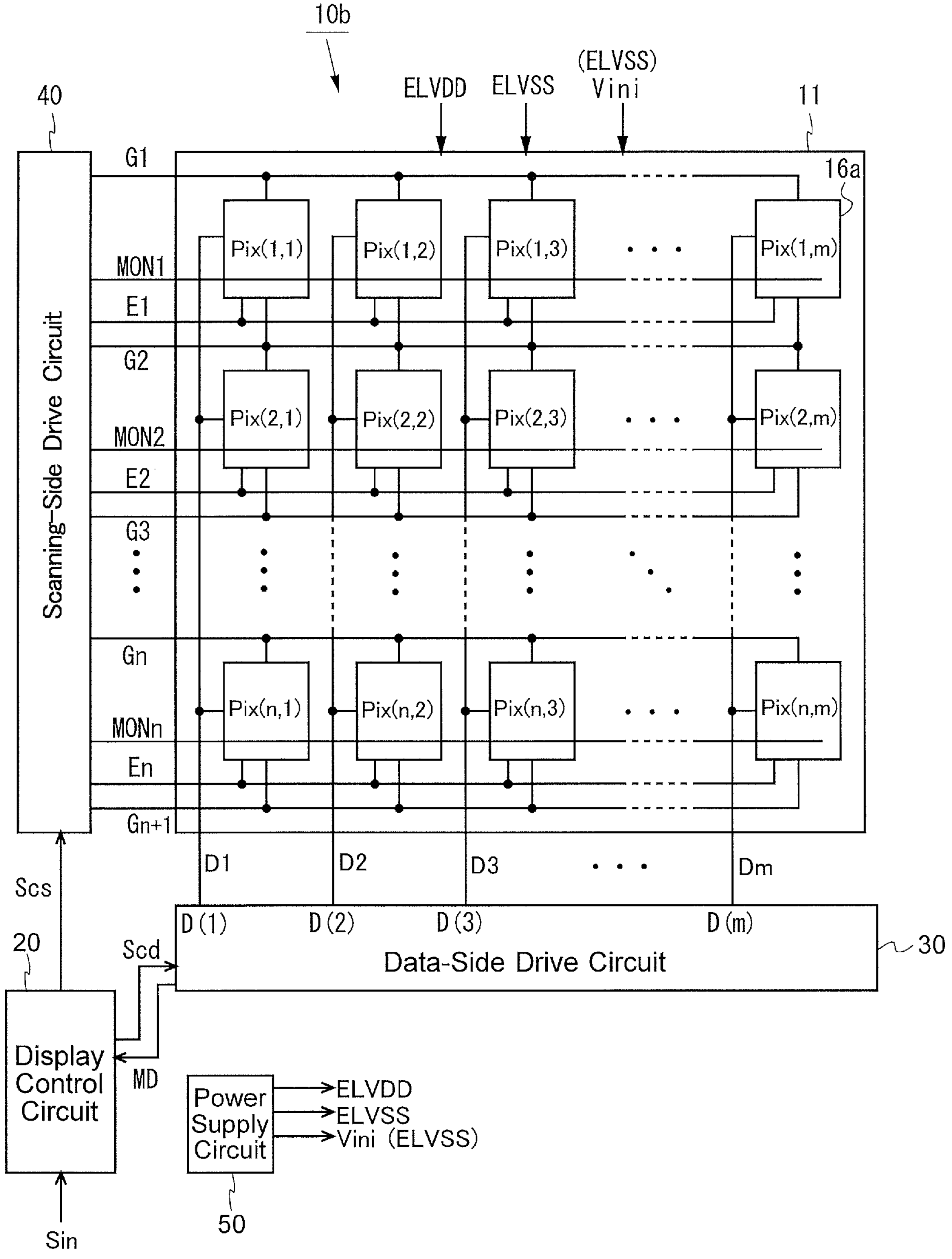
FIG. 12 is a block diagram illustrating an overall configuration of a display device according to a second embodiment.

FIG. 12 is a block diagram illustrating an overall configuration of an organic EL display device **10*b* according to the second embodiment. As illustrated in FIG. 12, similarly to the first embodiment, the display device 10*b* also includes a display portion 11, a display control circuit 20, a data-side drive circuit 30, a scanning-side drive circuit 40, and a power supply circuit 50. Portions of the configuration of the display device 10*b* that are the same as or correspond to those of the display device 10*a*** according to the first embodiment are denoted by the same reference numerals, and a detailed description thereof is omitted.

In the display portion 11 in the present embodiment, m (m is an integer of 2 or more) data signal lines D1 to Dm, n+1 (n is an integer of 2 or more) scanning signal lines G1 to Gn+1, and n emission control lines E1 to En are disposed in the same form as in the first embodiment, and m×n pixel circuits **16*a* are provided as arranged in a matrix along the m data signal lines D1 to Dm and the n scanning signal lines G1 to Gn. Each pixel circuit 16*a* corresponds to any one of the m data signal lines D1 to Dm, corresponds to any one of the n scanning signal lines G1 to Gn, and corresponds to any one of the n emission control lines E1 to En. As illustrated in FIG. 12, in the display portion 11 according to the present embodiment, in addition to these signal lines, n monitoring control lines MON1 to MONn are disposed along the n scanning signal lines G1 to Gn, respectively, and each pixel circuit 16*a* corresponds to any one of the n monitoring control lines MON1 to MONn. In a case where a pixel circuit that performs charge redistribution by using the capacitance selection transistor M3 is used as in the first to fourth configuration examples in the first embodiment, the capacitance selection signal lines CSW1 to CSWn are required, but in the present embodiment, the emission control lines E1 to En are also used as the capacitance selection signal lines CSW1 to CSWn. However, the capacitance selection signal lines CSW1 to CSWn may be formed in the display portion 11 separately from the emission control lines E1 to En (see FIG. 1). Note that the power supply lines ELVDD and ELVSS and the initialization voltage supply line INI disposed in the display portion 11** are similar to those in the first embodiment, and thus the description thereof is omitted.

The display control circuit 20 in the present embodiment receives an input signal Sin including image data representing an image to be displayed and timing control information for image display from the outside of the display device, generates a data-side control signal Scd and a scanning-side control signal Scs on the basis of the input signal Sin, and outputs data-side control signal Scd and the scanning-side control signal Scs to the data-side drive circuit 30 and the scanning-side drive circuit 40, respectively. In addition, the display control circuit 20 receives measurement data MD from the data-side drive circuit 30 so as to perform external compensation (details will be described later), corrects the image data on the basis of the measurement data MD so as to compensate for variation in the characteristic of the drive transistor in the pixel circuits **16*a***, and generates the data-side control signal Scd on the basis of the corrected image data.

In the normal display mode, the data-side drive circuit 30 functions as the data signal line drive circuit and drives the data signal lines D1 to Dm on the basis of the data-side control signal Scd from the display control circuit 20. On the other hand, in the characteristic detection mode, the data-side drive circuit 30 functions as a current measurement circuit as well as functioning as the data signal line drive circuit and measures the current in each pixel circuit **16*a*** via the data signal line Dj connected thereto.

The scanning-side drive circuit 40 functions as a scanning signal line drive circuit that drives the scanning signal lines G1 to Gn+1, a light emission control circuit that drives the light emission control lines E1 to En, and a monitoring control line drive circuit that drives the monitoring control lines MON1 to MONn on the basis of the scanning-side control signal Scs from the display control circuit 20. More specifically, in the normal display mode, on the basis of the scanning-side control signal Scs, the scanning-side drive circuit 40 sequentially selects the scanning signal lines G1 to Gn+1 in each frame period for a predetermined period each as the scanning signal line drive circuit, the prederemoined period corresponding to one horizontal period, and applies an inactive emission control signal (low-level voltage) indicating non-emission of light to the ith emission control line Ei during a predetermined period including at least the ith selection scanning period (i=1 to n) as the emission control circuit, and applies an active emission control signal (high-level voltage) indicating the emission of light to the ith emission control line Ei during the other periods. On the other hand, in the characteristic detection mode, the scanning-side drive circuit 40 selectively drives the scanning signal lines G1 to Gn+1 on the basis of the scanning-side control signal Scs as the scanning signal line drive circuit, and selectively drives the monitoring control lines MON1 to MONn on the basis of the scanning-side control signal Scs as the monitoring control line drive circuit.

Figure 13:
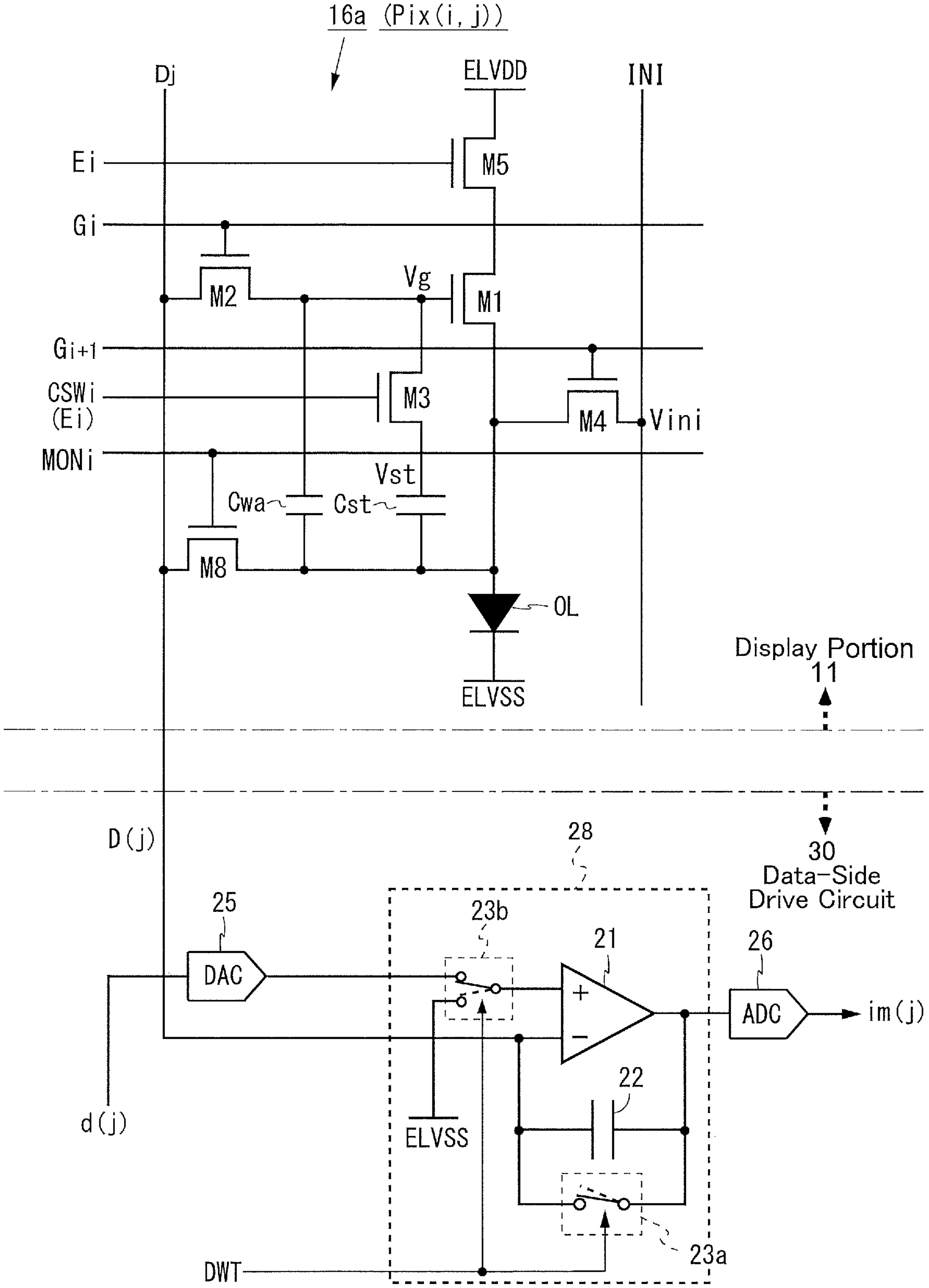
FIG. 13 is a circuit diagram illustrating a configuration example of a pixel circuit in the second embodiment together with a configuration of a main part of a data signal line drive circuit.

FIG. 13 is a circuit diagram illustrating a configuration example of the pixel circuit **16*a* in the present embodiment together with a configuration of a main part of the data-side drive circuit 30. That is, FIG. 13 illustrates the electrical configuration of the pixel circuit 16*a* corresponding to the ith scanning signal line Gi and the jth data signal line Dj, that is, the pixel circuit Pix(i,j) in the ith row and the jth column, and the electrical configuration of the main part corresponding to the jth data signal line in the data-side drive circuit 30**.

As illustrated in FIG. 13, the pixel circuit **16*a* in the present embodiment is similar to the pixel circuit 15*a* in the first embodiment except for including a monitoring control transistor M8 having a gate terminal connected to a monitoring control line MONi corresponding to the pixel circuit 16*a* (see FIG. 2), the same portions are denoted by the same reference numerals, and the description thereof is omitted. In the pixel circuit 16*a*** (the pixel circuit Pix(i,j) in the ith row and the jth column) according to the present embodiment, the monitoring control transistor M8 functions as a switching element, and the source terminal of the drive transistor M1 (the connection point between the drive transistor M1 and the organic EL element OL) is connected to the corresponding data signal line Dj via the monitoring control transistor M8.

The data-side drive circuit 30 in the present embodiment includes an input-output buffer unit, an analog to digital (AD) conversion unit, a digital to analog (DA) conversion unit, and a series-parallel conversion unit. FIG. 13 illustrates a detailed configuration of portions of the input-output buffer unit, the AD conversion unit, and the DA conversion unit in the data-side drive circuit 30, the portions corresponding to the corresponding data signal line Dj connected to the pixel circuit Pix(i,j) in the ith row and the jth column. As illustrated in FIG. 13, the data-side drive circuit 30 includes, as the portions, an input-output buffer 28, a DA converter (DAC) 25, and an AD converter (ADC) 26. A digital image signal d(j) corresponding to the jth pixel (j=1 to m) among digital image signals for one row from the series-parallel conversion unit is sequentially input to the DA converter 25. Here, the digital image signal d(j) is a digital signal indicating a data voltage to be applied to the pixel circuit Pix(i,j). The data-side control signal Scd described above includes an input-output control signal DWT in addition to the digital image signal in the serial format, and the input-output control signal DWT is input to the input-output buffer 28.

The input-output buffer 28 includes an operational amplifier 21, a capacitor 22, a first switch 23*a*, and a second switch 23*b*. An inverting input terminal of the operational amplifier 21 is connected to the data signal line Dj, and a non-inverting input terminal of the operational amplifier 21 is connected to the second switch 23*b* as a selection switch. By the second switch 23*b*, the non-inverting input terminal of the operational amplifier 21 is connected to the output terminal of the DA converter 25 when the input-output control signal DWT is at the high level (H level), and is connected to the low-level power supply line ELVSS when the input-output control signal DWT is at the low level (L level). The capacitor 22 is provided between the inverting input terminal and the output terminal of the operational amplifier 21, and the output terminal of the operational amplifier 21 is connected to the inverting input terminal of the operational amplifier 21 via the capacitor 22. The first switch 23*a* is provided between the inverting input terminal and the output terminal of the operational amplifier 21 and is connected in parallel to the capacitor 22. The capacitor 22 functions as a current-voltage conversion element. The first switch 23*a* is in the on-state when the input-output control signal DWT is at the H level, and is in the off-state when the input-output control signal DWT is at the L level. The output terminal of the operational amplifier 21 is connected to the input terminal of the AD converter 26, and when the input-output control signal DWT is at the L level, a digital signal (also referred to as "current monitoring signal") im(j) indicating a current flowing through the data signal line Dj is output from the AD converter 26.

In the input-output buffer 28 having such a configuration, when the input-output control signal DWT is at the H level, the first switch 23*a* is in the on-state, and the output terminal and the inverting input terminal of the operational amplifier 21 are directly connected (short-circuited). The non-inverting input terminal of the operational amplifier 21 is connected to the output terminal of the DA converter 25 by the second switch 23*b*. At this time, the input-output buffer 28 functions as a voltage follower, and a digital signal d(j) input to the DA converter 25 is converted into an analog voltage signal and provided to the data signal line Dj with low output impedance.

On the other hand, when the input-output control signal DWT is at the L level, the first switch 23*a* is in the off-state, and the output terminal of the operational amplifier 21 is connected to the non-inverting input terminal via the capacitor 22. The non-inverting input terminal of the operational amplifier 21 is connected to the low-level power supply line ELVSS by the second switch 23*b*. At this time, the operational amplifier 21 and the capacitor 22 function as an integrator. That is, the operational amplifier 21 outputs a voltage corresponding to the integrated value of the current flowing through the data signal line Dj connected to the inverting input terminal of the operational amplifier 21, and this voltage is converted into a digital signal by the AD converter 26 and sent as a current monitoring signal im(j) to the display control circuit 20 via the series-parallel conversion unit (not illustrated). At this time, since the non-inverting input terminal of the operational amplifier 21 is connected to the low-level power supply voltage ELVSS, the voltage of the data signal line Dj is equal to the low-level power supply voltage ELVSS due to a virtual short circuit.

In the display device 10*b* of the present embodiment as described above, in the normal display mode, on the basis of the data-side control signal Scd from the display control circuit 20, a signal d(j) indicating the data voltage Vdata to be written to each of the pixel circuits Pix(1,*j*) to Pix(n,j) in the jth column is sequentially provided to the input-output buffer 28 corresponding to each data signal line Dj via the DA converter 25. At this time, the input-output control signal DWT is at the H level, and the input-output buffer 28 outputs the data voltage Vdata to the data signal line Dj as a voltage follower (j=1 to m). In conjunction with such driving of the data signal lines D1 to Dm, the scanning signal lines G1 to Gn+1 are driven by the scanning-side drive circuit 40 such that the scanning signal lines G1 to Gn+1 are sequentially selected for a predetermined period each in each frame period. By the driving of the data signal lines D1 to Dm and the scanning signal lines G1 to Gn+1 in the display portion 11 in this manner, in each pixel circuit Pix(i,j), the emission control transistor M5 is turned on after the data voltage Vdata corresponding to the pixel circuit is written, and accordingly, an image represented by image data in the input signal Sin from the outside is displayed on the display portion 11.

Further, in each pixel circuit Pix(i,j) in the display device 10*b* of the present embodiment, in the characteristic detection mode, as in the case of using the pixel circuit 15*a* according to the first configuration example in the first embodiment (see FIG. 3), after the data voltage Vdata is written, the capacitance selection transistor M3 is turned on, the first initialization transistor M4 is turned off, and the emission control transistor M5 is turned on, whereby a current flows through the drive transistor M1. At this time, in the characteristic detection mode in the present embodiment, by the input-output control signal DWT being changed from the H level to the L level in the data-side drive circuit 30, the input-output buffer 28 measures a current flowing through the drive transistor M1 of the pixel circuit Pix(i,j) in which the monitoring control transistor M8 is turned on by the monitoring control line MONi among the pixel circuits Pix(1,*j*) to Pix(n,j) in the jth column connected to the corresponding data signal line Dj via the monitoring control transistor M8 and the data signal line Dj. A signal im(j) indicating the measurement result is sequentially output via the AD converter 26 and sent as measurement data MD to the display control circuit 20 via the series-parallel conversion unit. In the display control circuit 20, the characteristic of the drive transistor M1 in each pixel circuit Pix(i,j) is obtained using the measurement data MD, and data indicating the characteristic is stored and updated. These pieces of data are used to correct the image data included in the input signal Sin from the outside such that variation and shift in the characteristic of the drive transistor M1 in the pixel circuits Pix(1,1) to Pix(n,m) are compensated for in the normal display mode described above. The data-side control signal Scd provided to the data-side drive circuit 30 is generated on the basis of the corrected image data.

<2.2 Effects>

Also, in the present embodiment in which the external compensation is performed as described above, at the time of writing the data voltage Vdata based on the corrected image data to each pixel circuit 16*a*, as in the first embodiment, the data voltage Vdata is written to the auxiliary writing capacitor Cwa having a smaller capacitance value than the holding capacitor Cst. Thereafter, the capacitance selection transistor M3 is changed to the on-state, and thereby charges are redistributed between the auxiliary writing capacitor Cwa and the holding capacitor Cst, so that the driving holding voltage held in the holding capacitor Cst is determined. Therefore, according to the present embodiment, it is possible to obtain similar effects to those of the first embodiment while performing external compensation.

<2.3. Modification>

The configuration of the pixel circuit in the present embodiment is not limited to the configuration illustrated in FIG. 13, and various modifications are possible.

Figure 14:
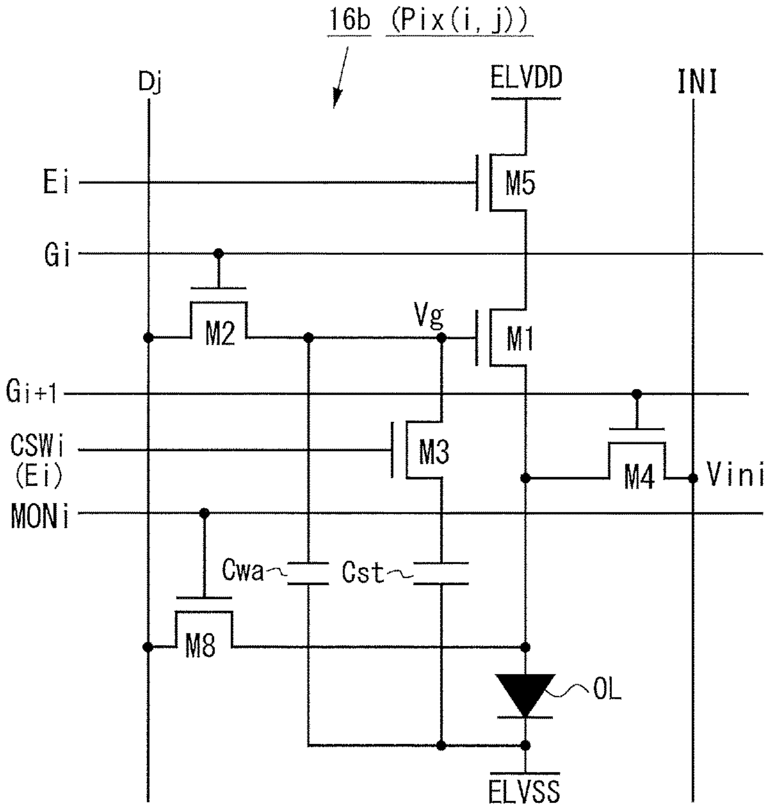
FIG. 14(A) is a circuit diagram illustrating a first modification of the pixel circuit in the second embodiment.
FIG. 14(B) is a circuit diagram illustrating a second modification.
Figure 14:
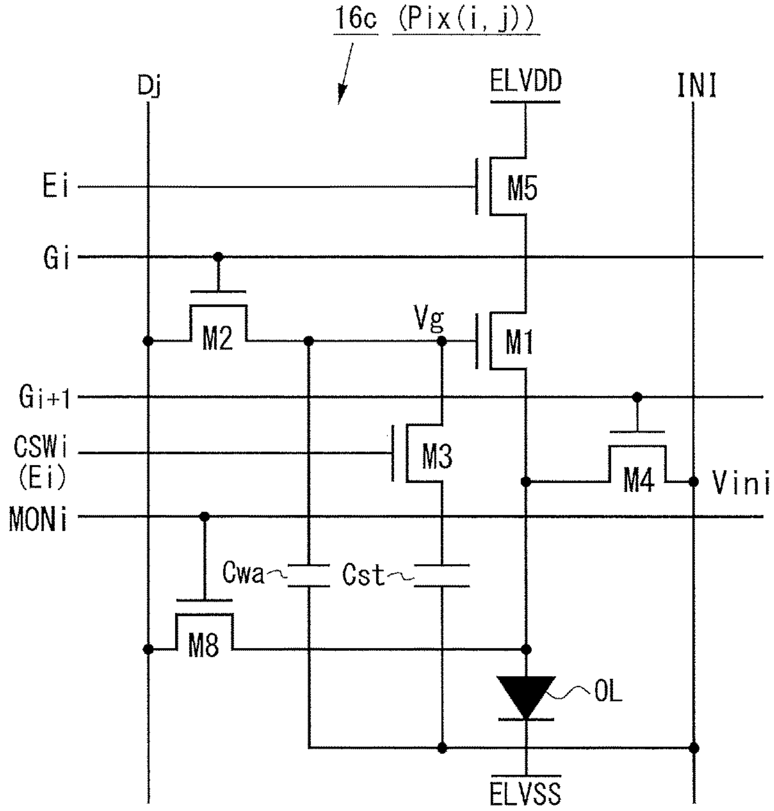

FIG. 14(A) is a circuit diagram illustrating a first modification of the pixel circuit 16*a* in the present embodiment. In the pixel circuit 16*a* according to the present embodiment, the terminals on the low voltage side of the auxiliary writing capacitor Cwa and the holding capacitor Cst is connected to the source terminal of the drive transistor M1 (see FIG. 13), but as illustrated in FIG. 14(A), in a pixel circuit 16*b* according to the present modification, both the terminals on the low voltage side are connected to the low-level power supply line ELVSS. In the present embodiment, even when such a pixel circuit 16*b* is used instead of the pixel circuit 16*a* in FIG. 13, similar effects to those of the first embodiment can be obtained while external compensation is performed.

FIG. 14(B) is a circuit diagram illustrating a second modification of the pixel circuit 16*a* in the present embodiment. In the pixel circuit 16*a* according to the present embodiment, as described above, the terminals on the low voltage side of the auxiliary writing capacitor Cwa and the holding capacitor Cst are connected to the source terminal of the drive transistor M1 (see FIG. 13), but as illustrated in FIG. 14(B), in a pixel circuit 16*c* according to the second modification, both the terminals on the low voltage side are connected to the initialization voltage supply line INI. Even when such a pixel circuit 16*c* is used instead of the pixel circuit 16*a* in FIG. 13 in the second embodiment, similar effects to those of the first embodiment can be obtained while external compensation is performed.

Figure 15:
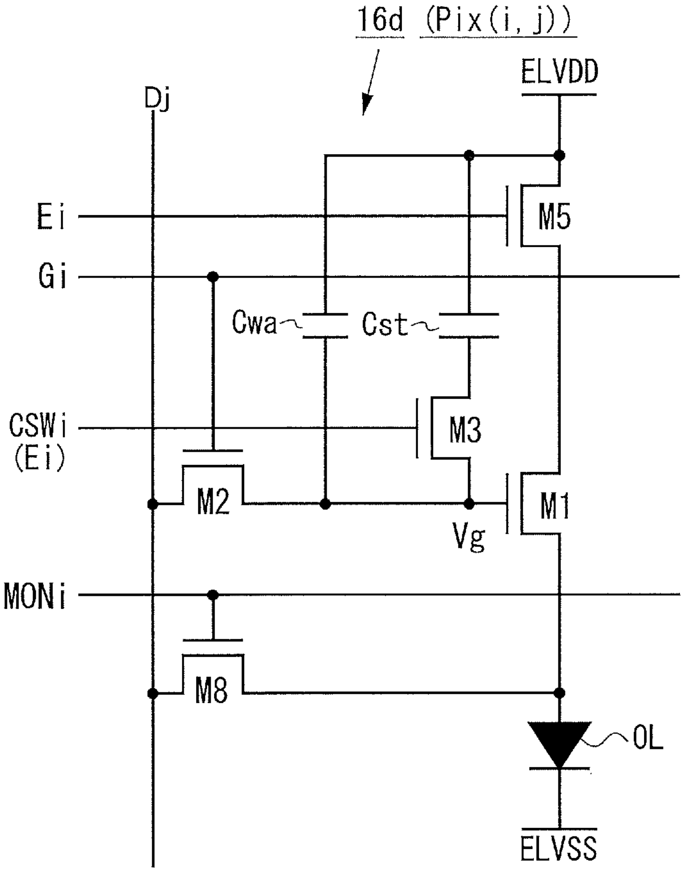
FIG. 15 is a circuit diagram illustrating a third modification of the pixel circuit in the second embodiment.

FIG. 15 is a circuit diagram illustrating a third modification of the pixel circuit 16*a* in the present embodiment. In the pixel circuit 16*a* according to the present embodiment, the auxiliary writing capacitor Cwa, the holding capacitor Cst, and the capacitance selection transistor M3 are connected between the gate terminal and the source terminal of the drive transistor M1 (see FIG. 13), but as illustrated in FIG. 15, in a pixel circuit 16*d* according to the third modification, the auxiliary writing capacitor Cwa, the holding capacitor Cst, and the capacitance selection transistor M3 are connected between the gate terminal of the drive transistor M1 and the high-level power supply line ELVDD. Even when such a pixel circuit 16*d* is used instead of the pixel circuit 16*a* in FIG. 13 in the second embodiment, similar effects to those of the first embodiment can be obtained while external compensation is performed.

In the pixel circuit 16*a* according to the present embodiment and the pixel circuits 16*b* to 16*d* according to the first to third modifications, the monitoring control transistor M8 for measuring the current flowing through the drive transistor M1 in the characteristic detection mode is added on the basis of the pixel circuit 15*a* (FIG. 2) according to the first configuration example in the first embodiment. However, instead of this, on the basis of any one of the pixel circuits 15*b* to 15*e* (FIG. 4, FIG. 6, FIG. 8, and FIG. 10) according to the second to fifth configuration examples of the first embodiment, a configuration may be employed in which the monitoring control transistor M8 for measuring the current flowing through the drive transistor M1 in the characteristic detection mode is added.

3. Third Embodiment

Figure 16:
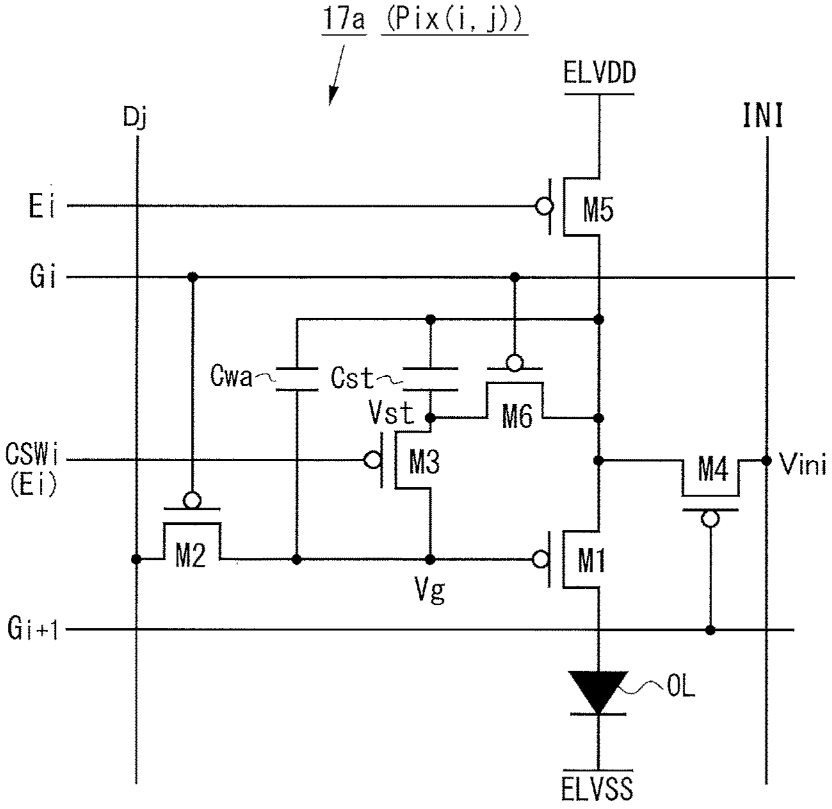
FIG. 16 is a circuit diagram illustrating a configuration example of a pixel circuit in a display device according to a third embodiment.

FIG. 16 is a circuit diagram illustrating a configuration example of a pixel circuit in an organic EL display device according to a third embodiment. N-channel transistors are used in the pixel circuits 15*a* to 15*e* in the first embodiment and the pixel circuit 16*a* in the second embodiment, but P-channel transistors are used in the pixel circuit 17*a* according to the present embodiment. Hereinafter, in the configuration of the display device according to the present embodiment, the same or corresponding portions as those of the display device 10*a* according to the first embodiment will be denoted by the same reference numerals, a detailed description thereof is omitted, and the present embodiment will be described focusing on the configuration of a pixel circuit 17*a*.

As illustrated in FIG. 16, similarly to the pixel circuit 15*c* according to the third configuration example in the first embodiment (FIG. 6), the pixel circuit 17*a* in the present embodiment also includes an organic EL element OL as a display element, an auxiliary writing capacitor Cwa and a holding capacitor Cst, a drive transistor M1, a writing control transistor M2, a capacitance selection transistor M3, a first initialization transistor M4, an emission control transistor M5, and a second initialization transistor M6. However, in the present embodiment, the transistors M1 to M6 are all P-channel transistors, and these transistors M1 to M6 are connected as illustrated in FIG. 16. In the configuration of FIG. 16, the initialization voltage Vini is assumed to be equal to the high-level power supply voltage ELVDD.

Specifically, in the pixel circuit Pix(i,j) in the ith row and the jth column, which is the pixel circuit 17*a* corresponding to the ith scanning signal line Gi and the jth data signal line Dj in the present embodiment, the source terminal of the drive transistor M1 is connected to the high-level power supply line ELVDD as the first power supply line via the emission control transistor M5, and the gate terminal of the drive transistor M1 is connected to the corresponding data signal line Dj via the writing control transistor M2 and is connected to the source terminal of the drive transistor M1 via the capacitance selection transistor M3 and the holding capacitor Cst connected in series with each other. Further, the source terminal is connected to the initialization voltage supply line INI via the first initialization transistor M4 and is connected to a connection point between the capacitance selection transistor M3 and the holding capacitor Cst via the second initialization transistor M6. Further, the drain terminal of the drive transistor M1 is connected to the anode electrode of the organic EL element OL. The cathode electrode of the organic EL element OL is connected to the low-level power supply line ELVSS. The auxiliary writing capacitor Cwa has a first terminal connected to the gate terminal of the drive transistor M1 and a second terminal connected to the source terminal of the drive transistor M1. The gate terminals of the writing control transistor M2 and the second initialization transistor M6 are connected to the corresponding scanning signal line Gi, the gate terminal of the first initialization transistor M4 is connected to the subsequent scanning signal line Gi+1, and the gate terminal of the capacitance selection transistor M3 is connected to the corresponding capacitance selection signal line CSWi.

Figure 17:
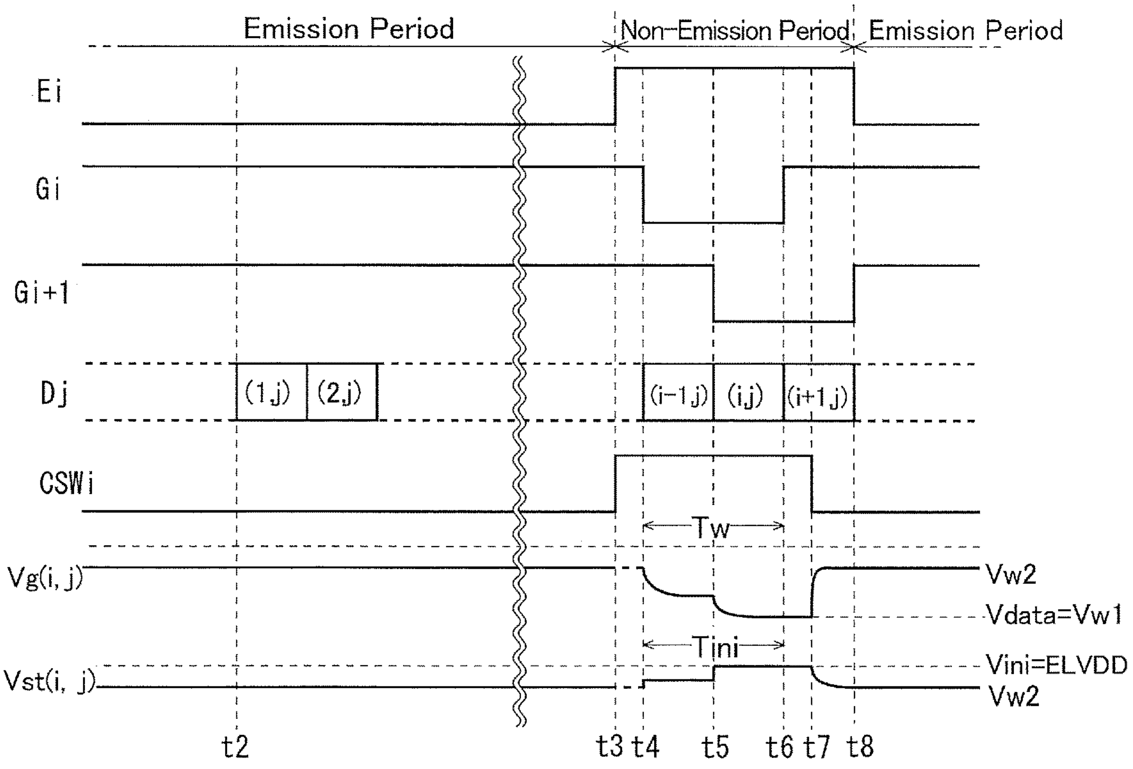
FIG. 17 is a signal waveform diagram for describing the operation of the pixel circuit in the third embodiment.

FIG. 17 illustrates changes in the voltages of the respective signal lines (corresponding emission control line Ei, corresponding scanning signal line Gi, subsequent scanning signal line Gi+1, corresponding data signal line Dj, and corresponding capacitance selection signal line CSWi), a gate voltage Vg of the drive transistor M1, and a voltage ("holding capacitance voltage") Vst at a connection point between the holding capacitor Cst and the capacitance selection transistor M3 in the initialization operation, the data writing operation, and the emission operation of the pixel circuit Pix(i,j) in the ith row and the jth column which is the pixel circuit 17*a* illustrated in FIG. 16. In FIG. 17, a period from time t4 to time t6 is a selection period for the ith scanning signal line Gi, that is, an ith scanning selection period, and corresponds to the initialization period Tini and the data writing period Tw for the pixel circuits Pix(i,1) to Pix(i,m) in the ith row. A period from time t5 to time t8 is a selection period for the (i+1)th scanning signal line (subsequent scanning signal line) Gi+1, that is, an (i+1)th scanning selection period. A period from time t3 immediately before the data writing period Tw (t4 to t6) to the end time t8 of the subsequent scanning signal line Gi+1 is a non-emission period for the pixel circuits Pix(i,1) to Pix(i,m) in the ith row, and a period from time t8 to immediately before the data writing period in the next frame period is an emission period.

As illustrated in FIG. 16, in the present embodiment, since the transistors M1 to M6 are of P-channel type, the signals of the emission control line Ei, the scanning signal line Gi, and the capacitance selection signal line CSWi are all negative logic, and the gate voltage Vg of the drive transistor M1 decreases in the data writing period Tw (t4 to t6). As can be seen by comparing FIG. 17 with FIG. 7 in consideration of this point, the pixel circuit 17*a* in the present embodiment operates in substantially the same manner as the pixel circuit 15*c* according to the third configuration example in the first embodiment. Therefore, according to the present embodiment, it is possible to obtain similar effects to those in the case of using the pixel circuit 15*c* according to the third configuration example in the first embodiment. In the present configuration example, the first initialization transistor M4 and the second initialization transistor M6 constitute the initialization circuit that discharges and initializes the holding capacitor Cst in the initialization period Tini. Here, the second initialization transistor M6 functions as a holding capacitor discharge switching element that discharges the holding capacitor Cst (the same applies to the modification illustrated in FIGS. 18 to 20 to be described later).

<3.1. First Modification>

Figure 18:
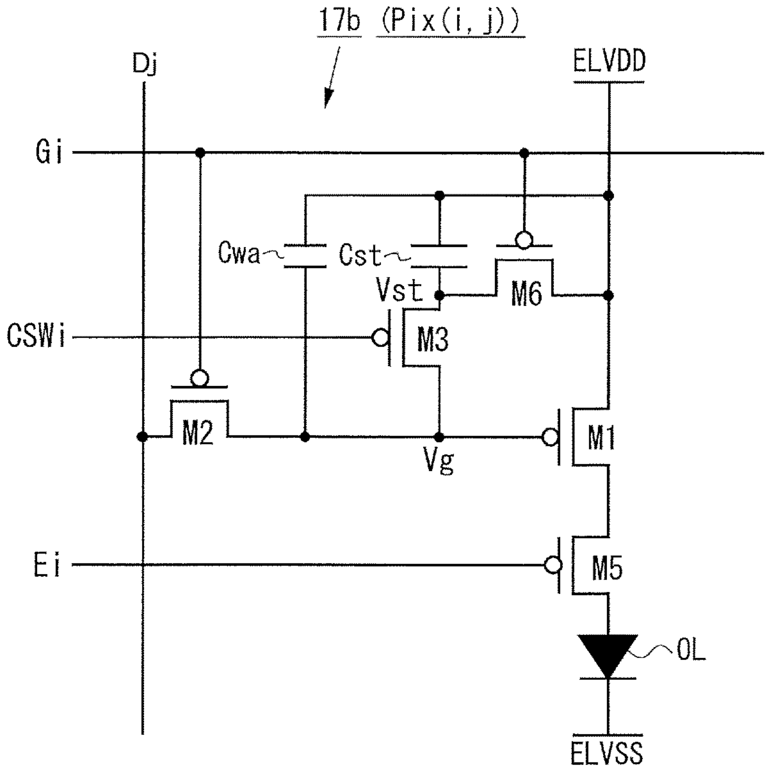
FIG. 18 is a circuit diagram illustrating a first modification of the pixel circuit in the third embodiment.

The configuration of the pixel circuit in the present embodiment is not limited to the configuration illustrated in FIG. 16, and various modifications are possible. For example, instead of the pixel circuit 17*a* illustrated in FIG. 16, a pixel circuit (hereinafter referred to as "a pixel circuit according to a first modification") 17*b* illustrated in FIG. 18 may be used. In the pixel circuit 17*a* illustrated in FIG. 16, the emission control transistor M5 is connected between the drive transistor M1 and the high-level power supply line ELVDD, but in a pixel circuit 17*b* according to the first modification, as illustrated in FIG. 18, the emission control transistor M5 is connected between the drive transistor M1 and the organic EL element OL. The pixel circuit 17*b* does not include the first initialization transistor M4 and does not need the initialization voltage supply line INI. Also, when the pixel circuit 17*b* according to the present modification thus described is used instead of the pixel circuit 17*a* in FIG. 16, similar effects to those of the second embodiment can be obtained. In the present configuration example, the second initialization transistor M6 constitutes the initialization circuit that discharges and initializes the holding capacitor Cst in the initialization period Tini. The same applies to pixel circuits 17*c*, 17*d* according to second and third modifications illustrated in FIGS. 19 and 20, respectively, to be described later.

<3.2 Second Modification>

Figure 19:
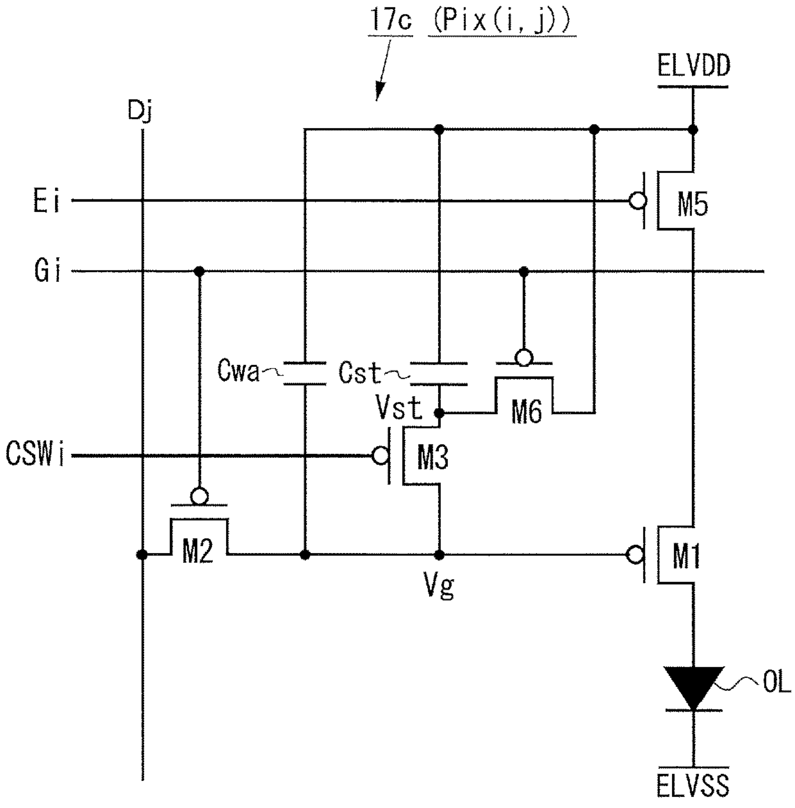
FIG. 19 is a circuit diagram illustrating a second modification of the pixel circuit in the third embodiment.

FIG. 19 is a circuit diagram illustrating a second modification of the pixel circuit 17*a* in the present embodiment. In the pixel circuit 17*c* according to the present modification, similarly to the pixel circuit 17*a* in FIG. 16, the emission control transistor M5 is connected between the drive transistor M1 and the high-level power supply line ELVDD, but the high-voltage side terminals of the auxiliary writing capacitor Cwa and the holding capacitor Cst are directly connected to the high-level power supply line ELVDD, and in this respect, the pixel circuit 17*c* is different from the pixel circuit 17*a* in FIG. 16. The pixel circuit 17*c* does not include the first initialization transistor M4 and does not need the initialization voltage supply line INI. Also, when the pixel circuit 17*c* according to the present modification thus described is used instead of the pixel circuit 17*a* in FIG. 16, similar effects to those of the second embodiment can be obtained.

<3.3 Third Modification>

Figure 20:
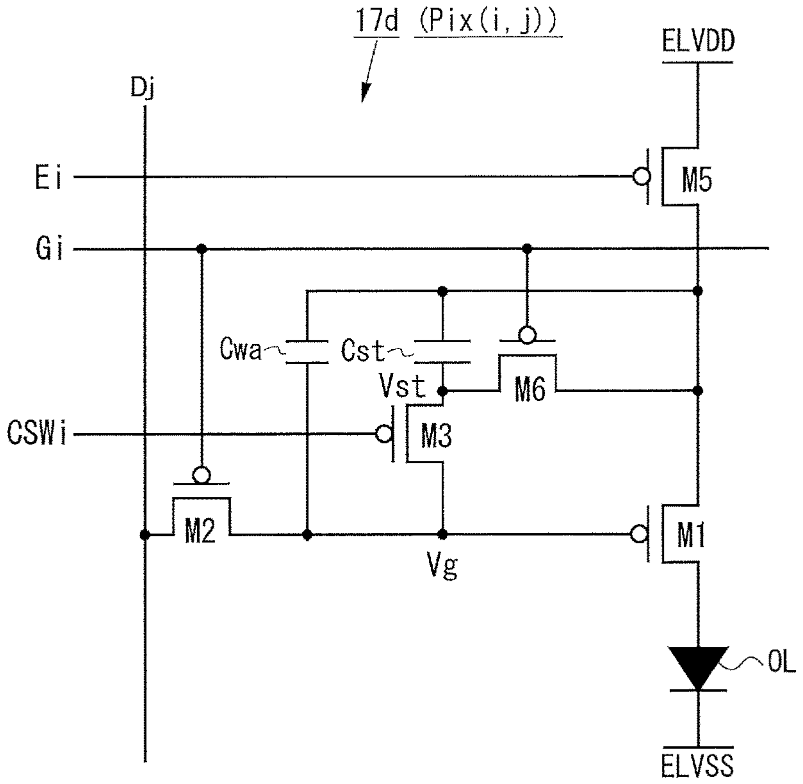
FIG. 20 is a circuit diagram illustrating a third modification of the pixel circuit in the third embodiment.
Figure 21:
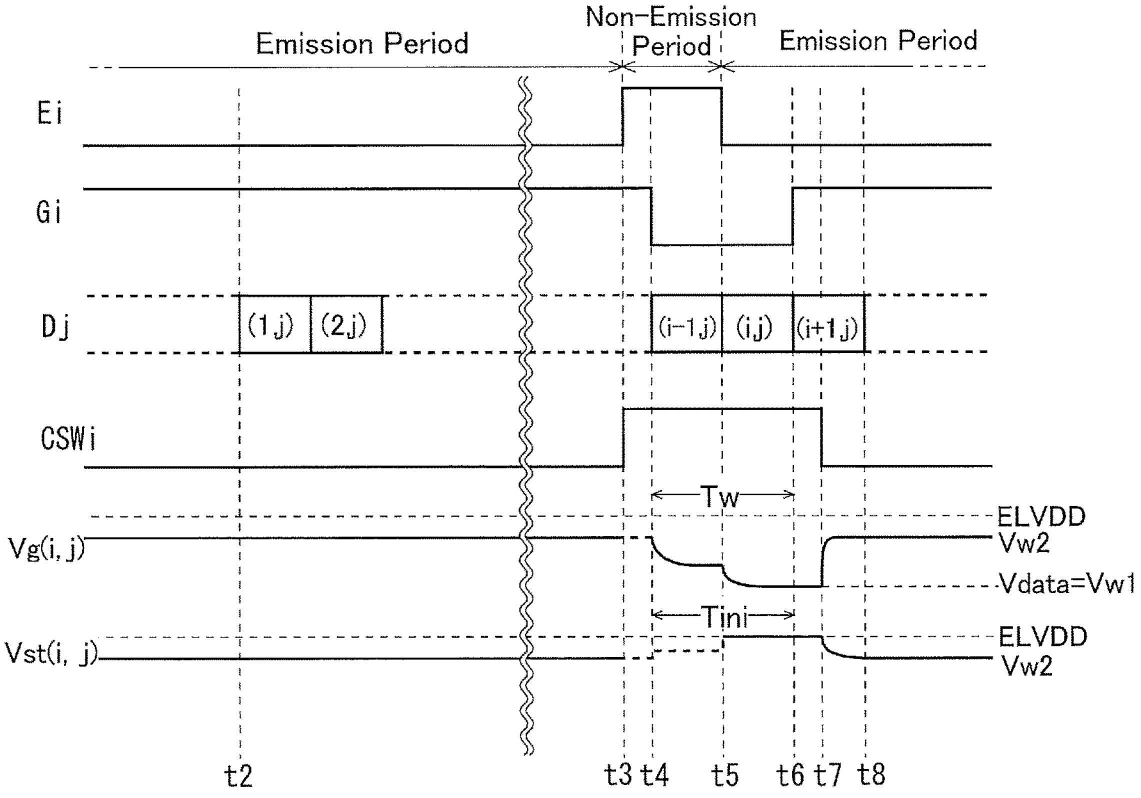
FIG. 21 is a signal waveform diagram for describing the operation of the pixel circuit according to the third modification of the third embodiment.

FIG. 20 is a circuit diagram illustrating a third modification of the pixel circuit 17*a* in the present embodiment, and FIG. 21 illustrates changes in the voltages of the respective signal lines (corresponding emission control line Ei, corresponding scanning signal line Gi, corresponding data signal line Dj, and corresponding capacitance selection signal line CSWi), the gate voltage Vg of the drive transistor M1, and the voltage (holding capacitance voltage) Vst at the connection point between the holding capacitor Cst and the capacitance selection transistor M3 in the initialization operation, the data writing operation, and the emission operation of the pixel circuit Pix(i,j) in the ith row and the jth column which is the pixel circuit 17*d* according to the present modification illustrated in FIG. 20.

As illustrated in FIG. 20, the pixel circuit 17*d* according to the present modification has a similar configuration to the pixel circuit 17*a* in FIG. 16 in the present embodiment except that the first initialization transistor M4 is not included, and the initialization voltage supply line INI is unnecessary. On the other hand, as illustrated in FIG. 21, in a case where the pixel circuit 17*d* is used, the non-emission period in which the emission control transistor M5 is in the off-state is a period from time t3 to time t5, and in the ith horizontal period (t5 to t6), in which the data voltage Vdata to be written to the pixel circuit Pix(i,j) in the ith row and the jth column according to the present modification is output to the corresponding data signal line Dj, the emission control transistor M5 is in the on-state. In this respect, the operation of the pixel circuit 17*d* according to the present modification is different from the operation (FIG. 17) of the pixel circuit 17*a* in the present embodiment. However, as illustrated in FIG. 21, the gate voltage Vg of the drive transistor M1 changes in substantially the same manner as that in the case of using the pixel circuit 17*a* in FIG. 16.

Thus, also, when such a pixel circuit 17*d* according to the present modification is used instead of the pixel circuit 17*a* in FIG. 16, similar effects to those of the second embodiment can be obtained.

<3.4 Other Configuration Examples>

Figure 22:
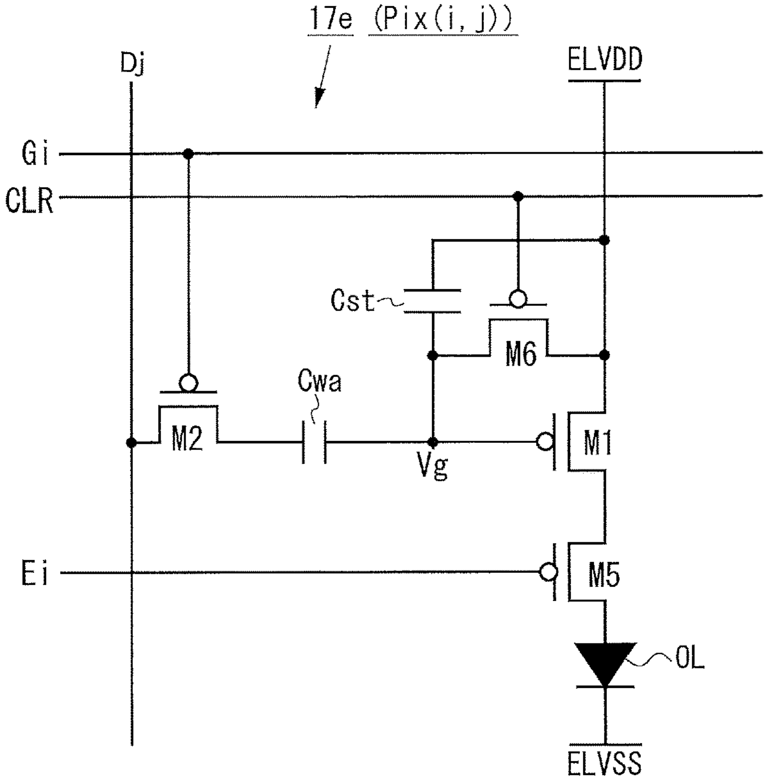
FIG. 22 is a circuit diagram illustrating another configuration example of the pixel circuit in the third embodiment.
Figure 23:
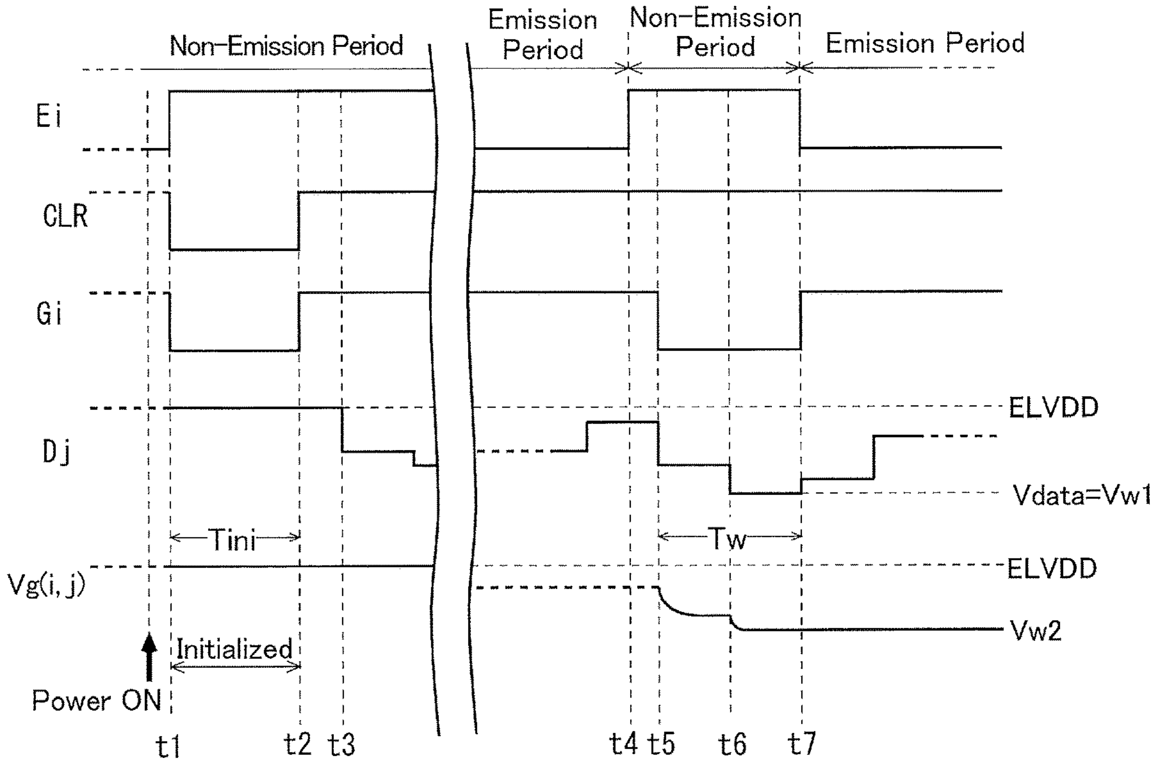
FIG. 23 is a signal waveform diagram for describing the operation of the pixel circuit according to the another configuration example in the third embodiment.

FIG. 22 is a circuit diagram illustrating another configuration example of the pixel circuit in the present embodiment, and FIG. 23 is a signal waveform diagram for describing the operation of a pixel circuit 17*e* according to the another configuration example in the present embodiment.

As illustrated in FIG. 22, as in the first modification (FIG. 18), the pixel circuit 17*e* according to the present configuration example includes an auxiliary writing capacitor Cwa, a holding capacitor Cst, a drive transistor M1, a writing control transistor M2, an emission control transistor M5, and an initialization transistor M6 in addition to the organic EL element OL. However, in the present configuration example, the auxiliary writing capacitor Cwa and the holding capacitor Cst are connected in series with each other, and in this respect, the present configuration example is different from the first modification example (FIG. 18) in which the auxiliary writing capacitor Cwa and the holding capacitor Cst are connected in parallel. Further, the pixel circuit 17*e* according to the present configuration example does not include the capacitance selection transistor M3, and charge redistribution is not performed between the auxiliary writing capacitor Cwa and the holding capacitor Cst. In a case where the pixel circuit 17*e* according to the present configuration example is used, the capacitance selection signal lines CSW1 to CSWn are not provided, but an initialization signal line CLR for transmitting an initialization signal used in an initialization operation to be described later is disposed in the display portion 11.

Specifically, in the pixel circuit 17*e* according to the present configuration example, as in the first modification (FIG. 18), the source terminal of the drive transistor M1 is directly connected to the high-level power supply line ELVDD, and the drain terminal of the drive transistor M1 is connected to the anode electrode of the organic EL element OL via the emission control transistor M5. The cathode electrode of the organic EL element OL is connected to the low-level power supply line ELVSS. Unlike the first modification, the gate terminal of the drive transistor M1 is connected to the corresponding data signal line Dj via the auxiliary writing capacitor Cwa and the writing control transistor M2 connected in series with each other in order and is connected to the source terminal of the drive transistor M1 via the holding capacitor Cst. Thereby, the auxiliary writing capacitor Cwa and the holding capacitor Cst are connected in series with each other, and the gate terminal of the drive transistor M1 is connected to the connection point between the auxiliary writing capacitor Cwa and the holding capacitor Cst. The gate terminal of the drive transistor M1 is connected to the source terminal of the drive transistor M1 via the initialization transistor M6, and the initialization transistor M6 and the holding capacitor Cs are connected in parallel to each other. The gate terminal of the writing control transistor M2 is connected to the corresponding scanning signal line Gi, the gate terminal of the light emission control transistor M5 is connected to the corresponding light emission control line Ei, and the gate terminal of the initialization transistor M6 is connected to the initialization signal line CLR.

Since the other configurations of the display device using the pixel circuit 17*e* according to the present configuration example are substantially similar to those of the display device using the first modification 17*b* and the like, the same or corresponding portions are denoted by the same reference numerals, and a detailed description thereof is omitted. In the display device using the pixel circuit 17*e* according to the present configuration example, the scanning signal lines G1 to Gn can be driven by either the single-pulse driving or the double-pulse driving, but in the following description, it is assumed that the double-pulse driving is performed.

FIG. 23 illustrates changes in the voltages of the respective signal lines (corresponding light emission control line Ei, corresponding scanning signal line Gi, corresponding data signal line Dj, and initialization signal line CLR) and the gate voltage Vg of the drive transistor M1 in the initialization operation, the data writing operation, and the emission operation of the pixel circuit Pix(i,j) in the ith row and the jth column which is the pixel circuit 17*e* according to the present configuration example illustrated in FIG. 22. In FIG. 23, a period from time t1 to time t2 is the initialization period Tini, and a period from time t5 to time t7, that is, the selection period (ith scanning selection period) of the corresponding scanning signal line Gi, is the data writing period Tw. A period from time t4 immediately before the selection period for the corresponding scanning signal line Gi to end time t7 of the selection period is the non-emission period, and periods except for a predetermined period (including the initialization period Tini) immediately after the power is turned on are the emission periods.

As illustrated in FIG. 22, in the present configuration example, since the transistors M1, M2, M5, M6 are of P-channel type, the signals of the emission control line Ei, the scanning signal line Gi, and the initialization signal line CLR are all negative logic, and the gate voltage Vg of the drive transistor M1 decreases in the data writing period Tw (t5 to t7). As can be seen by comparing FIG. 23 with FIG. 11 in consideration of this point, the pixel circuit 17*e* according to the present configuration example operates in substantially the same manner as the pixel circuit 15*e* according to the fifth configuration example in the first embodiment, that is, the pixel circuit 15*e* configured as illustrated in FIG. 10 using an N-channel transistor. Therefore, in a case where the pixel circuit 17*e* according to the present configuration example is used in the third embodiment, it is possible to obtain similar effects to those when the pixel circuit 15*e* according to the fifth configuration example is used in the first embodiment. In the present configuration example, the second initialization transistor M6 constitutes the initialization circuit that discharges and initializes the holding capacitor Cst in the initialization period Tini. Here, the second initialization transistor M6 functions as a holding capacitor discharge switching element that discharges the holding capacitor Cst.

4. Fourth Embodiment

The first to third embodiments relate to an organic EL display device, but the disclosure is not limited thereto and can also be applied to another display device in which display luminance is controlled by a voltage held in a capacitor provided in a pixel circuit, for example, a liquid crystal display device. Hereinafter, a liquid crystal display device as a fourth embodiment will be described.

<4.1 Overall Configuration>

Similarly to the organic EL display device illustrated in FIG. 1, the liquid crystal display device according to the present embodiment also includes a display portion 11, a display control circuit 20, a data-side drive circuit 30, a scanning-side drive circuit 40, and a power supply circuit 50 and further includes a backlight that irradiates the back surface of the display portion 11 as a liquid crystal panel with light. However, the data-side drive circuit 30 is configured to perform alternating current (AC) drive on the display portion 11, and the scanning-side drive circuit 40 functions only as a scanning signal line drive circuit (gate driver) and does not have a function as an emission control circuit (emission driver). The power supply circuit 50 generates a common voltage Vcom, described later, to be supplied to the display portion 11 and a power supply voltage (not illustrated) to be supplied to the data-side drive circuit 30 and the scanning-side drive circuit 40.

In the display portion 11 according to the present embodiment, m (m is an integer of 2 or more) data signal lines D1 to Dm and n+1 (n is an integer of 2 or more) scanning signal lines G1 to Gn+1 intersecting the data signal lines D1 to Dm are disposed, and no emission control line, capacitance selection signal line, or the like is provided. The display portion 11 is provided with m×n pixel circuits arranged in a matrix along the m data signal lines D1 to Dm and the n scanning signal lines G1 to Gn, and each pixel circuit corresponds to any one of the m data signal lines D1 to Dm and corresponds to any one of the n scanning signal lines G1 to Gn (hereinafter, in the case of distinguishing the pixel circuits from each other, the pixel circuits corresponding to the ith scanning signal line Gi and the jth data signal line Dj is also referred to as "the pixel circuit in the ith row and the jth column" and denoted by reference symbol "Pix(i,j)"). In the display portion 11, a common electrode line COM for supplying the common voltage Vcom to all the pixel circuits is disposed.

The display control circuit 20 receives an input signal Sin including image data representing an image to be displayed and timing control information for image display from the outside of the display device, generates a data-side control signal Scd and a scanning-side control signal Scs on the basis of the input signal Sin, and outputs data-side control signal Scd and the scanning-side control signal Scs to the data-side drive circuit 30 and the scanning-side drive circuit 40, respectively.

The data-side drive circuit 30 drives the data signal lines D1 to Dm on the basis of the data-side control signal Scd from the display control circuit 20. That is, on the basis of the data-side control signal Scd, the data-side drive circuit 30 outputs m data signals D(1) to D(m) representing an image to be displayed in parallel and applies the data signals to the data signal lines D1 to Dm, respectively. As described above, the present embodiment relates to the liquid crystal display device, and AC drive is performed. Hereinafter, an AC driving system is adopted in which the polarities of the data signals D(1) to D(m) are inverted every frame period and inverted every horizontal period, but other AC driving systems may be adopted.

The scanning-side drive circuit 40 drives the scanning signal lines G1 to Gn+1 on the basis of the scanning-side control signal Scs from the display control circuit 20. That is, the scanning-side drive circuit 40 sequentially selects the scanning signal lines G1 to Gn+1 in each frame period on the basis of the scanning-side control signal Scs, applies an active signal (a high-level voltage in the present embodiment) to the selected scanning signal line Gk, and applies an inactive signal (low-level voltage in the present embodiment) to the unselected scanning signal line. In the present embodiment as well, similarly to the first embodiment, both the double-pulse driving and the single-pulse driving can be performed for the scanning signal lines G1 to Gn+1. However, since the polarities of the data signals D(1) to D(m) are inverted every predetermined period for the AC drive, in a case where the double-pulse driving is performed, the scanning-side drive circuit 40 generates the scanning signals G (1) to G (n) such that the scanning signals G (1) to G (n) to be applied to the scanning signal lines G1 to Gn include drive pulses suitable for the polarity inversion.

As described above, the data signal lines D1 to Dm are driven by the data-side drive circuit 30, the scanning signal lines G1 to Gn+1 are driven by the scanning-side drive circuit 40, and the back surface of the display portion 11 is irradiated with light from the backlight (not illustrated), whereby an image represented by image data in the input signal Sin from the outside is displayed on the display portion 11.

<4.2 Configuration Example of Pixel Circuit>

Hereinafter, a configuration example of the pixel circuit according to the present embodiment will be described.

<4.2.1 First Configuration Example>

Figure 24:
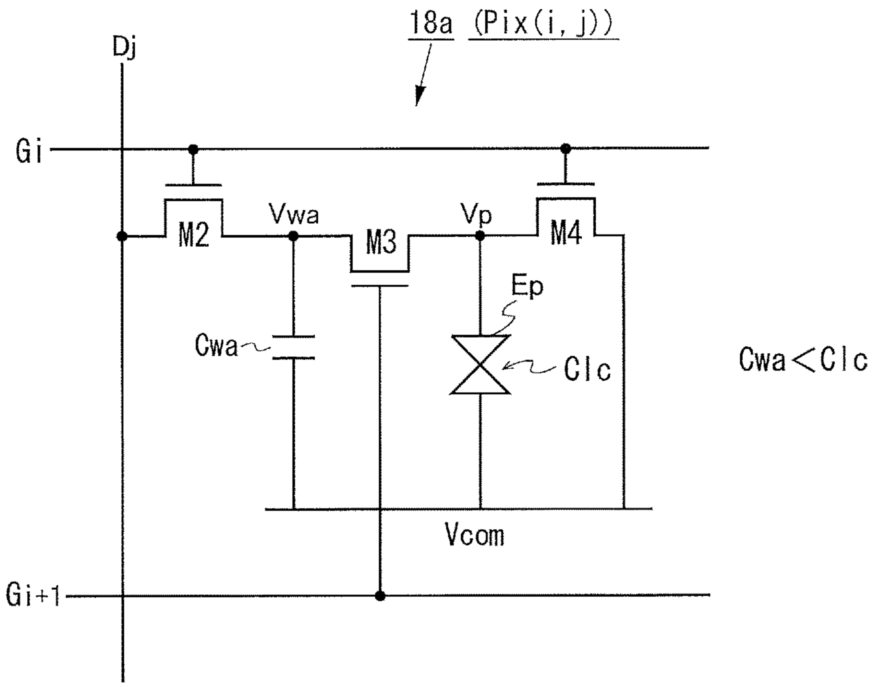
FIG. 24 is a circuit diagram illustrating a first configuration example of a pixel circuit in a display device according to a fourth embodiment.
Figure 25:
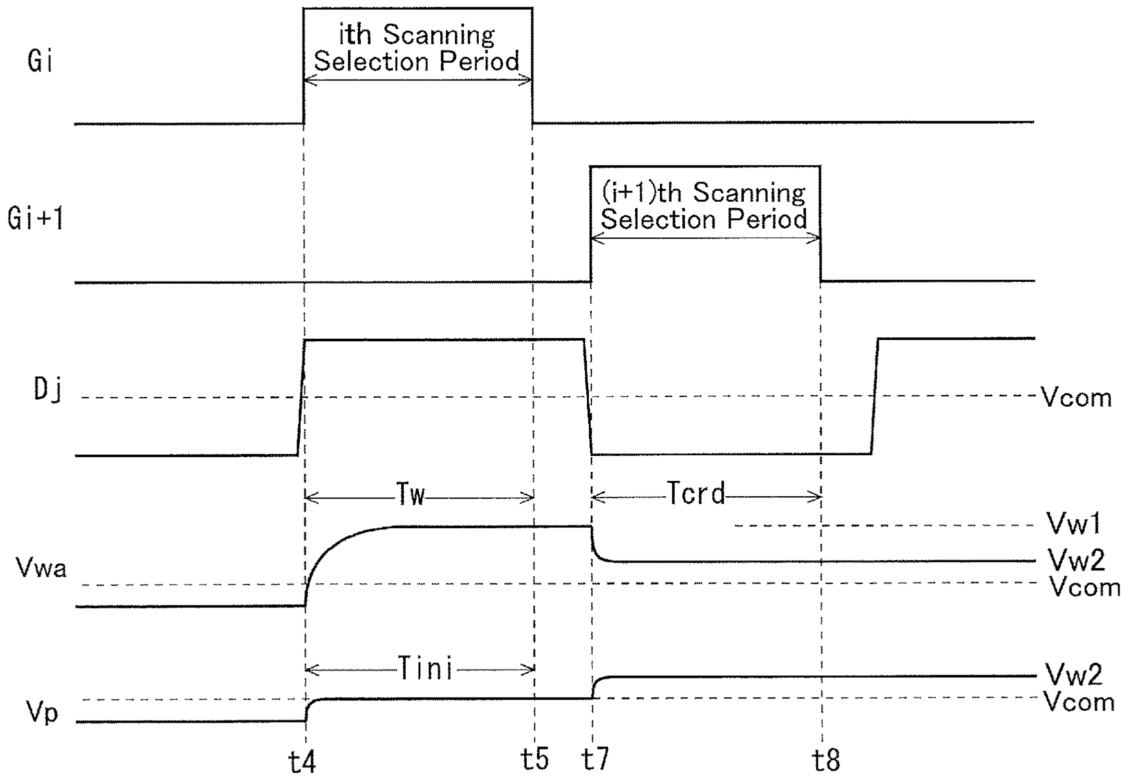
FIG. 25 is a signal waveform diagram for describing the operation of the pixel circuit according to the first configuration example in the fourth embodiment.

FIG. 24 is a circuit diagram illustrating a first configuration example of the pixel circuit in the present embodiment, and FIG. 25 is a signal waveform diagram for describing the operation of a pixel circuit 18*a* according to the first configuration example.

FIG. 24 illustrates a configuration of a pixel circuit Pix(i,j) in the ith row and the jth column, which is the pixel circuit 18*a* according to the present configuration example corresponding to the ith scanning signal line Gi and the jth data signal line Dj (1≤i≤n, 1≤j≤m). The pixel circuit 18*a* includes liquid crystal capacitance Clc corresponding to a liquid crystal element (pixel liquid crystal) as a display element, an auxiliary writing capacitor Cwa, a writing control transistor M2, a capacitance selection transistor M3, and an initialization transistor M4. The capacitance value of the auxiliary writing capacitor Cwa is smaller than the capacitance value of the liquid crystal capacitance Clc.

Figure 26:
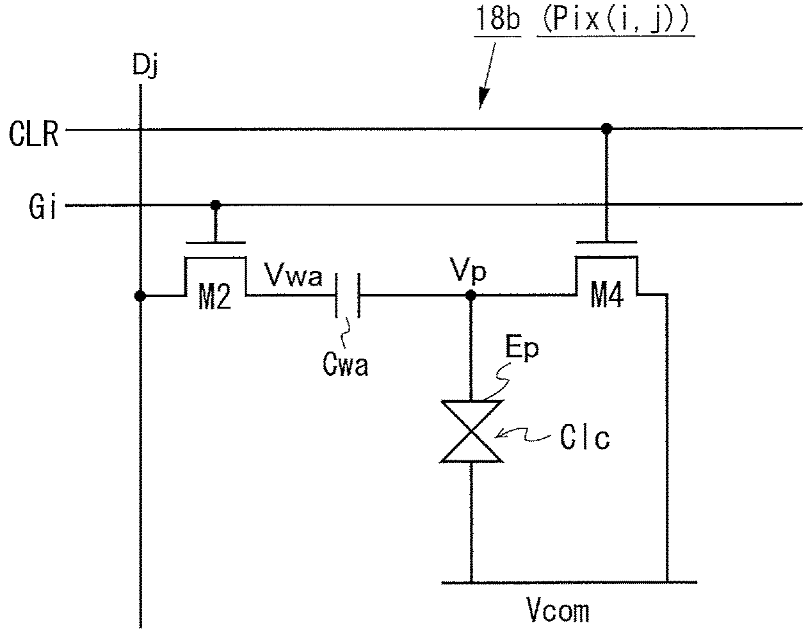
FIG. 26 is a circuit diagram illustrating a second configuration example of the pixel circuit in the fourth embodiment.

Here, the liquid crystal capacitance Clc is made up of a pixel electrode Ep and a common electrode line COM facing the pixel electrode Ep with the liquid crystal layer interposed therebetween and corresponds to the holding capacitor Cst of the pixel circuit in each of the first to third embodiments. The transistors M2 to M4 included in the pixel circuit 18*a* function as switching elements. Note that all the transistors included in the pixel circuit 18*a* are N-channel transistors, but some or all of the transistors may be P-channel transistors. The same applies to another configuration example (FIG. 26).

As illustrated in FIG. 24, the pixel circuit 18*a* is connected with a scanning signal line (corresponding scanning signal line) Gi corresponding to the pixel circuit 18*a*, a scanning signal line (subsequent scanning signal line) Gi+1 immediately after the corresponding scanning signal line Gi, a data signal line (corresponding data signal line) Dj corresponding to the pixel circuit 18*a*, and the common electrode line COM. In the pixel circuit 18*a*, the pixel electrode Ep constituting the liquid crystal capacitance Clc is connected to the first terminal of the auxiliary writing capacitor Cwa via the capacitance selection transistor M3 and is connected to the common electrode line COM via the initialization transistor M4. The first terminal of the auxiliary writing capacitor Cwa is connected to the corresponding data signal line Dj via the writing control transistor M2, and the second terminal of the auxiliary writing capacitor Cwa is connected to the common electrode line COM. The gate terminals of the writing control transistor M2 and the capacitance selection transistor M3 are connected to the corresponding scanning signal line Gi, and the gate terminal of the capacitance selection transistor M3 is connected to the subsequent scanning signal line Gi+1.

FIG. 25 illustrates changes in the voltages of the respective signal lines (corresponding scanning signal line Gi, subsequent scanning signal line Gi+1, and corresponding data signal line Dj), a voltage (hereinafter referred to as "auxiliary writing capacitance voltage") Vwa of the first terminal of the auxiliary writing capacitor Cwa, and a voltage Vp of the pixel electrode Ep as one end of the liquid crystal capacitance Clc in the initialization operation, the data writing operation, and the charge redistribution operation of the pixel circuit Pix(i,j) in the ith row and the jth column which is the pixel circuit 18*a* illustrated in FIG. 24. As illustrated in FIG. 25, in a case where the pixel circuit 18*a* according to the present configuration example is used, the single-pulse driving is performed for the scanning signal lines G1 to Gn, and a selection period for the corresponding scanning signal line Gi, that is, an ith scanning selection period (t4 to t5), corresponds to a data writing period Tw for charging the auxiliary writing capacitor Cwa with the voltage of the corresponding data signal line Dj, that is, the data voltage Vw1, and also corresponds to an initialization period Tini for initializing the liquid crystal capacitance Clc. A selection period for the subsequent scanning signal line Gi+1, that is, the (i+1)th scanning selection period (t7 to t8), corresponds to a charge redistribution period Tcrd in which charges are redistributed between the auxiliary writing capacitor Cwa and the holding capacitor Cst.

In the pixel circuit Pix(i,j) in the ith row and the jth column according to the present configuration example, at the start time t4 of the selection period for the corresponding scanning signal line Gi, the writing control transistor M2 changes to the on-state, and the capacitance selection transistor M3 is maintained in the off-state, so that only the auxiliary writing capacitor Cwa is charged by supplying the voltage (data voltage) Vw1 of the corresponding data signal line Dj to its first terminal, and at the end time t5 of the selection period, the voltage of the first terminal, that is, the auxiliary writing capacitance voltage Vwa, becomes equal to the data voltage Vw1. Further, at the start time t4 of the selection period for the corresponding scanning signal line Gi, the initialization transistor M4 is changed to the on-state, so that the liquid crystal capacitance Clc is discharged, the holding voltage thereof is initialized to zero, and the voltage (hereinafter referred to as "pixel voltage") Vp of the pixel electrode Ep becomes equal to the common voltage Vcom. As described above, in the present configuration example, the first initialization transistor M4 constitutes the initialization circuit that discharges and initializes the liquid crystal capacitance Clc as the holding capacitor in the initialization period Tini. That is, the first initialization transistor M4 functions as a holding capacitor discharge switching element that discharges the liquid crystal capacitance Clc as a holding capacitor. Thereafter, at the start time t7 of the selection period for the subsequent scanning signal line Gi+1, only the capacitance selection transistor M3 is turned on, and the auxiliary writing capacitor Cwa and the liquid crystal capacitance Clc are thereby connected in parallel, so that the charges are redistributed between the auxiliary writing capacitor Cwa and the liquid crystal capacitance Clc. As a result, at the end time t8 of the selection period for the subsequent scanning signal line Gi+1, the pixel voltage Vp and the auxiliary writing capacitance voltage Vwa become the voltage Vw2 expressed by the following equation:

$$Vw2=\{Cwa/(Cwa+Clc)\}(Vw1-Vcom)+Vcom \qquad (14)$$

At this time, the voltage applied across the liquid crystal capacitance Clc, that is, a liquid crystal application voltage Vclc, is expressed by the following equation:

$$Vclc=Vw2-Vcom=\{Cwa/(Cwa+Clc)\}(Vw1-Vcom) \qquad (15)$$

The liquid crystal application voltage Vclc is held in the liquid crystal capacitance Clc until the data writing operation for the pixel circuit Pix(i,j) is performed in the next frame period.

According to the liquid crystal display device using the pixel circuit 18*a* in the present configuration example as described above, the data voltage Vw1 is written to the auxiliary writing capacitor Cwa having a smaller capacitance value than the liquid crystal capacitance Clc in the data writing period Tw (t4 to t5), and the voltage (liquid crystal application voltage) Vclc held in the liquid crystal capacitance Clc for display is determined by charge redistribution between the auxiliary writing capacitor Cwa and the liquid crystal capacitance Clc in the subsequent charge redistribution period Tcrd (t7 to t8). Therefore, as compared to the related art (see Equation (14) above), the voltage of the data signal line Dj for data writing, that is, the data voltage Vdata=Vw1, is large, but the capacitance value of the auxiliary writing capacitor Cwa charged at the data voltage Vdata=Vw1 in the data writing period Tw is small, so that it is possible to prevent deterioration in display quality due to insufficient charging.

<4.2.2 Second Configuration Example>

Figure 27:
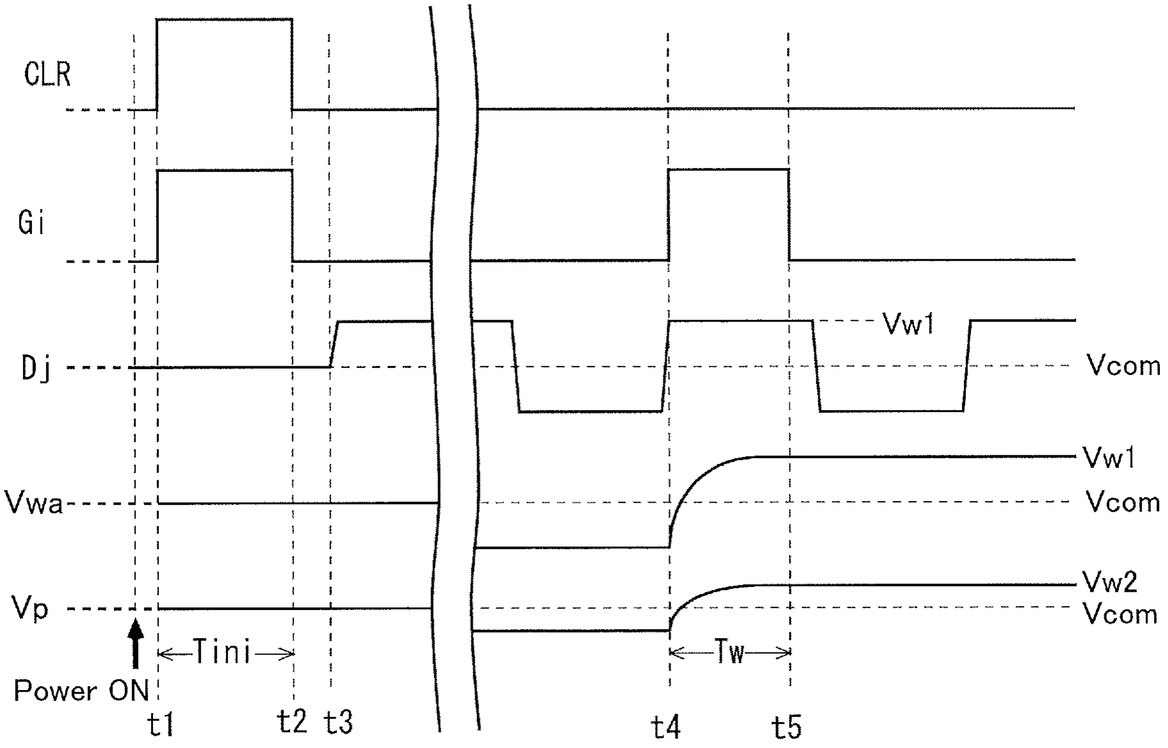
FIG. 27 is a signal waveform diagram for describing the operation of the pixel circuit according to the second configuration example in the fourth embodiment.

FIG. 26 is a circuit diagram illustrating a second configuration example of the pixel circuit in the present embodiment, and FIG. 27 is a signal waveform diagram for describing the operation of the pixel circuit 18*b* according to the second configuration example.

FIG. 26 illustrates a configuration of a pixel circuit Pix(i,j) in the ith row and the jth column, which is a pixel circuit 18*b* according to the present configuration example corresponding to the ith scanning signal line Gi and the jth data signal line Dj in the present embodiment ($1 \le i \le n$, $1 \le j \le m$). Similarly to the first configuration example (FIG. 24), the pixel circuit 18*b* includes liquid crystal capacitance Clc corresponding to a liquid crystal element (pixel liquid crystal) as a display element, an auxiliary writing capacitor Cwa, a writing control transistor M2, and an initialization transistor M4 but does not include a capacitance selection transistor M3 unlike the first configuration example.

As illustrated in FIG. 26, the pixel circuit 18*b* is connected with a scanning signal line (corresponding scanning signal line) Gi corresponding to the pixel circuit 18*b*, a data signal line (corresponding data signal line) Dj corresponding to the pixel circuit 18*b*, and a common electrode line COM but is not connected with the subsequent scanning signal line Gi+1. In addition, in the liquid crystal display device using the pixel circuit 18*b*, unlike the case of using the pixel circuit 18*a* according to the first configuration example, an initialization signal line CLR for transmitting an initialization signal used in an initialization operation to be described later is disposed in the display portion 11, and the initialization signal line CLR is also connected to the pixel circuit 18*b*. In the pixel circuit 18*b*, the pixel electrode Ep constituting the liquid crystal capacitance Clc is connected to the drain terminal as one conductive terminal of the writing control transistor M2 via the auxiliary writing capacitor Cwa and is connected to the common electrode line COM via the initialization transistor M4. The source terminal as the other conductive terminal of the writing control transistor M2 is connected to the corresponding data signal line Dj. The gate terminal of the writing control transistor M2 is connected to the corresponding scanning signal line Gi, and the gate terminal of the initialization transistor M4 is connected to the initialization signal line CLR.

FIG. 27 illustrates changes in the voltages of the respective signal lines (corresponding scanning signal line Gi, corresponding data signal line Dj), the voltage Vwa at the connection point between the writing control transistor and the auxiliary writing capacitor Cwa (hereinafter also referred to as "auxiliary writing capacitance voltage"), and the voltage Vp of the pixel electrode Ep in the liquid crystal capacitance Clc in the initialization operation and the data writing operation of the pixel circuit Pix(i,j) in the ith row and the jth column which is the pixel circuit 18*b* illustrated in FIG. 26. In a case where the pixel circuit 18*b* according to the present configuration example is used, both the single-pulse driving and the double-pulse driving are possible for the scanning signal lines G1 to Gn, but FIG. 27 illustrates an operation example in a case where the single-pulse driving is performed.

As illustrated in FIG. 27, in the liquid crystal display device using the pixel circuit 18*b* according to the present configuration example, the initialization operation is performed only immediately after the power of the display device is turned on, and thereafter, the initialization operation is not performed until the power is turned off. In the initialization operation in the display device, the voltages of the initialization signal line CLR and all the scanning signal lines G1 to Gn are set at the high level, and all the data signal lines D1 to Dm are set to the voltage equal to the common voltage Vcom during a period from time t1 to time t2 immediately after the power is turned on (initialization period Tini). As a result, in each pixel circuit 18*b*, the writing control transistor M2 and the initialization transistor M4 are turned on during the initialization period Tini(t1 to t2), so that the auxiliary writing capacitor Cwa and the liquid crystal capacitance Clc are discharged, and the holding voltages in the auxiliary writing capacitor Cwa and the liquid crystal capacitance Clc are initialized to zero. As described above, in the present configuration example, the first initialization transistor M4 constitutes, together with the writing control transistor M2, the initialization circuit that discharges and initializes the liquid crystal capacitance Clc or the like as the holding capacitor in the initialization period Tini. Here, the first initialization transistor M4 functions as a holding capacitor discharge switching element that discharges the liquid crystal capacitance Clc as a holding capacitor. Thereafter, at time t3, the driving of the scanning signal lines G1 to Gn and the data signal line D1 to Dm is started (the start of the display operation). After the initialization period Tini(t1 to t2), the voltage of the initialization signal line CLR is maintained at the low level until the power is turned off, whereby the initialization transistor M4 is maintained in the off-state.

In the pixel circuit Pix(i,j) in the ith row and the jth column according to the present configuration example illustrated in FIG. 26, the selection period (t4 to T5) of the corresponding scanning signal line Gi corresponds to the data writing period Tw. At the start time t4 of the selection period for the corresponding scanning signal line Gi, only the writing control transistor M2 is turned on out of the transistors M2, M4 in the pixel circuit Pix(i,j). Thereby, the voltage of the corresponding data signal line Dj is applied as the data voltage Vdata=Vw1 to one end of the small-capacitance capacitor as the synthetic capacitance (hereinafter, this is also referred to as "series synthetic capacitance" and is denoted by reference symbol "Cser") made up of the auxiliary writing capacitor Cwa and the liquid crystal capacitance Clc connected in series with each other via the writing control transistor M2. As a result, the series synthetic capacitance Cser is charged during the selection period (t4 to T5) of the corresponding scanning signal line Gi, the auxiliary writing capacitance voltage Vwa becomes equal to the data voltage Vw1, and the pixel voltage Vp becomes the voltage Vw2 expressed by Equation (16) at the end time t5 of the selection period. The capacitance value of the series synthetic capacitance Cser is smaller than the capacitance value of the liquid crystal capacitance Clc.

$$Vw2=\{Cwa/(Cwa+Clc)\}(Vw1-Vcom)+Vcom \quad (16)$$

At this time, the voltage applied across the liquid crystal capacitance Clc, that is, a liquid crystal application voltage Vclc, is expressed by the following equation:

$$Vclc=Vw2-Vcom=\{Cwa/(Cwa+Clc)\}(Vw1-Vcom) \quad (17)$$

The liquid crystal application voltage Vclc is held in the liquid crystal capacitance Clc until the data writing operation for the pixel circuit Pix(i,j) is performed in the next frame period.

According to the liquid crystal display device using the pixel circuit 18*b* according to the present configuration example as described above, in the data writing period Tw, the data voltage Vdata=Vw1 is written to the series synthetic capacitance Cser having a smaller capacitance value than the liquid crystal capacitance Clc, and the liquid crystal application voltage Vclc is determined by the capacitive division of the voltage held in the series synthetic capacitance Cser, between the auxiliary writing capacitor Cwa and the holding capacitor Cst. Thus, also, in the case where the pixel circuit 18*b* according to the present configuration example is used, the voltage Vdata of the data signal line Dj for data writing is large compared to that in the related art (see Equation (16) above), but since the capacitance value of the series synthetic capacitance Cser charged at the data voltage Vdata=Vw1 in the data writing period Tw is small, it is possible to prevent deterioration in display quality due to insufficient charging.

5. Modification

The disclosure is not limited to the above embodiments, and various modifications may be made so long as not deviating from the scope of the disclosure.

For example, in the pixel circuit in each of the first to third embodiments, the configuration related to the connection among the auxiliary writing capacitor Cwa, the holding capacitor Cst, and the drive transistor M1 (hereinafter simply referred to as "connection configuration") is not limited to the configuration described above and may be a connection configuration in which a capacitor having a capacitance value smaller than that of the holding capacitor Cst is charged with the data voltage Vdata in the data writing period Tw, and the voltage held in the holding capacitor Cst (the gate-source voltage Vgs in the drive transistor M1) is determined on the basis of the charging of the small-capacitance capacitor.

In each of the pixel circuits 15*a* to 15*c* according to the first to third configuration examples of the first embodiment, and the like, the corresponding scanning signal line Gi and the subsequent scanning signal line Gi+1 are connected to each pixel circuit Pix(i,j) (i=1 to n, j=1 to m), but instead of this, only the corresponding scanning signal line Gi out of the scanning signal lines Gi and Gi+1 may be connected to each pixel circuit Pix(i,j). The former is preferable from the viewpoint of the stability of the gate voltage Vg after charges are redistributed between the auxiliary writing capacitor Cwa and the holding capacitor Cst after the data writing period Tw, but when the destabilization of the gate voltage Vg due to noise or the like does not become a problem, the latter can be adopted to simplify the configuration of the pixel circuit Pix(i,j).

In the above description, the organic EL display device and the liquid crystal display device have been taken as examples to describe the embodiments and the modifications thereof, but the disclosure is not limited thereto and can also be applied to other display devices so long as the display luminance thereof is controlled by a voltage held in a capacitor in a pixel circuit. For example, the disclosure can also be applied to a display device using an inorganic light-emitting diode, a quantum dot light-emitting diode (QLED), or the like as a display element, in addition to a display device using an organic EL element, that is, an organic light-emitting diode (OLED).

DESCRIPTION OF REFERENCE CHARACTERS

10*a*, 10*b*: Organic EL Display Device
11: Display Portion
15: Basic Pixel Circuit
15*a* to 15*e*: Pixel Circuit (Of Organic El Display Device)
16*a* To 16*d*: Pixel Circuit (Of Organic El Display Device)
17*a* to 17*d*: Pixel Circuit (Of Organic El Display Device)
18*a*, 18*b*: Pixel Circuit (Of Liquid Crystal Display Device)
Pix(j, i): Pixel Circuit (i=1 to n, j=1 to m)
20: Display Control Circuit
30: Data-Side Drive Circuit (Data Signal Line Drive Circuit)
40: Scanning-Side Drive Circuit (Scanning Signal Line Drive/Emission Control Circuit)
Gi: Scanning Signal Line (i=1 to n)
Ei: Emission Control Line (i=1 to n)
CSWi: Capacitance Selection Signal Line (i=1 to n)
Dj: Data Signal Line (j=1 to m)
ELVDD: High-Level Power Supply Line (First Power Supply Line),
High-Level Power Supply Voltage
ELVSS: Low-Level Power Supply Line (Second Power Supply Line),
Low-Level Power Supply Voltage
INI: Initialization Voltage Supply Line
COM: Common Electrode Line
OL: Organic E1 Element (Display Element)
Cst: Holding Capacitor
Cwa: AUXILIARY WRITING Capacitor
M1: Drive Transistor
M2: Writing Control Transistor (Writing Control Switching
Element)
M3: Capacitance Selection Transistor (Capacitance Selection
Switching Element)
M4: First Initialization Transistor (First Initialization Switching Element)
M5: Emission Control Transistor (Emission Control Switching
Element)
M6: Second Initialization Transistor (Second Initialization
Switching Element)
M8: Monitoring Control Transistor (Monitoring Control Switching Element)
Vini: Initialization Voltage
Vcom: Common Voltage
Va: Anode Voltage
Vg: Gate Voltage
Vst: Holding Capacitance Voltage
Vwa: Auxiliary Writing Capacitance Voltage
Tini: Initialization Period
Tw: Data Writing Period

The invention claimed is:

1. A display device comprising a plurality of data signal lines, a plurality of scanning signal lines intersecting the plurality of data signal lines, and a plurality of pixel circuits arranged along the plurality of data signal lines and the plurality of scanning signal lines, the display device further comprising:

a data signal line drive circuit configured to drive the plurality of data signal lines;

a scanning signal line drive circuit configured to selectively drive the plurality of scanning signal lines;

a plurality of capacitance selection signal lines each corresponding to one of the plurality of scanning signal lines; and a capacitance selection control circuit configured to drive the plurality of capacitance selection signal lines, wherein each of the plurality of pixel circuits corresponds to one of the plurality of data signal lines and corresponds to one of the plurality of scanning signal lines, each of the plurality of pixel circuits includes a holding capacitor, a display element having luminance controlled by a holding voltage held in the holding capacitor, a writing control switching element having a writing control terminal connected to a corresponding one of the plurality of scanning signal lines, an auxiliary writing capacitor having a capacitance value smaller than a capacitance value of the holding capacitor, a capacitance selection switching element that has a capacitance control terminal connected to a corresponding one of the plurality of capacitance selection signal lines that is associated with the corresponding one of the plurality of scanning signal lines, the capacitance selection switching element being connected in series with the holding capacitor, and an initialization circuit configured to discharge and initialize the holding capacitor before the capacitance selection switching element is turned on, in each of the plurality of pixel circuits, the auxiliary writing capacitor is connected in parallel with the holding capacitor and the capacitance selection switching element that are connected in series with each other, and the auxiliary writing capacitor has a first terminal connected to a corresponding one of the plurality of data signal lines via the writing control switching element, and a second terminal connected directly or via a switching element to a fixed potential line, when the corresponding one of the plurality of scanning signal lines is selected to turn on the writing control switching element, the auxiliary writing capacitor has a voltage of the corresponding one of the plurality of data signal lines applied thereto, so as to hold a writing voltage, and when the corresponding one of the plurality of capacitance selection signal lines is activated to turn on the capacitance selection switching element, the holding voltage of the holding capacitor is determined on a basis of the writing voltage held in the auxiliary writing capacitor, wherein the data signal line drive circuit is further configured to apply to each of the plurality of data signal lines a data voltage having an increased value depending on a ratio of the capacitance value of the holding capacitor to the capacitance value of the auxiliary writing capacitor, and the capacitance selection control circuit is further configured to drive the plurality of capacitance selection signal lines such that after the voltage of the corresponding one of the plurality of data signal lines is written to the auxiliary writing capacitor while the holding capacitor is electrically disconnected from the corresponding one of the plurality of data signal lines, the auxiliary writing capacitor and the holding capacitor are connected in parallel with each other.

2. The display device according to claim 1, wherein the capacitance selection switching element further has a first conductive terminal connected to the first terminal of the auxiliary writing capacitor, and a second conductive terminal connected to the second terminal of the auxiliary writing capacitor via the holding capacitor.

3. The display device according to claim 1, wherein the display element is configured to be driven by a drive current, each of the plurality of pixel circuits further includes a drive transistor for controlling the drive current of the display element in accordance with the holding voltage held in the holding capacitor, and the drive transistor has a drive control terminal connected to the fixed potential line via the holding capacitor and the capacitance selection switching element that are connected in series with each other, and connected to the fixed potential line via the auxiliary writing capacitor.

4. The display device according to claim 3, further comprising a first power supply line and a second power supply line, wherein the drive transistor has a first conductive terminal connected to the first power supply line, a second conductive terminal connected to the second power supply line via the display element, and the drive control terminal connected to the second conductive terminal via the holding capacitor and the capacitance selection switching element that are connected in series with each other.

5. The display device according to claim 4, further comprising an initialization voltage supply line, wherein the initialization circuit includes a first initialization switching element that is in an on-state when the writing control switching element changes from an on-state to an off-state, and the second conductive terminal of the drive transistor is connected to the initialization voltage supply line via the first initialization switching element.

6. The display device according to claim 5, wherein the initialization circuit further includes a second initialization switching element having an initialization control terminal connected to the corresponding one of the plurality of scanning signal lines, the holding capacitor has a first terminal connected to the drive control terminal via the capacitance selection switching element and connected to the initialization voltage supply line via the second initialization switching element, and the holding capacitor further has a second terminal connected to the second conductive terminal of the drive transistor.

7. The display device according to claim 5, wherein the initialization circuit further includes a second initialization switching element that has an initialization control terminal connected to the corresponding one of the plurality of scanning signal lines and that is connected in parallel to the holding capacitor.

8. The display device according to claim 5, wherein the scanning signal line drive circuit is further configured to drive the plurality of scanning signal lines such that a selection period for one of two scanning signal lines adjacent to each other in a scanning order of the plurality of scanning signal lines and a selection period for another one of the two scanning signal lines partially overlap each other, the first initialization switching element has an initialization control terminal connected to a subsequent scanning signal line that is a scanning signal line selected immediately after the corresponding one of the plurality of scanning signal lines is selected, and the capacitance selection control circuit is further configured to drive the plurality of capacitance selection signal lines such that a signal of the corresponding one of the plurality of capacitance selection signal lines changes to an active state after the corresponding one of the plurality of scanning signal lines changes to an unselected state and before the subsequent scanning signal line changes to the unselected state.

9. The display device according to claim 3, further comprising a first power supply line and a second power supply line, wherein the drive transistor has a first conductive terminal connected to the first power supply line, a second conductive terminal connected to the second power supply line via the display element, and the drive control terminal connected to the first conductive terminal via the holding capacitor and the capacitance selection switching element that are connected in series with each other.

10. The display device according to claim 3, further comprising a first power supply line and a second power supply line, wherein the drive transistor has a first conductive terminal connected to the first power supply line, and a second conductive terminal connected to the second power supply line via the display element, and the fixed potential line is the first power supply line.

11. The display device according to claim 3, wherein the scanning signal line drive circuit is further configured to drive the plurality of scanning signal lines such that a selection period for one of two scanning signal lines adjacent to each other in a scanning order of the plurality of scanning signal lines and a selection period for another one of the two scanning signal lines partially overlap each other, and the capacitance selection control circuit is further configured to drive the plurality of capacitance selection signal lines such that a signal of the corresponding one of the plurality of capacitance selection signal lines changes to an active state after the corresponding one of the plurality of scanning signal lines changes to an unselected state and before a subsequent scanning signal line that is a scanning signal line selected immediately after selection of the corresponding one of the plurality of scanning signal lines changes to an unselected state.

12. The display device according to claim 3, further comprising:

a plurality of emission control lines each corresponding to one of the plurality of scanning signal lines; and an emission control circuit configured to drive the plurality of emission control lines, wherein each of the plurality of pixel circuits further includes an emission control switching element connected in series with the display element, each of the plurality of emission control lines is connected to a control terminal of the emission control switching element in the pixel circuit corresponding to the corresponding one of the plurality of scanning signal lines, and the emission control circuit is further configured to drive the plurality of emission control lines such that for each of the plurality of emission control lines, a signal of each of the plurality of emission control lines comes into an active state after a time point at which the corresponding one of the plurality of scanning signal lines changes to an unselected state.

13. The display device according to claim 1, wherein the capacitance selection control circuit drives the plurality of capacitance selection signal lines such that the capacitance selection switching element is in an off-state while the writing control switching element is in an on-state.

14. The display device according to claim 1, wherein the initialization circuit includes a holding capacitor discharge switching element that has a discharge control terminal connected to the corresponding one of the plurality of scanning signal lines and that is connected in parallel to the holding capacitor.

15. A driving method for a display device that includes a plurality of data signal lines, a plurality of scanning signal lines intersecting the plurality of data signal lines, and a plurality of pixel circuits arranged along the plurality of data signal lines and the plurality of scanning signal lines, each of the plurality of pixel circuits corresponding to one of the plurality of data signal lines and corresponding to one of the plurality of scanning signal lines, each of the plurality of pixel circuits including a holding capacitor, a display element having luminance controlled by a holding voltage held in the holding capacitor, and an auxiliary writing capacitor having a capacitance value smaller than a capacitance value of the holding capacitor, the driving method comprising:

applying to each of the plurality of data signal lines a data voltage having an increased value depending on a ratio of the capacitance value of the holding capacitor to the capacitance value of the auxiliary writing capacitor;

applying a voltage of a corresponding one of the plurality of data signal lines to the auxiliary writing capacitor in each of the plurality of pixel circuits when a corresponding one of the plurality of scanning signal lines is selected, so as to hold a writing voltage in the auxiliary writing capacitor;

determining the holding voltage of the holding capacitor on a basis of the writing voltage held in the auxiliary writing capacitor; and discharging and initializing the holding capacitor in each of the plurality of pixel circuits, wherein in applying the voltage of the corresponding one of the plurality of data signal lines to the auxiliary writing capacitor, the auxiliary writing capacitor is charged by providing the voltage of the corresponding one of the plurality of data signal lines to the auxiliary writing capacitor while the holding capacitor is electrically disconnected from the corresponding one of the plurality of data signal lines, when the corresponding one of the plurality of scanning signal lines is selected in each of the plurality of pixel circuits, and in determining the holding voltage of the holding capacitor, after the holding capacitor is initialized in the discharging and initializing the holding capacitor, and the auxiliary writing capacitor is charged in the applying the voltage of the corresponding one of the plurality of data signal lines to the auxiliary writing capacitor, the holding voltage of the holding capacitor is determined by connecting the holding capacitor and the auxiliary writing capacitor in parallel so as to redistribute charges between the holding capacitor and the auxiliary writing capacitor.

* * * * *